United States Patent
Polk

(10) Patent No.: US 8,527,548 B2
(45) Date of Patent: *Sep. 3, 2013

(54) METHOD AND APPARATUS FOR ELECTRONIC COLLECTION, TRANSLATION, GROUPING, AND DELIVERY OF WAGE ASSIGNMENT INFORMATION

(75) Inventor: John Polk, McLean, VA (US)

(73) Assignee: ACS State and Local Solutions, Inc., Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 13/555,734

(22) Filed: Jul. 23, 2012

(65) Prior Publication Data

US 2012/0290493 A1 Nov. 15, 2012

Related U.S. Application Data

(60) Continuation of application No. 12/955,705, filed on Nov. 29, 2010, now Pat. No. 8,229,978, which is a continuation of application No. 12/320,702, filed on Feb. 2, 2009, now Pat. No. 7,877,423, which is a division of application No. 11/438,443, filed on May 23, 2006, now Pat. No. 7,720,797, which is a continuation of application No. 10/155,965, filed on May 29, 2002, now Pat. No. 7,072,909, which is a continuation of application No. 09/200,943, filed on Nov. 30, 1998, now Pat. No. 6,567,821.

(60) Provisional application No. 60/085,731, filed on May 15, 1998.

(51) Int. Cl.
G06F 7/00 (2006.01)
G06F 17/30 (2006.01)

(52) U.S. Cl.
USPC .......................................... 707/798; 707/756

(58) Field of Classification Search
None
See application file for complete search history.

(56) References Cited

U.S. PATENT DOCUMENTS 4,820,167 A 4/1989 Nobles et al.
4,823,264 A 4/1989 Deming (Continued)

FOREIGN PATENT DOCUMENTS

WO WO 97/17678 5/1997
WO WO 99/03243 1/1999
WO WO 00/46732 8/2000

OTHER PUBLICATIONS

Oracle Human Resources, North American User's Guide, Release 11, vol. 1, Mar. 1998, Oracle®.*

(Continued)

Primary Examiner — Kuen Lu
(74) Attorney, Agent, or Firm — Finnegan, Henderson, Farabow, Garrett & Dunner, LLP.

(57) ABSTRACT

This disclosure describes a system that electronically collects, translates, groups, and delivers wage assignment information from at least one initiator to at least one recipient via an accumulator. An initiator initially receives the wage assignment information. Then, an accumulator collects the wage assignment information from at least one initiator, such as a government agency. The accumulator then translates the wage assignment information into a format compatible with electronic data interchange (EDI), such as the ANSI X12 standard. The accumulator then groups the EDI wage assignment information into specific files, batching the files based upon one data field contained within the wage assignment information data set, such as a recipient. The accumulator then delivers a batched EDI wage assignment file to each respective recipient. Once the EDI wage assignment file is received by the recipient, the wage assignment may then be implemented.

12 Claims, 46 Drawing Sheets

(56) References Cited

U.S. PATENT DOCUMENTS

| | | | |
|---|---|---|---|
| 5,054,112 A | 10/1991 | Ike | |
| 5,220,501 A | 6/1993 | Lawlor et al. | |
| 5,231,569 A | 7/1993 | Myatt et al. | |
| 5,235,507 A | 8/1993 | Sackler et al. | |
| 5,245,368 A * | 9/1993 | Farrell et al. | 358/401 |
| 5,265,007 A | 11/1993 | Barnhard, Jr. et al. | |
| 5,283,829 A | 2/1994 | Anderson | |
| 5,317,732 A | 5/1994 | Gerlach, Jr. et al. | |
| 5,369,699 A | 11/1994 | Page et al. | |
| 5,383,113 A | 1/1995 | Kight et al. | |
| 5,465,206 A | 11/1995 | Hilt et al. | |
| 5,490,243 A | 2/1996 | Millman et al. | |
| 5,576,951 A | 11/1996 | Lockwood | |
| 5,590,360 A * | 12/1996 | Edwards | 707/102 |
| 5,649,117 A | 7/1997 | Landry | |
| 5,652,786 A | 7/1997 | Rogers | |
| 5,666,645 A | 9/1997 | Thomas et al. | |
| 5,699,528 A | 12/1997 | Hogan | |
| 5,704,029 A | 12/1997 | Wright | |
| 5,761,647 A | 6/1998 | Boushy | |
| 5,806,842 A | 9/1998 | Steinhilber et al. | |
| 5,878,405 A | 3/1999 | Grant et al. | |
| 5,884,283 A | 3/1999 | Manos | |
| 5,892,900 A | 4/1999 | Ginter et al. | |
| 5,893,080 A | 4/1999 | McGurl et al. | |
| 5,900,801 A | 5/1999 | Heagle et al. | |
| 5,917,965 A | 6/1999 | Cahill et al. | |
| 5,946,669 A | 8/1999 | Polk | |
| 6,034,605 A | 3/2000 | March | |
| 6,052,674 A * | 4/2000 | Zervides et al. | 705/40 |
| 6,070,150 A | 5/2000 | Remington et al. | |
| 6,119,107 A | 9/2000 | Polk | |
| 6,183,140 B1 | 2/2001 | Singer et al. | |
| 6,223,168 B1 | 4/2001 | McGurl et al. | |
| 6,233,428 B1 | 5/2001 | Fryer | |
| 6,270,351 B1 | 8/2001 | Roper | |
| 6,311,170 B1 | 10/2001 | Embrey | |
| 6,347,304 B1 | 2/2002 | Taricani | |
| 6,401,079 B1 | 6/2002 | Kahn et al. | |
| 6,567,821 B1 | 5/2003 | Polk | |
| 6,615,190 B1 | 9/2003 | Slater | |
| 7,072,909 B2 | 7/2006 | Polk | |
| 7,165,049 B2 | 1/2007 | Slater | |
| 7,174,315 B2 | 2/2007 | Phillips et al. | |
| 7,225,155 B1 | 5/2007 | Polk | |
| 7,317,823 B1 | 1/2008 | Price et al. | |
| 2002/0032651 A1 | 3/2002 | Embrey | |
| 2002/0038289 A1 | 3/2002 | Lawlor et al. | |
| 2002/0046074 A1 * | 4/2002 | Barton | 705/8 |

OTHER PUBLICATIONS

Oracle EDI Gateway, User's Guide, Release 11, Mar. 1998, Oracle®.*

Oracle Payroll, User's Guide, Release 11, vol. 1, Mar. 1998, Oracle®.*

Jessica Pearson, Ph.D., Evaluation of Colorado's Credit Bureau Reporting Initiative, Apr. 25, 1997.*

U.S. District Court, District of Minnesota Civ. Action No. 02-CV-1321 DWF/JSM: *Pay Child Support Online Inc. v. ACS State & Local Solutions, Inc.*, ACS's Memorandum of Law in Support of its Motion for Summary Judgment of Validity and Literal Infringement, 29 pages, Sep. 16, 2003 (Exhibit A).

U.S. District Court, District of Minnesota Civ. Action No. 02-CV-1321 DWF/JSM: *Pay Child Support Online Inc. v. ACS State & Local Solutions, Inc.*, PCSO, PSI and Hill's Memorandum of Law Opposing Motion for Summary Judgment, 31 pages, Oct. 21, 2003 (Exhibit B).

U.S. District Court, District of Minnesota Civ. Action No. 02-CV-1321 DWF/JSM: *Pay Child Support Online inc. v. ACS State & Local Solutions, Inc.*, ACS' Reply Memorandum in Support of its Motion for Summary Judgment of Validity and Literal Infringement, 22 pages, Oct. 28, 2003 (Exhibit C).

U.S. District Court, District of Minnesota Civ. Action No. 02-CV-1321 DWF/JSM: *Pay Child Support Online Inc. v. ACS State & Local Solutions, Inc.*, Order, 2 pages, Dec. 12, 2003 (Exhibit D).

U.S. District Court, District of Minnesota Civ. Action No. 02-CV-1321 DWF/JSM: *Pay Child Support Online Inc. v. ACS State & Local Solutions, Inc.*, ACS's Supplemental Brief on Obviousness in Support of ACS'Motion for Summary Judgment, 14 pages, Jan. 12, 2004 (Exhibit E).

U.S. District Court, District of Minnesota Civ. Action No. 02-CV-1321 DWF/JSM: *Pay Child Support Online Inc. v. ACS State & Local Solutions, Inc.*, PCSO, PSI and Hill's Brief Regarding Obviousness, 10 pages, Jan. 12, 2004 (Exhibit F).

U.S. District Court, District of Minnesota Civ. Action No. 02-CV-1321 DWF/JSM: *Pay Child Support Online Inc. v. ACS State & Local Solutions, Inc.*, ACS's Response to the New Issues Raised in PCSO's Supplemental Brief on Obviousness, 8 pages, Jan. 23, 2004 (Exhibit G).

U.S. District Court, District of Minnesota Civ. Action No. 02-CV-1321 DWF/JSM: *Pay Child Support Online Inc. v. ACS State & Local Solutions, Inc.*, PCSO, PSI and Hill's Response to New Issued Raised by ACS, 3 pages, Jan. 29, 2004 (Exhibit H).

U.S. District Court of Minnesota Civ. Action No. 02-CV-1321 DWF/JSM: *Pay Child Support Online Inc. v. ACS State & Local Solutions, Inc.*, Memorandum Opinion and Order, 22 pages, Apr. 5, 2004 (Exhibit I).

U.S. District Court, District of Minnesota Civ. Action No. 02-CV-1321 DWF/JSM: *Pay Child Support Online Inc. v. ACS State & Local Solutions, Inc.*, Joint Motion for Entry of Order of Judgment, 6 pages, Jul. 22, 2004 (Exhibit J).

U.S. District Court, District of Minnesota Civ. Action No. 02-CV-1321 DWF/JSM: *Pay Child Support Online Inc. v. ACS State & Local Solutions, Inc.*, Order of Judgment, 3 pages, Jul. 28, 2004 (Exhibit K).

U.S. District Court, District of Minnesota Civ. Action No. 02-CV-1321 DWF/JSM: *Pay Child Support Online Inc. v. ACS State & Local Solutions, Inc.*, Judgment in a Civil Case, 2 pages, Jul. 29, 2004 (Exhibit L).

Nickerson, J.M. & Haby, E.M., "EFT Pilot Project Design for Nebraska: The Iowa-Nebraska Electronic Funds Transfer Project," Sep. 1988.

Nickerson, J.M. & Haby, E.M., "EFT Pilot Project Design for Iowa: The Iowa-Nebraska Electronic Funds Transfer Project," Sep. 1988.

Graham, N.L. & Levy, M.A., "Implementing a Child Support Payment Center," Colo., Policy Studies Inc., Jan. 1991.

Graham, N.L. & Wegner, K.R., "The Employer Direct Deposit Pilot of the Iowa/Nebraska EFT Project," Colo., Policy Studies Inc., Jun. 1992.

"Electronic Funds Transfer Project: Final Report," Washington State Department of Social and Health Services, Oct. 1994.

"Child Support Application Banking Convention: A Guide for Employers & Their Financial Institutions," Bankers EDI Counsel, 1996.

"Child Support Application Banking Convention: A Guide for Child Support Enforcement Entities & Their Financial Institutions," Bankers EDI Council, 1997.

"Electronic transfer of funds and data [online]," May 24, 1990 [Retrieved on Jun. 9, 2002], retrieved from the Internet at: http://www.acf.dhhs.gov/programs/cse/pol/dc19013.htm.

"Electronic Funds Transfer/Electronic Data Interchange," Jun. 15, 1993 [Retrieved on Jun. 9, 2002], retrieved from the internet at: http://www.acf.dhhs.qov/proqrams/cse/pol/dc19328.htm.

"Automatic Data Processing Inc."; www.adp.com, printed Mar. 8, 2002, 8 pages.

"EFT Child Support"; www.eftchildsupport.com undated, 45 pages.

"Pay Child Support Online"; www.paychildsupportonline.com, printed Mar. 8, 2002, 10 pages.

Basics of EDI, Chapter 3, Website at http://pages.prodigy.com/edibooks/edich31.html (May 30, 1997), David Robert Lambert 1994-96.

Board of Governors of the Federal Reserve System/Washington, D.C. Website at http://www.bog.frb.fed.us/ (May 29, 1997).

CMi&s U.S. Electronic Commerce, Website at http://www.creditworthy.com/us/providers/electronic.html (Jun. 6, 1997).

Colorado Child Support Enforcement, Website at http://www.state.co.us/gov_dir/human_serbivrd_fit/VDR/vdrrmp.htm (Jun. 6, 1997).
Direct Payment Market Analysis, Website at http://www.nacha.org/marketing/dpma.htm (May 29, 1997).
EC/EDI: The Basics, Website at http://www.sbaonline.sba.gov/gopher/Ecedi/Info/eced5.txt (Jun. 6, 1997).
Electronic Commerce Resource Guide: EC/EDI Jumpstation, Website at http://www.premenos.com/Resources/Organization (May 30, 1997).
Knudson et al.: "Business-to-business payments and the role of financial electronic data interchange"; Federal Reserve Bulletin, Apr. 1994, vol. 80, No. 4, pp. 269-278.
The National Automated Clearing House Association, Website at http://www.nacha.org/nacha/nacha.htm (May 29, 1997).
VANs (Value-Added Networks), Website at http://ganges.cs.tcd.ie/4ba2/edi/www_vans.html (May 30, 1997).
Graham et al.: "The Employer Direct Deposit Pilot of the Iowa/Nebraska EFT Project," Colo., Policy Studies Inc., Jun. 1992, 156 pages. containing printed subject matter.
Complaint Seeking Declaratory Judgement Under Title 35 of US Code, Civil Action No. 02-CV-1321 DWF/SRN, United States District Court for the District of Minnesota, Jun. 21, 2002 (27 pages) (Attachment A).
Defendant and Counter-Plaintiff ACS State & Local Solutions, Inc.'s Answer and Counterclaim, Civil Action No. 02-CV-1321 DWF/SRN, United States District Court for the District of Minnesota, Jul. 31, 2002 (112 pages) (Attachment B).
Memorandum in Support of Plaintiff and Counter-Defendant's Motion to Dismiss, Civil Action No. 02-CV-1321 DWF/SRN, United States District Court for the District of Minnesota, Sep. 16, 2002 (27 pages) (Attachment C).
ACS State & Local Solutions, Inc.'s Opposition to the Motion to Dismiss of Pay Child Support Online Inc and Daniel J. King, Civil Action No. 02-CV-1321 DWF/SRN, United States District Court for the District of Minnesota, Oct. 7, 2002 (76 pages) (Attachment D).
Memorandum Opinion and Order, Civil Action No. 02-CV-1321 DWF/SRN, United States District Court for the District of Minnesota, Dec. 2, 2002 (8 pages) (Attachment E).
*Child Support Application Banking Convention*, The National Automated Clearing House Association, 1993, Herndon, VA (11 pages).
Summary of Apr. 14 APA ACH Committee, Apr. 19, 1994 (22 pages).
Letter by Pat Hagen, OCSE, Apr. 26, 1994 (2 pages).
Chapman, Irene, Speech for ERICSA (Eastern Region Interstate Child Support Association), New Orleans, Jun. 7, 1994 (13 pages).
Chapman, Irene, Summary of Jun. 8 Teleconference of the APA ACH Committee, Jun. 10, 2994 (2 pages).
Chapman, Irene, Child Support & Withholding and Price Costco and the Family Perspective, *The Corporate Connection*, May 1996 (4 pages).
Workshop Materials Houston Chapter of the American Payroll Association, Jul. 21, 1995 (63 pages).
Screen prints from City of Houston Payroll System, Jan. 23, 1996 (14 pages).
Zeidner, Rita, Commens, American Payroll Association, Mar. 22, 1996 (6 pages).
Lang, Scott, letter regarding *Child Support Application Banking Convention: A Guide for Employers & Their Financial Institutions*, Apr. 12, 1996 (4 pages).
Camp, Dave, Letter to James Owen, Meijer, Inc., Jun. 17, 1996 (1 page).
*Program Eases Child Support Payments for Colorado*, Aug. 15, 1996 (1 page).
Bryant, Amy, Memo to Alicia Key and Cecelia Burke, Office of the Attorney General of Texas, Feb. 27, 1997 (9 pages).
Bryant, Amy, EFT/EDI Deductions for Child Support, City of Houston, Mar. 30, 1997 (65 pages).
National Child Support Enforcement Association, "State Legislatures Address PRWORA'S Child Support Requirements," NCSEA News, Summery 1997, vol. 27, No. 3 (44 pages).
Bryant, Amy, *An Employer's View Point on What is Happening with Direct Deposit of Child Support*, NCSEA News, Summer 1997 (3 pages).

Amorette N. Bryant, Draft of Article for American Payroll Association, *First Hand Experience—Implementing Direct Deposit of Child Support Payments*, undated (6 pages).
*The Guide to Successful Direct Deposit*, 13$^{th}$ Ed., American Payroll Association, Mar. 1, 2000 (301 pages).
"Standing Tall for Children," Conference Notebook, NCSEA 46$^{th}$ Annual Conferencve & Exposition, Phoenix, Arizona, Aug. 1997 (453 pages).
Polk, John D., Centralized Collection/Disbursement, NCSEA Conference Notebook, Aug. 1997 (18 pages).
NCSEA 45$^{th}$ Conference Notebook, "Putting Children in the Winners Circle," Louisville, Kentucky Aug. 1996 (434 pages).
John D. Polk, Central Payment Processing: a Sure Bet, NCSEA Conference Notebook, Louisville, Kentucky, Aug. 1996 (4 pages).
Office of Child Support Enforcement web page, Dec. 20, 1994 (12 pages).
Defense Finance and Accounting Service (www.dfas.mil), Garnishment (Apr. 15, 2003), printed Apr. 16, 2003 (4 pp.).
Defense Finance and Accounting Service (www.dfas.mil), Child Support and Alimony (Apr. 11, 2003), printed Apr. 16, 2003 (5 pp.).
Defense Finance and Accounting Service (www.dfas.mil), a Quick Guide to Working with the Military as an Employer, printed Apr. 16, 2003 (15 pp.).
Defense Finance and Accounting Service (www.dfas.mil), Electronic Commerce (Feb. 27, 2003), printed Apr. 16, 2003 (4pp.).
Defense Finance and Accounting Service (www.dfas.mil), Commercial Debt Garnishment from Federal Civilian Employees (Apr. 11, 2003), printed Apr. 11, 2003 (6 pp.).
Defense Finance and Accounting Service (www.dfas.mil), Involuntary Allotment from Military Personnel for Commercial Debt (Apr. 11, 2003), printed Apr. 16, 2003 (5 pp.).
Garber, T., "EDI: A Weapon in the War Against Delinquent Child Support," Today: The Journal of Work Process Improvement, pp. 18-19, Oct. 1997.
"Child Support Agency Doesn't Kid Around with Standardized Form," PaytecH, p. 11, Mar./Apr. 1998.
"Standards Governing EC/EDI," Chapter 6, Website at http://net.gap.net/ch6.htm (Jan. 16, 1998).
"ANSI X12 Standards for EDI," Website at http://www.gap.net/ansix12.htm (Jan. 16, 1998).
"EDI Architecture and Document Flow," Website at http://www.acq.osd.mil/ec/edu/edu_03.html (Jan. 16, 1998).
Sidac, Spring 1997 Newsletter, Website at http://www.sidac.wpafb.af.mil/newsletter/spr97.html (Jan. 16, 1998).
Electronic Commerce and Electronic Data Interchange Handbook, Website at http://www.acq.osd.mil/ec/newhandbook/preface/preface.htm (Jan. 16, 1998).
521 Income or Asset Offset, 521B026, pp. 1-46, May 15, 1997.
"1996 ACH Rules", published by National Automated Clearing House Association, Corporate Edition. (215 pages).
"ADP PC/Payroll for Windows", published by Automatic Data Processing, Inc., 1997, (10 pages).
"Child Support Application Banking Convention: a Guide for Employers and Their Financial Institutions", published by Bankers EDI Council, 1996, (22 pages).
"New Hire Reporting", published by Automatic Data Processing, Inc., 1997, (2 pages).
"Wage Garnishment Processing Service", published by Automatic Data Processing, Inc., 1996, (2 pages).
EDI Top Twenty "Questions and Answers about Electronic Data Interchange" pamphlet published by Automated Clearing House Association, no date (6 pages).
National Child Support Enforcement Association, NCSEA News, Summer 1997 Conference Edition, vol. XXVII, No. 3 (4 pages).
Public Law 104-193—Aug. 22, 1996, 110 STAT. 2105, 104$^{th}$ Congress (251 pages).
Complaint for Declaratory Judgment and Patent Infringement, *JPMorgan Chase & Co. et al. v. Affiliated Computer Services, Inc. et al.*; (U.S.D.C. Del., Apr. 2008) (33 pages).
Colorado Child Support Enforcement "Building a Child's Future", Employer's Guide, dated Jun. 6, 1997, (2 pages).
Public Law 100-485—Oct. 13, 1988, 102 STAT. 2343, 100$^{th}$ Congress (87 pp.).

U.S. District Court, District of Delaware Civ. Action No. 08-189-SLR *JPMorgan Chase* v. *Affiliated Computer Services*, Answer to JP Morgan Chase's Complaint for Declaratory Judgment and Patent Infringement, (26 Pages), May 23, 2008.
U.S. District Court of Delaware Civ. Action No. 08-189-SLR *JPMorgan Chase* v. *Affiliated Computer Services*, Plaintiff's Objections and Responses to Defendants' First Set of Interrogatories, (27 pages), Aug. 4, 2008.
U.S. District Court of Delaware Civil Action No. 08cv00189-SLR; *JPMorgan Chase & Co., et al.* v. *Affiliated Computer Services, Inc., et al.*—Defendant ACS's Objections and Responses to Plaintiffs' Third Set of Requests for Production of Documents to Defendants Affiliated Computer Services, Inc. and ACS State & Local Solutions Inc., (Mar. 9, 2009), (52 pp.).
U.S. District Court of Delaware Civil Action No. 08cv00189-SLR; *JPMorgan Chase & Co., et al.* v. *Affiliated Computer Services, Inc., et al.*—Defendants Affiliated Computer Services, Inc. and ACS State & Local Solutions, Inc.'s Objections and Responses to Plaintiffs' Third Set of Interrogatories (Nos. 27-40), (Apr. 29, 2009), (44 pp.).
U.S. District Court of Delaware Civil Action No. 08cv00189-SLR; *JPMorgan Chase & Co., et al.* v. *Affiliated Computer Services, Inc., et al.*—Affiliated Computer Services, Inc. and ACS State & Local Solutions, Inc.'s Second Supplemental Initial Disclosures, (Apr. 21, 2009), (13 pages).
U.S. District Court of Delaware Civil Action No. 08cv00189-SLR; *JPMorgan Chase & Co., et al.* v. *Affiliated Computer Services, Inc., et al.*—Plaintiffs' Fourth Supplemental Objections and Responses to Defendants' Amended First Set of Interrogatories (Nos. 1-6), (Apr. 24, 2009), (21 pp.).
U.S. District Court of Delaware Civil Action No. 08cv00189-SLR; *JPMorgan Chase & Co., et al.* v. *Affiliated Computer Services, Inc., et al.*—Answer to ACS's First Amended Counterclaims, (Mar. 18, 2009), (16 pp.).
U.S. District Court of Delaware Civil Action No. 08cv00189-SLR; *JPMorgan Chase & Co., et al.* v. *Affiliated Computer Services, Inc., et al.*—Second Amended Answer and Counterclaims to JPMorgan Chase's First Amended and Supplemental Complaint for Declaratory Judgment and Patent Infringement (Redacted public version), (Apr. 3, 2009), (46 pp.).
U.S. District Court of Delaware Civil Action No. 08cv00189-SLR; *JPMorgan Chase & Co., et al.* v. *Affiliated Computer Services, Inc., et al.*—Second Amended Answer and Counterclaims to JPMorgan Chase's First Amended and Supplemental Complaint for Declaratory Judgment and Patent Infringement (Redacted public version), (Apr. 3, 2009), (49 pp.).
U.S. District Court of Delaware Civil Action No. 08cv00189-SLR; *JPMorgan Chase & Co., et al.* v. *Affiliated Computer Services, Inc., et al.*—Second Amended and Supplemental Complaint for Declaratory Judgment and Patent Infringement, (Apr. 2, 2009), (45 pp.).
U.S. District Court of Delaware Civil Action No. 08cv00189-SLR; *JPMorgan Chase & Co., et al.* v. *Affiliated Computer Services, Inc., et al.*—Exhibits to Second Amended and Supplemental Complaint for Declaratory Judgment and Patent Infringement—vol. 3—Exhibits O-W, (Apr. 2, 2009), (2 pp.).
U.S. District Court of Delaware Civil Action No. 08cv00189-SLR; *JPMorgan Chase & Co., et al.* v. *Affiliated Computer Services, Inc., et al.*—Harry W. Wiggins, Prepared Statement of Harry W. Wiggins, Vice President, Child Support Services, Lockheed Martin Ims Children and Family Services Before the House Government Reform and Oversight Committee Human Resources Subcommittee—"Social Service Privatization: The Benefits and Challenges to Child Support Enforcement Programs", Federal Information Systems Corporation Federal News Service, Section: In the News (Nov. 4, 1997), (8 pp.), (Exhibit P).
U.S. District Court of Delaware Civil Action No. 08cv00189-SLR; *JPMorgan Chase & Co., et al.* v. *Affiliated Computer Services, Inc., et al.*—Steven Marjanovic, Bottomline Taps Lockheed to Market Software That Deducts Child Support, American Banker, Inc., the American Banker, Section: Technology/Operations; p. 15 (Jul. 12, 1996), (2 pp.), (Exhibit Q).
U.S. District Court of Delaware Civil Action No. 08cv00189-SLR; *JPMorgan Chase & Co., et al.* v. *Affiliated Computer Services, Inc.,*

*et al.*—PMR news briefs, IOMA Payroll Manager's Report, Section: p. 13 (Sep. 4, 1997), (3 pp.), (Exhibit R).
U.S. District Court of Delaware Civil Action No. 08cv00189-SLR; *JPMorgan Chase & Co., et al.* v. *Affiliated Computer Services, Inc., et al.*—States, Counties Automate Child Support Processing, 2008 Factiva, Inc., (Aug. 1, 1996), (3 pp.), (Exhibit S).
U.S. District Court of Delaware Civil Action No. 08cv00189-SLR; *JPMorgan Chase & Co., et al.* v. *Affiliated Computer Services, Inc., et al.*—Metropolitan Digest/Los Angeles County News in Brief: Los Angeles County; New Computer Keeps Track of Child Support Payments, the Times Mirror Company; Los Angeles Times, Section: Metro; Part B; p. 2; Metro Desk (Mar. 9, 1995), (2 pp.), (Exhibit T).
U.S. District Court of Delaware Civil Action No. 08cv00189-SLR; *JPMorgan Chase & Co., et al.* v. *Affiliated Computer Services, Inc., et al.*—Carla Rivera, Electronic Child Support System Unveiled; Government: Critics Say New Computer System Is Plagued With Problems and May Be Inadequate. A Few Bugs Just Need to Be Worked Out, District Attorney Responds, the Times Mirror Company; Los Angeles Times, Section: Metro; Part B; p. 1; Metro Desk (Mar. 10, 1995), (3 pages), (Exhibit U).
U.S. District Court of Delaware Civil Action No. 08cv00189-SLR; *JPMorgan Chase & Co., et al.* v. *Affiliated Computer Services, Inc., et al.*—Dan Morain, State to Stay With Child-Support Computer Setup; Technology: Tracking System Is Incomplete and Consultant Lists 1,400 Problems, But Official Defends Project, Times Mirror Company; Los Angeles Times, Section: Part A; p. 3; Metro Desk (May 2, 1997), (3 pp.), (Exhibit V).
U.S. District Court of Delaware Civil Action No. 08cv00189-SLR; *JPMorgan Chase & Co., et al.* v. *Affiliated Computer Services, Inc., et al.*—Lockheed Martin IMS Retains Landmark Child Support Payment processing Contract in Los Angeles County; * Awarded three-year, $24 million contract * Processes more than $350 million annually for Los Angeles County * is nation's oldest, privatized child support payment processing operation, PR Newswire Association, Inc., PR Newswire, Section: State and Regional News (Dec. 4, 2000), (3 pp.), (Exhibit W).
U.S. District Court of Delaware Civil Action No. 08cv00189-SLR; *JPMorgan Chase & Co., et al.* v. *Affiliated Computer Services, Inc., et al.*—Attachment A1, U.S. Patent No. 7,317,823 Claim Chart (ACS's Identification of Prior Art, '823 Patent), (23 pp.).
U.S. District Court of Delaware Civil Action No. 08cv00189-SLR; *JPMorgan Chase & Co., et al.* v. *Affiliated Computer Services, Inc., et al.*—Attachment A2, U.S. Patent No. 5,917,965 Claim Chart (ACS's Identification of Prior Art, '965 Patent), (60 pp.).
U.S. District Court of Delaware Civil Action No. 08cv00189-SLR; *JPMorgan Chase & Co., et al.* v. *Affiliated Computer Services, Inc., et al.*—Attachment A3, Access Card '190 (51 pp.).
U.S. District Court of Delaware Civil Action No. 08cv00189-SLR; *JPMorgan Chase & Co., et al.* v. *Affiliated Computer Services, Inc., et al.*—Attachment A4, Access Card '049 (36 pp.).
U.S. District Court of Delaware Civil Action No. 08cv00189-SLR; *JPMorgan Chase & Co., et al.* v. *Affiliated Computer Services, Inc., et al.*—Attachment A5, Access Card '315 (36 pp.).
U.S. District Court of Delaware Civil Action No. 08cv00189-SLR; *JPMorgan Chase & Co., et al.* v. *Affiliated Computer Services, Inc., et al.*—Attachment A6, DPC '190 (58 pp.).
U.S. District Court of Delaware Civil Action No. 08cv00189-SLR; *JPMorgan Chase & Co., et al.* v. *Affiliated Computer Services, Inc., et al.*—Attachment A7, DPC '049 (39 pp.).
U.S. District Court of Delaware Civil Action No. 08cv00189-SLR; *JPMorgan Chase & Co., et al.* v. *Affiliated Computer Services, Inc., et al.*—Attachment A8, DPC '315 (33 pp.).
U.S. District Court of Delaware Civil Action No. 08cv00189-SLR; *JPMorgan Chase & Co., et al.* v. *Affiliated Computer Services, Inc., et al.*—Attachment A9, SAS '190 (68 pp.).
U.S. District Court of Delaware Civil Action No. 08cv00189-SLR; *JPMorgan Chase & Co., et al.* v. *Affiliated Computer Services, Inc., et al.*—Attachment A10, SAS '049 (43 pp.).
Amy Hendershott, Child Support Enforcement in West Virginia, West Virginia University, Department of Sociology and Anthropology, (Dec. 2000), (66 pp.).
U.S. District Court of Delaware Civil Action No. 08cv00189-UNA; *JPMorgan Chase & Co., et al.* v. *Affiliated Computer Services, Inc.,*

*et al.*—Jeffrey Norwine's Objections and Responses to Defendant's Second amended Notice of Rule 30(b)(1) Deposition and Subpoena Duces Tecum of Jeffrey Norwine, dated Jun. 16, 2009 (13 pp.).

U.S. District Court of Delaware Civil Action No. 08cv00189-UNA; *JPMorgan Chase & Co., et al.* v. *Affiliated Computer Services, Inc., et al.*—ACS's Objections and Responses to Plaintiffs Notice to Take Deposition of Affiliated Computer Services, Inc. and ACS State and Local Solutions, Inc., dated May 26, 2009 (36 pp.).

U.S. District Court of Delaware Civil Action No. 08cv00189-UNA; *JPMorgan Chase & Co., et al.* v. *Affiliated Computer Services, Inc., et al.*—Stephen T. Schreiner's Objections and Responses to Defendant's Notice of Rule 30(b)(1) Deposition and Subpoena Duces Tecum of Stephen T. Schreiner, dated May 26, 2009 (7 pp.).

U.S. District Court of Delaware Civil Action No. 08cv00189-UNA; *JPMorgan Chase & Co., et al.* v. *Affiliated Computer Services, Inc., et al.*—Thomas Bradshaw's Objections and Responses to Defendant's Notice of Rule 30(b)(1) Deposition and Subpoena Duces Tecum of Thomas Bradshaw, dated May 26, 2009 (7 pp.).

U.S. District Court of Delaware Civil Action No. 08cv00189-UNA; *JPMorgan Chase & Co., et al.* v. *Affiliated Computer Services, Inc., et al.*—Kim Slater's Objections and Responses to Defendant's Notice of Rule 30(b)(1) Deposition and Subpoena Duces Tecum of Kim Slater, dated May 18, 2009 (12 pp.).

U.S. District Court of Delaware Civil Action No. 08cv00189-UNA; *JPMorgan Chase & Co., et al.* v. *Affiliated Computer Services, Inc., et al.*—Plaintiff's Objections to Defendant's Second Notice of Rule 30(b)(6) Deposition of Plaintiff JPMorgan, dated May 15, 2009 (19 pp.).

U.S. District Court of Delaware Civil Action No. 08cv00189-UNA; *JPMorgan Chase & Co., et al.* v. *Affiliated Computer Services, Inc., et al.*—Plaintiff's Objections to Defendant's First Notice of Rule 30(b)(6) Deposition of Plaintiff JPMorgan, dated May 15, 2009 (19 pp).

U.S. District Court of Delaware Civil Action No. 08cv00189-UNA; *JPMorgan Chase & Co., et al.* v. *Affiliated Computer Services, Inc., et al.*—Plaintiff's Answer to ACS's Third Amended Counterclaims, dated May 15, 2009 (18 pp.).

U.S. District Court of Delaware Civil Action No. 08cv00189-UNA; *JPMorgan Chase & Co., et al.* v. *Affiliated Computer Services, Inc., et al.*—Redacted Version of Defendant's Answer and Counterclaims to JPMorgan Chase's Second Amended Complaint for Declaratory Judgment and Patent Infringement, dated May 8, 2009 (49 pp.).

U.S. District Court of Delaware Civil Action No. 08cv00189-UNA; *JPMorgan Chase & Co., et al.* v. *Affiliated Computer Services, Inc., et al.*—Plaintiff's First Supplemental Objections and Responses to Defendant's Fifth Set of Interrogatories, dated Jun. 5, 2009, (19 pp).

U.S. District Court of Delaware Civil Action No. 08cv00189-UNA; *JPMorgan Chase & Co., et al.* v. *Affiliated Computer Services, Inc., et al.*—Defendant's Objections to Plaintiffs Third Notice of Deposition of Defendants, dated Jun. 2, 2009, (24 pp).

United States District Court for the District of Delaware, Civil Action No. 08-189-SLR (*JPMordan Chase & Co. et al.* v. *Affiliated Computer Services, Inc., and ACS State & Local Solutions, Inc.*), "Joint Claim.Construction Statement," dated Sep. 18, 2009 (35 pages).

Office Action, dated Dec. 9, 1998, for U.S. Appl. No. 08/941,187, filed Sep. 30, 1997 (17 pages).

Notice of Allowance, dated May 11, 1999, containing statement of reasons for allowance, for U.S. Appl. No. 08/941,187, filed Sep. 30, 1997 (6 pages).

Office Action, dated Dec. 31, 1998, for U.S. Appl. No. 09/003,941, filed Jan. 7, 1998 (7 pages).

Final Office Action, dated Apr. 27, 1999, for U.S. Appl. No. 09/003,941, filed Jan. 7, 1998 (6 pages).

Office Action, dated Dec. 21, 2001, for U.S. Appl. No. 09/413,862, filed Oct. 7, 1999 (8 pages).

Office Action, dated May 8, 2003, for U.S. Appl. No. 09/413,862, filed Oct. 7, 1999 (7 pages).

Office Action, dated Dec. 5, 2003, for U.S. Appl. No. 09/413,862, filed Oct. 7, 1999 (10 pages).

Final Office Action, dated Sep. 29, 2004, for U.S. Appl. No. 09/413,862, filed Oct. 7, 1999 (10 pages).

Office Action, dated Aug. 10, 2006, for U.S. Appl. No. 09/413,832, filed Oct. 7, 1999 (8 pages).

Notice of Allowance, dated Mar. 2, 2007, containing statement of reasons for allowance, for U.S. Appl. No. 09/413,862, filed Oct. 7, 1999 (5 pages).

Office Action, dated Feb. 5, 2003, for U.S. Appl. No. 09/973,865, filed Oct. 11, 2001 (6 pages).

Office Action, dated Dec. 5, 2003, for U.S. Appl. No. 09/973,865, filed Oct. 11, 2001 (7 pages).

Final Office Action, dated Oct. 12, 2004, for U.S. Appl. No. 09/973,865, filed Oct. 11, 2001 (4 pages).

Office Action, dated Aug. 23, 2006, for U.S. Appl. No. 09/973,865, filed Oct. 11, 2001 (7 pages).

Office Action, dated Apr. 6, 2007, for U.S. Appl. No. 09/973,865, filed Oct. 11, 2001 (5 pages).

Notice of Allowance, dated Jan. 9, 2009, and allowed claims, for U.S. Appl. No. 09/973,865, filed Oct. 11, 2001 (15 pages).

Notice of Allowance, dated Aug. 28, 2009, for U.S. Appl. No. 09/973,865, filed Oct. 11, 2001 (4 pages).

Office Action, dated Jun. 19, 2002, for U.S. Appl. No. 09/975,241, filed Oct. 12, 2001 (9 pages).

Office Action, dated Jan. 14, 2003, for U.S. Appl. No. 09/975,241, filed Oct. 12, 2001 (7 pages).

Office Action, dated Dec. 3, 2003, for U.S. Appl. No. 09/975,241, filed Oct. 12, 2001 (9 pages).

Final Office Action, dated Nov. 3, 2004, for U.S. Appl. No. 09/975,241, filed Oct. 12, 2001 (6 pages).

Notice of Allowance, dated Jan. 9, 2009, and allowed claims, for U.S. Appl. No. 09/975,241, filed Oct. 12, 2001 (14 pages).

Notice of Allowance, dated May 14, 2009, for U.S. Appl. No. 09/975,241, filed Oct. 12, 2001 (4 pages).

Office Action, dated Aug. 21, 2008, for U.S. Appl. No. 10/374,968, filed Feb. 28, 2003 (10 pages).

Office Action, dated Mar. 3, 2009, for U.S. Appl. No. 10/374,968, filed Feb. 28, 2003 (5 pages).

Notice of Allowance, dated Dec. 8, 2009, and allowed claims, for U.S. Appl. No. 10/374,968, filed Feb. 28, 2003 (12 pages).

Office Action, dated Oct. 1, 2001, for U.S. Appl. No. 09/200,943, filed Nov. 30, 1998 (10 pages).

Final Office Action, dated Jan. 7, 2002, for U.S. Appl. No. 09/200,943, filed Nov. 30, 1998, (7 pages).

Notice of Allowance, dated Mar. 4, 2002, containing statement of reasons for allowance, for U.S. Appl. No. 09/200,943, filed Nov. 30, 1998 (6 pages).

Office Action, dated Dec. 10, 2002, for U.S. Appl. No. 09/200,943, filed Nov. 30, 1998 (8 pages).

Office Action, dated Oct. 6, 2004, for U.S. Appl. No. 10/155,965, filed May 29, 2002 (33 pages).

Office Action, dated Aug. 24, 2005, for U.S. Appl. No. 10/155,965, filed May 29, 2002 (45 pages).

Notice of Allowance, dated Feb. 14, 2006, containing statement of reasons for allowance, for U.S. Appl. No. 10/155,965, filed May 29, 2002 (16 pages).

Office Action, dated Aug. 28, 2007, for U.S. Appl. No. 11/438,443, filed May 23, 2006 (15 pages).

Final Office Action, dated Jul. 8, 2008, for U.S. Appl. No. 11/438,443, filed May 23, 2006 (16 pages).

Notice of Allowance, dated Jul. 28, 2009, containing statement of reasons for allowance, for U.S. Appl. No. 11/438,443, filed May 23, 2006 (15 pages).

Office Action, dated Apr. 4, 2007, for U.S. Appl. No. 10/043,493, filed Jan. 14, 2002 (13 pages).

Final Office Action, dated Oct. 31, 2007, for U.S. Appl. No. 10/043,493, filed Jan. 14, 2002 (12 pages).

Office Action, dated Apr. 11, 2008, for U.S. Appl. No. 10/043,493, filed Jan. 14, 2002 (10 pages).

Final Office Action, dated Nov. 5, 2008, for U.S. Appl. No. 10/043,493, filed Jan. 14, 2002 (7 pages).

Advisory Action, dated Jan. 28, 2009, for U.S. Appl. No. 10/043,493, filed Jan. 14, 2002 (3 pages).

Notice of Allowance, dated Jun. 11, 2009, containing statement of reasons for allowance, for U.S. Appl. No. 10/043,493, filed Jan. 14, 2002 (7 pages).

Notice of Allowance, dated Oct. 5, 2009, and allowed claims, for U.S. Appl. No. 10/043,493, filed Jan. 14, 2002 (13 pages).

Office Action, dated Oct. 18, 2007, for U.S. Appl. No. 10/259,746, filed Sep. 30, 2002 (6 pages).
Final Office Action, dated May 8, 2008, for U.S. Appl. No. 10/259,746, filed Sep. 30, 2002 (9 pages).
Office Action, dated Dec. 30, 2008, for U.S. Appl. No. 10/259,746, filed Sep. 30, 2002 (8 pages).
Supplemental Office Action, dated Feb. 27, 2009, for U.S. Appl. No. 10/259,746, filed Sep. 30, 2002 (3 pages).
Notice of Allowance, dated Sep. 21, 2009, containing statement of reasons for allowance, for U.S. Appl. No. 10/259,746, filed Sep. 30, 2002 (12 pages).
Notice of Allowance, dated Dec. 29, 2009, containing statement of reasons for allowance, for U.S. Appl. No. 10/259,746, filed Sep. 30, 2002 (6 pages).
"Lockheed Martin IMS & Bottomline Technologies Providing Employers with Electronic System for Garnishing Paychecks of Parents Owing Child Support," Jul. 9, 1996 (3 pp.).
"Business Bulletin, A Special Background Report on Trends in Industry and Finance," *Wall Street Journal*, Eastern Edition, Thursday, Jul. 18, 1996, Princeton, New Jersey (1 p.).
United States District Court for the District of Delaware, Civil Action No. 08-189-SLR (*JPMorgan Chase & Co. et al.* v. *Affiliated Computer Services, Inc. and ACS State & Local Solutions, Inc.*), Stipulation of Partial Dismissal Pursuant to Fed. R. Civ. P. 41(a)(1)(a)(ii) Based on Covenant and Agreement Not to Sue, dated Jul. 27, 2009 (5 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Plaintiffs Unopposed Motion for Leave to File Its Third Amended and Supplemental Complaint, dated Oct. 8, 2009 (71 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Public Version of vol. 1 of Exhibits to Third Amended and Supplemental Complaint for Declaratory Judgment and Patent Infringement, Exhibits A-F, dated Oct. 14, 2009 (273 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Public Version of vol. 2 of Exhibits to Third Amended and Supplemental Complaint—Exhibits G-N, dated Oct. 14, 2009 (122 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Public Version of vol. 3 of Exhibits to Third Amended and Supplemental Complaint—Exhibits O-W, dated Oct. 14, 2009 (353 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Public Version of vol. 4 of Exhibits to Third Amended and Supplemental Complaint—Exhibits X-PP, dated Oct. 14, 2009 (209 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), ACS's Second.Supplemental Objections and Responses to Plaintiff's First Amended and Consolidated Interrogatory 13 to Defendants Affiliated Computer Services, Inc. and ACS State & Local Solutions, Inc., dated Oct. 19, 2009 (74 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), ACS's Objections and Responses to Plaintiffs' Supplemental Fifth Set of Interrogatories to Defendants Affiliated Computer Services, Inc. and ACS State & Local Solutions, Inc., dated Oct. 19, 2009 (17 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Public Version of Third Amended and Supplemental Complaint for Declaratory Judgment and Patent Infringement, dated Oct. 21, 2009 (63 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Public Version of vol. 1 of Exhibits to Third Amended and Supplemental Complaint—Exhibits A-F, dated Oct. 21, 2009 (273 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Public Version of vol. 2 of Exhibits to Third Amended and Supplemental Complaint—Exhibits G-N, dated Oct. 21, 2009 (122 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Public Version of vol. 3 of Exhibits to Third Amended and Supplemental Complaint—Exhibits O-W, dated Oct. 21, 2009 (353 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Public Version of vol. 4 of Exhibits to Third Amended and Supplemental Complaint—Exhibits X-PP, dated Oct. 21, 2009 (209 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), ACS's Fifth Supplemental Objections and Responses to Plaintiff's First Amended and Consolidated Set of Interrogatories to Defendants Affiliated Computer Services, Inc. and ACS State & Local Solutions, Inc., dated Oct. 29, 2009 (42 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Answer and Counterclaim to JPMorgan Chase's Third Amended and Supplemental Complaint for Declaratory Judgment and Patent Infringement, dated Oct. 30, 2009 (56 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), JPMorgan's Opening Claim Construction Brief, dated Nov. 6, 2009 (46 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Defendant ACS's Opening Brief on Claim Construction, dated Nov. 6, 2009 (67 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), Stipulation of Partial Dismissal Pursuant to Fed.R.Civ.P. 41(a)(1)(a)(ii) Based on Covenant and Agreement Not to Sue, dated Nov. 17, 2009 (7 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), ACS's First Supplemental Objections and Responses to Plaintiffs Fourth Set of Interrogatories to Defendants Affiliated Computer Services, Inc. and ACS State & Local Solutions, Inc. (No. 41), dated Nov. 18, 2009 (12 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), ACS's Sixth Supplemental Objections and Responses to Plaintiff's First Amended and Consolidated Set of Interrogatories to Defendants Affiliated Computer Services, Inc. and ACS State & Local Solutions, Inc., dated Nov. 18, 2009 (139 pp.).
United States District Court for the District of Delaware, Civil Action No. 08-189-SLR (*JPMorcian Chase & Co. et al.* v. *Affiliated Computer Services, Inc. and ACS State & Local Solutions, Inc.*), ACS's First Supplemental Objections and Responses to Plaintiff's Third Set of Interrogatories to Defendants Affiliated Computer Services, Inc. and ACS State & Local Solutions, Inc. (Nos. 27-40), dated Nov. 18, 2009 (61 pp.).
United States District Court for the District of Delaware, Civil Action No. 08-189-SLR (*JPMorgan Chase & Co. et al.* v. *Affiliated Computer Services, Inc. and ACS State & Local Solutions, Inc.*), ACS's Fifth Supplemental Objections and Responses to Plaintiff's Second Set of Interrogatories to Defendants Affiliated Computer Services, Inc. and ACS State & Local Solutions, Inc., dated Nov. 18, 2009 (89 pp.).

U.S. District Court of Delaware Civil Action No. 08cv00189-UNA; *JPMorgan Chase & Co., et al.* v. *Affiliated Computer Services, Inc., et al.*—Complaint for Declaratory Judgment and Patent Infringement, (Apr. 4, 2008), (33 pp.).

U.S. District Court of Delaware Civil Action No. 08cv00189-UNA; *JPMorgan Chase & Co., et al.* v. *Affiliated Computer Services, Inc., et al.*—Letter dated Nov. 7, 2007 from ACS State and Local Solutions, Inc. to JPMorgan Chase & Co. regarding payment processing patents held by ACS State & Local Solutions, Inc., (1 p.), (Exhibit I).

U.S. District Court of Delaware Civil Action No. 08cv00189-UNA; *JPMorgan Chase & Co., et al.* v. *Affiliated Computer Services, Inc., et al.*—Letter dated Nov. 19, 2007 from JPMorgan Chase & Co., to ACS State and Local Solutions, Inc. regarding payment processing patents held by ACS State & Local Solutions, Inc. and Federal Express Receipt Tracking No. 790385857370, (2 pp.), (Exhibit J).

U.S. District Court of Delaware Civil Action No. 08cv00189-UNA; *JPMorgan Chase & Co., et al.* v. *Affiliated Computer Services, Inc., et al.*—Payment Processing Patents—Lotus Notes, Nov. 21, 2007, (1 p.), (Exhibit K).

U.S. District Court of Delaware Civil Action No. 08cv00189-UNA; *JPMorgan Chase & Co., et al.* v. *Affiliated Computer Services, Inc., et al.*—EPPICard—the safe and secure way to access your payments!, www.eppicard.com; (Apr. 3, 2008) (1 p.); Civil Cover Sheet (2 pp.); Civil Action No. 08-189, Acknowledgement of Receipt for AO Form 85, Notice of Availability of a United States Magistrate Judge to Exercise Jurisdiction, (1 p.), (Exhibit L).

U.S. District Court of Delaware Civil Action No. 08cv00189-SLR; *JPMorgan Chase & Co., et al.* v. *Affiliated Computer Services, Inc., et al.*—Answer to JPMorgan Chase's Complaint for Declaratory Judgment and Patent Infringement, (May 23, 2008), (26 pp.).

U.S. District Court of Delaware Civil Action No. 08cv00189-SLR; *JPMorgan Chase & Co., et al.* v. *Affiliated Computer Services, Inc., et al.*—Answer to Counterclaims for Declaratory Judgment, (Jun. 2, 2008), (6 pp.).

U.S. District Court of Delaware Civil Action No. 08cv00189-SLR; *JPMorgan Chase & Co., et al.* v. *Affiliated Computer Services, Inc., et al.*—Defendant ACS's Unopposed Motion for Leave to Amend Answer and Counterclaims, (Aug. 4, 2008), (4 pp.).

U.S. District Court of Delaware Civil Action No. 08cv00189-SLR; *JPMorgan Chase & Co., et al.* v. *Affiliated Computer Services, Inc., et al.*—First Amended Answer and Counterclaims to JPMorgan Chase's Complaint for Declaratory Judgment and Patent Infringement, (Aug. 8, 2008), (28 pp.); Certificate of Service, (Aug. 8, 2008), (1 p.).

U.S. District Court of Delaware Civil Action No. 08cv00189-SLR; *JPMorgan Chase & Co., et al.* v. *Affiliated Computer Services, Inc., et al.*—Answer to Amended Counterclaims for Declaratory Judgment and Patent Infringement, (Aug. 22, 2008), (11 pp.).

U.S. District Court of Delaware Civil Action No. 08cv00189-SLR; *JPMorgan Chase & Co., et al.* v. *Affiliated Computer Services, Inc., et al.*—Plaintiff's Motion for Leave to File Amended and Supplemental Complaint, (Aug. 28, 2008), (3 pp.).

U.S. District Court of Delaware Civil Action No. 08cv00189-SLR; *JPMorgan Chase & Co., et al.* v. *Affiliated Computer Services, Inc., et al.*—First Amended and Supplemental Complaint for Declaratory Judgment and Patent Infringement, (Aug. 28, 2008), (42 pp.).

U.S. District Court of Delaware Civil Action No. 08cv00189-SLR; *JPMorgan Chase & Co., et al.* v. *Affiliated Computer Services, Inc., et al.*—First Amended and Supplemental Complaint for Declaratory Judgment and Patent Infringement, (Aug. 28, 2008), (47 pp.), (Exhibit 2).

U.S. District Court of Delaware Civil Action No. 08cv00189-SLR; *JPMorgan Chase & Co., et al.* v. *Affiliated Computer Services, Inc., et al.*—[Proposed] Order, (_/_/08), (2 pp.); Rule 7.1.1 Statement, (Aug. 28, 2008), (2 pp.), (Exhibit 3).

U.S. District Court of Delaware Civil Action No. 08cv00189-SLR; *JPMorgan Chase & Co., et al.* v. *Affiliated Computer Services, Inc., et al.*—Exhibits to First Amended and Supplemental Complaint for Declaratory Judgment and Patent Infringement—vol. 1—Exhibits A-F, (Aug. 28, 2008), (2 pp.).

U.S. District Court of Delaware Civil Action No. 08cv00189-SLR; *JPMorgan Chase & Co., et al.* v. *Affiliated Computer Services, Inc., et al.*—Exhibits to First Amended and Supplemental Complaint for Declaratory Judgment and Patent Infringement—vol. 2—Exhibits G-N, (Aug. 28, 2008), (2 pp.).

U.S. District Court of Delaware Civil Action No. 08cv00189-SLR; *JPMorgan Chase & Co., et al.* v. *Affiliated Computer Services, Inc., et al.*—Exhibits to First Amended and Supplemental Complaint for Declaratory Judgment and Patent Infringement—vol. 3—Exhibits O-P, (Aug. 28, 2008), (2 pp.).

U.S. District Court of Delaware Civil Action No. 08cv00189-SLR; *JPMorgan Chase & Co., et al.* v. *Affiliated Computer Services, Inc., et al.*—Letter dated Mar. 11, 2008 from ACS State and Local Solutions, Inc. to Lona S. Gros, CPPB regarding ACS Response to RFP for File No. O 51500 CP, Solicitation # 2223009 Centralized Collection Unit for the Department of Social Services, Office of Family Support, Support Enforcement Services, (filed Aug. 28, 2008), (325 pp.), (Exhibit O—Exhibit 1-11).

U.S. District Court of Delaware Civil Action No. 08cv00189-SLR; *JPMorgan Chase & Co., et al.* v. *Affiliated Computer Services, Inc., et al.*—States, Counties Automate Child Support Processing, 2008 Factiva, Inc., (Aug. 1, 1996), (filed Aug. 28, 2008), (4 pp.), (Exhibit P).

U.S. District Court of Delaware Civil Action No. 08cv00189-SLR; *JPMorgan Chase & Co., et al.* v. *Affiliated Computer Services, Inc., et al.*—Plaintiffs' Opening Brief in Support of Their Motion for Leave to File Amended and Supplemental Complaint, (Aug. 28, 2008), (10 pp.).

U.S. District Court of Delaware Civil Action No. 08cv00189-SLR; *JPMorgan Chase & Co., et al.* v. *Affiliated Computer Services, Inc., et al.*—Affiliated Computer Services, Inc. and ACS State & Local Solutions, Inc. Answer and Counterclaims to JPMorgan Chase's First Amended and Supplemental Complaint for Declaratory Judgment and Patent Infringement, (Sep. 22, 2008), (34 pp.).

U.S. District Court of Delaware Civil Action No. 08cv00189-SLR; *JPMorgan Chase & Co., et al.* v. *Affiliated Computer Services, Inc., et al.*—Answer to ACS's Counterclaims to JPMorgan's First Amended and Supplemental Complaint for Declaratory Judgment and Patent Infringement, (Oct. 9, 2008), (12 pp.).

U.S. District Court of Delaware Civil Action No. 08cv00189-SLR; *JPMorgan Chase & Co., et al.* v. *Affiliated Computer Services, Inc., et al.*—Defendant ACS's Motion for Leave to File First Amended Answer and Counterclaims to JPMorgan's First Amended and Supplemental Complaint, (Dec. 10, 2008), (3 pp.).

U.S. District Court of Delaware Civil Action No. 08cv00189-SLR; *JPMorgan Chase & Co., et al.* v. *Affiliated Computer Services, Inc., et al.*—First Amended Answer and Counterclaims to JPMorgan Chase's First Amended and Supplemental Complaint for Declaratory Judgment and Patent Infringement, (Dec. 10, 2008), (39 pp.).

U.S. District Court of Delaware Civil Action No. 08cv00189-SLR; *JPMorgan Chase & Co., et al.* v. *Affiliated Computer Services, Inc., et al.*—First Amended Answer and Counterclaims to JPMorgan Chase's First Amended and Supplemental Complaint for Declaratory Judgment and Patent Infringement, (Dec. 10, 2008), (44 pp.), (Exhibit 2).

U.S. District Court of Delaware Civil Action No. 08cv00189-SLR; *JPMorgan Chase & Co., et al.* v. *Affiliated Computer Services, Inc., et al.*—[Proposed] Order and Rule 7.1.1 Statement, (Dec. 10, 2008), (5 pp.), (Exhibit 3).

U.S. District Court of Delaware Civil Action No. 08cv00189-SLR; *JPMorgan Chase & Co., et al.* v. *Affiliated Computer Services, Inc., et al.*—Defendant ACS's Opening Brief in Support of Motion for Leave to File First Amended Answer and Counterclaims, (Dec. 10, 2008), (12 pp.).

U.S. District Court of Delaware Civil Action No. 08cv00189-SLR; *JPMorgan Chase & Co., et al.* v. *Affiliated Computer Services, Inc., et al.*—Plaintiff JPMorgan's Answering Brief in Opposition to Defendant ACS's Motion for Leave to File a First Amended Answer and Counterclaims, (Jan. 9, 2009), (37 pp.).

U.S. District Court of Delaware Civil Action No. 08cv00189-SLR; *JPMorgan Chase & Co., et al.* v. *Affiliated Computer Services, Inc., et al.*—Declaration of Stephen T. Schreiner, Esq., in Support of Plaintiff JPMorgan's Answering Brief in Opposition to Defendant ACS's Motion for Leave to File a First Amended Answer and Counterclaims, (Jan. 9, 2009), (4 pp.).

U.S. District Court of Delaware Civil Action No. 08cv00189-SLR; *JPMorgan Chase & Co., et al. v. Affiliated Computer Services, Inc., et al.*—Direct Express® Debit MasterCard®, Financial Management Service, www.fms.treas.gov/directexpresscard/index.html, (Nov. 12, 2008), filed Jan. 9, 2009, (3 pp.), (Exhibit A).

U.S. District Court of Delaware Civil Action No. 08cv00189-SLR; *JPMorgan Chase & Co., et al. v. Affiliated Computer Services, Inc., et al.*—Treasury Announces Direct Express® Debit Card for SSA and SSI Recipients, Financial Management Service, www.fms.treas.gov/afc/jan_article3.html, (Feb. 21, 2008), filed Jan. 9, 2009, (3 pp.), (Exhibit B).

U.S. District Court of Delaware Civil Action No. 08cv00189-SLR; *JPMorgan Chase & Co., et al. v. Affiliated Computer Services, Inc., et al.*—Direct Express®, Debit Card Services for Federal Benefit Recipients, Financial Agency Agreement Between the Financial Management Service U.S. Department of the Treasury and Comerica Bank, Effective Date: Jan. 3, 2008, (44 pp.), (Exhibit C).

U.S. District Court of Delaware Civil Action No. 08cv00189-SLR; *JPMorgan Chase & Co., et al. v. Affiliated Computer Services, Inc., et al.*—eVerge Group—www.eVergeGroup.com—"eVerge Group Case Study—Affiliated Computer Services," (Jan. 9, 2009), (2 pp.), (Exhibit D).

U.S. District Court of Delaware Civil Action No. 08cv00189-SLR; *JPMorgan Chase & Co., et al. v. Affiliated Computer Services, Inc., et al.*—Supplemental Information Disclosure Statement and Substitute for Form 1449A PTO, (Dec. 30, 2004), (filed Jan. 9, 2009), (14 pp.), (Exhibit E).

U.S. District Court of Delaware Civil Action No. 08cv00189-SLR; *JPMorgan Chase & Co., et al. v. Affiliated Computer Services, Inc., et al.*—Electronic Information Disclosure Statement, (Jan. 9, 2009), (3 pp.), (Exhibit F).

U.S. District Court of Delaware Civil Action No. 08cv00189-SLR; *JPMorgan Chase & Co., et al. v. Affiliated Computer Services, Inc., et al.*—Plaintiffs' Objections and Responses to Defendants' First Set of Requests for Production, (Jul. 16, 2008), (48 pp.).

U.S. District Court of Delaware Civil Action No. 08cv00189-SLR; *JPMorgan Chase & Co., et al. v. Affiliated Computer Services, Inc., et al.*—Plaintiffs' Objections and Responses to Defendants' First Amended Set of Requests for Production, (Nov. 24, 2008), (46 pp.).

U.S. District Court of Delaware Civil Action No. 08cv00189-SLR; *JPMorgan Chase & Co., et al. v. Affiliated Computer Services, Inc., et al.*—Plaintiffs' Objections and Responses to Defendants' Second Set of Requests for Production, (Nov. 24, 2008), (55 pp.).

U.S. District Court of Delaware Civil Action No. 08cv00189-SLR; *JPMorgan Chase & Co., et al. v. Affiliated Computer Services, Inc., et al.*—Plaintiffs' Objections and Responses to Defendants' Third Set of Requests for Production, (Jan. 9, 2009), (18 pp.).

U.S. District Court of Delaware Civil Action No. 08cv00189-SLR; *JPMorgan Chase & Co., et al. v. Affiliated Computer Services, Inc., et al.*—Plaintiffs' Objections and Responses to Defendants' First Set of Interrogatories, (Aug. 4, 2008), (30 pp.).

U.S. District Court of Delaware Civil Action No. 08cv00189-SLR; *JPMorgan Chase & Co., et al. v. Affiliated Computer Services, Inc., et al.*—Plaintiffs' Supplemental Objections and Responses to Defendants' Amended First Set of Interrogatories, (Nov. 3, 2008), (24 pp.).

U.S. District Court of Delaware Civil Action No. 08cv00189-SLR; *JPMorgan Chase & Co., et al. v. Affiliated Computer Services, Inc., et al.*—Plaintiffs' Objections and Responses to Defendants' Second Set of Interrogatories, (Sep. 15, 2008), (19 pp.).

U.S. District Court of Delaware Civil Action No. 08cv00189-SLR; *JPMorgan Chase & Co., et al. v. Affiliated Computer Services, Inc., et al.*—Plaintiffs' Supplemental Objections and Responses to Defendants' Amended Second Set of Interrogatories, (Nov. 3, 2008), (17 pp.).

U.S. District Court of Delaware Civil Action No. 08cv00189-SLR; *JPMorgan Chase & Co., et al. v. Affiliated Computer Services, Inc., et al.*—Plaintiffs' Objections and Responses to Defendants' Third Set of Interrogatories, (Nov. 24, 2008), (17 pp.).

U.S. District Court of Delaware Civil Action No. 08cv00189-SLR; *JPMorgan Chase & Co., et al. v. Affiliated Computer Services, Inc., et al.*—Plaintiffs' Initial Disclosures Pursuant to Fed. R. Civ. P. 26(a)(1), (Aug. 1, 2008), (15 pp.).

U.S. District Court of Delaware Civil Action No. 08cv00189-SLR; *JPMorgan Chase & Co., et al. v. Affiliated Computer Services, Inc., et al.*—Defendant ACS's Objections and Responses to Plaintiffs' First Set of Requests for Production of Documents to Defendants Affiliated Computer Services, Inc. and ACS State & Local Solutions Inc., (Jul. 17, 2008), (77 pp.).

U.S. District Court of Delaware Civil Action No. 08cv00189-SLR; *JPMorgan Chase & Co., et al. v. Affiliated Computer Services, Inc., et al.*—Defendant ACS's Objections and Responses to Plaintiffs' Second Set of Requests for Production of Documents to Defendants Affiliated Computer Services, Inc. and ACS State & Local Solutions Inc., (Nov. 7, 2008), (74 pp.).

U.S. District Court of Delaware Civil Action No. 08cv00189-SLR; *JPMorgan Chase & Co., et al. v. Affiliated Computer Services, Inc., et al.*—ACS's Objections and Responses to Plaintiffs' First Set of Interrogatories to Defendants Affiliated Computer Services, Inc. and ACS State & Local Solutions, Inc., (Jul. 17, 2008), (37 pp.).

U.S. District Court of Delaware Civil Action No. 08cv00189-SLR; *JPMorgan Chase & Co., et al. v. Affiliated Computer Services, Inc., et al.*—ACS's Objections and Responses to Plaintiffs' First Amended and Consolidated Set of Interrogatories to Defendants Affiliated Computer Services, Inc. and ACS State & Local Solutions, Inc., (Nov. 7, 2008), (36 pp.).

U.S. District Court of Delaware Civil Action No. 08cv00189-SLR; *JPMorgan Chase & Co., et al. v. Affiliated Computer Services, Inc., et al.*—ACS's Objections and Responses to Plaintiffs' Second Set of Interrogatories to Defendants Affiliated Computer Services, Inc. and ACS State & Local Solutions, Inc., (Nov. 7, 2008), (17 pp.).

U.S. District Court of Delaware Civil Action No. 08cv00189-SLR; *JPMorgan Chase & Co., et al. v. Affiliated Computer Services, Inc., et al.*—Affiliated Computer Services, Inc. and ACS State & Local Solutions, Inc.'s Initial Disclosures, (Aug. 1, 2008), (17 pp.).

U.S. District Court of Delaware Civil Action No. 08cv00189-SLR; *JPMorgan Chase & Co., et al. v. Affiliated Computer Services, Inc., et al.*—Affiliated Computer Services, Inc. and ACS State & Local Solutions, Inc.'s First Supplemental Initial Disclosures, (Jan. 12, 2009), (14 pp.).

U.S. District Court of Minnesota Civ. Action No. 02-CV-1321 DWF/SRN; *Pay Child Support Online Inc. v. ACS State & Local Solutions, Inc.*, Memorandum in Support of Plaintiff and Counter-Defendant's Motion to Dismiss, (Sep. 16, 2002), (26 pp.), (Exhibit A).

U.S. District Court of Minnesota Civ. Action No. 02-CV-1321 DWF/SRN; *Pay Child Support Online Inc. v. ACS State & Local Solutions, Inc.*, ACS State & Local Solutions, Inc.'s Opposition to the Motion to Dismiss of Pay Child Support Online Inc. and Daniel J. King, (Oct. 7, 2002), (28 pp.), (Exhibit B).

U.S. District Court of Minnesota Civ. Action No. 02-CV-1321 DWF/SRN; *Pay Child Support Online Inc. v. ACS State & Local Solutions, Inc.*, Memorandum Opinion and Order, (Dec. 2, 2002), (8 pp.), (Exhibit C).

Kroener III, William F., Stored Value Cards and Other Electronic Payment Systems, FIL-59-96, Aug. 6, 1996, letter to Chief Executive Officer, (1 p.).

Federal Deposit Insurance Corporation—General Counsel's Opinion No. 8; Stored Value Cards and Other Electronic Payment Systems, 61 Federal Register 150, Aug. 2, 1996, pp. 40490-40494, (6 pp.).

Federal Deposit Insurance Corporation—Insurability of Funds Underlying Stored Value Cards and Other Nontraditional Access Mechanisms, 73 Federal Register 220, Nov. 13, 2008, pp. 67155-67157, (3 pp.).

Cason, Katherine L., Electronic Benefits Transfer: New Strategies for Improving Public Assistance Programs, Southern Rural Development Center Information Brief, No. 6, Dec. 1998, (6 pp.); http://srdc.msstate.edu/publications/brief6.pdf.

Letter to DiNuzzo, Joseph A., Insurance Coverage of Deposits for Which Insured Institution Acts as Fiscal Agent for Department of Treasury in Disbursing Social Security and Other Income to Recipients, FDIC-93-35, Jun. 28, 1993, (2 pp.); www.fdic.gov/regulations/laws/rules/4000-8240.html#tail.

U.S. District Court of Delaware Civil Action No. 08cv00189-UNA; *JPMorgan Chase & Co., et al.* v. *Affiliated Computer Services, Inc., et al.*—Penny Joines's Objections and Responses to Defendant's Second amended Notice of Rule 30(b)(1) Deposition and Subpoena Duces Tecum of Penny Joines, dated Jun. 16, 2009 (13 pp.).

U.S. District Court of Delaware Civil Action No. 08cv00189-UNA; *JPMorgan Chase & Co., et al.* v. *Affiliated Computer Services, Inc., et al.*—Gregory Phillips's Objections and Responses to Defendant's Second amended Notice of Rule 30(b)(1) Deposition and Subpoena Duces Tecum of Gregory Phillips, dated Jun. 16, 2009 (13 pp.).

U.S. District Court of Delaware Civil Action No. 08cv00189-UNA; *JPMorgan Chase & Co., et al.* v. *Affiliated Computer Services, Inc., et al.*—Rebecca Deporte's Objections and Responses to Defendant's Second amended Notice of Rule 30(b)(1) Deposition and Subpoena Duces Tecum of Rebecca Deporte's, dated Jun. 16, 2009 (13 pp.).

* cited by examiner

ORDER/NOTICE TO WITHHOLD INCOME FOR CHILD SUPPORT

_____ ORIGINAL ORDER/NOTICE
_____ AMENDED ORDER/NOTICE

CO./CITY/DIST. OF _____
DATE OF ORDER/NOTICE _____
COURT/CASE NUMBER _____

RE: _____
_____   EMPLOYER/OBLIGOR'S (LAST, FIRST, MI)
EMPLOYER/WITHHOLDER'S FEDERAL EIN NUMBER
RE: _____
_____   EMPLOYER/OBLIGOR'S SOCIAL SECURITY NUMBER
EMPLOYER/WITHHOLDER'S NAME
RE: _____
_____   EMPLOYER/OBLIGOR'S CASE IDENTIFIER
EMPLOYER/WITHHOLDER'S ADDRESS
RE: _____
_____   CUSTODIAL PARENT'S (LAST, FIRST, MI)
_____

CHILD(REN)'S NAME(S):    DOB           CHILD(REN)'S NAME(S):    DOB

ORDER INFORMATION: THIS IS AN ORDER/NOTICE TO WITHHOLD INCOME FOR CHILD SUPPORT BASED UPON AN ORDER FOR SUPPORT FROM _____. BY LAW, YOU ARE REQUIRED TO DEDUCT THESE AMOUNTS FROM THE ABOVE-NAMED EMPLOYEE/OBLIGATOR'S INCOME UNTIL _____ EVEN IF THE ORDER/NOTICE IS NOT ISSUED BY YOUR STATE.

☐ IF CHECKED, YOU ARE REQUIRED TO ENROLL THE CHILD(REN) IDENTIFIED ABOVE IN ANY HEALTH INSURANCE COVERAGE AVAILABLE THROUGH THE EMPLOYEE'S/OBLIGOR'S EMPLOYMENT. _____

$_____ PER _____ IN CURRENT SUPPORT
$_____ PER _____ IN PAST-DUE SUPPORT
$_____ PER _____ MEDICAL SUPPORT
$_____ PER _____ IN OTHER (SPECIFY) _____

FOR A TOTAL OF _____ PER _____ TO BE FORWARDED TO THE PAYEE BELOW.

YOU DO NOT HAVE TO VARY YOUR PAY CYCLE TO BE IN COMPLIANCE WITH THE SUPPORT ORDER. IF YOUR PAY CYCLE DOES NOT MATCH THE ORDERED SUPPORT PAYMENT CYCLE, USE THE FOLLOWING TO DETERMINE HOW MUCH TO WITHHOLD:

$_____ PER WEEKLY PAY PERIOD.                   $_____ PER SEMIMONTHLY PAY PERIOD (TWICE A MONTH).
$_____ PER BIWEEKLY PAY PERIOD (EVERY TWO WEEKS). $_____ PER MONTHLY PAY PERIOD.

REMITTANCE INFORMATION: FOLLOW THE LAWS AND PROCEDURES OF THE EMPLOYEE'S/OBLIGOR'S PRINCIPAL PLACE OF EMPLOYMENT EVEN IF SUCH LAWS AND PROCEDURES ARE DIFFERENT FROM THE PARAGRAPH:

YOU MUST BEGIN WITHHOLDING NO LATER THAN THE FIRST PAY PERIOD OCCURING AFTER _____ WORKING DAYS AFTER THE DATE OF THIS ORDER/NOTICE. SEND PAYMENT WITHIN _____ WORKING DAYS OF THE PAYDATE/ DATE OF WITHHOLDING. YOU ARE ENTITLED TO DEDUCT A FEE OF _____ TO DEFRAY THE COST OF WITHHOLDING. THE TOTAL WITHHELD AMOUNT, INCLUDING YOUR FEE, CANNOT EXCEED _____ % OF THE EMPLOYEE/ OBLIGOR'S AGGREGATE DISPOSABLE WEEKLY EARNINGS. FOR THE PURPOSE OF THE LIMITATION ON WITHHOLDING, THE FOLLOWING INFORMATION IS NEEDED (SEE #9 ON BACK):

ARREARS 12 WEEKS OR GREATER? ☐ YES ☐ NO    EMPLOYEE/OBLIGOR SUPPORTS A SECOND FAMILY? ☐ YES ☐ NO

WHEN REMITTING PAYMENT PROVIDE THE PAYDATE/DATE OF WITHHOLDING AND THE CASE IDENTIFIER _____ . IF REMITTED BY EFT/EDI, USE THE FIPS CODE: _____ ; BANK ROUTING CODE: _____ ; BANK ACCOUNT NUMBER: _____

MAKE IT PAYABLE TO: _____

SEND CHECK TO: _____

AUTHORIZED BY _____
PRINT NAME _____

ADDITIONAL INFORMATION TO EMPLOYERS AND OTHER WITHHOLDERS

☐ IF CHECKED YOU ARE REQUIRED TO PROVIDE A COPY OF THIS FORM TO YOUR EMPLOYEE.

1. PRIORITY: WITHHOLDING UNDER THIS ORDER/NOTICE HAS PRIORITY OVER ANY OTHER LEGAL PROCESS UNDER STATE LAW AGAINST THE SAME INCOME. FEDERAL TAX LEVIES IN EFFECT BEFORE RECEIPT OF THIS ORDER HAVE PRIORITY UNLESS OTHERWISE AGREED TO BY IRS.

2. COMBINING PAYMENTS: YOU CAN COMBINE WITHHELD AMOUNTS FROM MORE THAN ONE EMPLOYEE/OBLIGOR'S INCOME IN A SINGLE PAYMENT TO EACH AGENCY REQUESTING WITHHOLDING. YOU MUST, HOWEVER, SEPARATELY IDENTIFY THE PORTION OF THE SINGLE PAYMENT THAT IS ATTRIBUTABLE TO EACH EMPLOYEE/OBLIGOR.

3. REPORTING THE PAYDATE/DATE OF WITHHOLDING: YOU MUST REPORT THE PAYDATE OF WITHHOLDING WHEN SENDING THE PAYMENT. THE PAYDATE/DATE OF WITHHOLDING IS THE DATE ON WHICH THE EMPLOYEE IS PAID AND CONTROLS THE INCOME (THE DATE THE INCOME CHECK OR CASH IS GIVEN TO THE EMPLOYEE; OR THE DATE IN WHICH THE INCOME IS DEPOSITED DIRECTLY IN HIS/HER ACCOUNT)

4. EMPLOYEE/OBLIGOR WITH MULTIPLE SUPPORT WITHHOLDINGS: IF THERE IS MORE THAN ONE ORDER/NOTICE TO WITHHOLD INCOME FOR CHILD SUPPORT AGAINST THIS EMPLOYEE/OBLIGOR AND YOU ARE UNABLE TO HONOR ALL SUPPORT ORDERS/NOTICES DUE TO FEDERAL OR STATE WITHHOLDING LIMITS, YOU MUST IMMEDIATELY CONTACT THE AGENCY THAT SENT THE MOST RECENT ORDER/NOTICE TO DETERMINE HOW TO DIVIDE THE WITHHELD INCOME. CONTINUE WITHHOLDING BY HONORING CURRENT SUPPORT ORDER FIRST. THE LAW OF EMPLOYEE'S PRINCIPAL PLACE OF EMPLOYMENT WILL GOVERN ALLOCATION.

5. TERMINATION NOTIFICATION: YOU MUST PROMPTLY NOTIFY THE PAYEE WHEN THE EMPLOYEE/OBLIGOR NO LONGER WORKS FOR YOU. PLEASE PROVIDE THE INFORMATION REQUESTED AND RETURN A COPY OF THIS ORDER/NOTICE TO THE AGENCY IDENTIFIED BELOW.
DATE OF SEPERATION_____
LAST KNOWN HOME ADDRESS_____
NEW EMPLOYER'S ADDRESS_____

6. LUMP SUM PAYMENTS: YOU MAY BE REQUIRED TO REPORT AND WITHHOLD FROM LUMP SUM PAYMENTS SUCH AS BONUSES, COMMISSIONS, OR SEVERANCE PAY. IF YOU HAVE ANY QUESTIONS ABOUT LUMP SUM PAYMENTS, CONTACT THE PERSON OF AUTHORITY BELOW.

7. LIABILITY: IF YOU FAIL TO WITHHOLD INCOME AS THE ORDER/NOTICE DIRECTS, YOU ARE LIABLE FOR BOTH THE ACCUMULATED AMOUNT YOU SHOULD HAVE WITHHELD FROM THE EMPLOYEE/OBLIGOR'S INCOME AND ANY OTHER PENALTIES SET BY STATE LAW.

8. ANTI-DISCRIMINATION: YOU ARE SUBJECT TO A FINE DETERMINED UNDER STATE LAW FOR DISCHARGING AN EMPLOYEE/ OBLIGOR FROM EMPLOYMENT, REFUSING TO EMPLOYEE, OR TAKING DISCIPLINARY ACTION AGAINST ANY EMPLOYEE/ OBLIGOR BECAUSE OF A CHILD SUPPORT WITHHOLDING.

_____
_____
_____

9. WITHHOLDING LIMITS: YOU MAY NOT WITHHOLD MORE THAN THE LESSER OF: 1) THE AMOUNT ALLOWED BY THE FEDERAL CONSUMER CREDIT PROTECTION ACT (15 U.S.C. § 1673 (b)); OR 2) THE AMOUNTS ALLOWED BY THE STATE OF THE EMPLOYEE'S/OBLIGOR'S PRINCIPAL PLACE OF EMPLOYMENT. THE FEDERAL LIMIT APPLIES TO THE AGGREGATE DISPOSABLE WEEKLY EARNINGS (ADWE). ADWE IS THE NET INCOME LEFT AFTER MAKING MANDATORY DEDUCTIONS SUCH AS: STATE, FEDERAL, LOCAL TAXES; SOCIAL SECURITY TAXES; AND MEDICARE TAXES. THE FEDERAL CCPA LIMIT IS 50% OF THE ADWE FOR CHILD SUPPORT AND ALIMONY, WHICH IS INCREASED BY :) 1) 10% IF THE EMPLOYEE DOES NOT SUPPORT A SECOND FAMILY; AND/OR 2) 5% IF ARREARS ARE MORE THAN 12 WEEKS OLD, (SEE BOXES ON FRONT)

10. _____
_____
_____
_____

REQUESTING AGENCY _____  IF YOU OR YOUR EMPLOYEE/OBLIGOR HAVE ANY QUESTIONS, CONTACT:
_____
_____
BY TELEPHONE AT _____ OR
BY FAX AT _____

ORDER/NOTICE TO WITHHOLD INCOME FOR CHILD SUPPORT

VIRGINIA _____  _____ ORIGINAL ORDER/NOTICE
CO./CITY/DIST. OF __ALEXANDRIA_____  _____ AMENDED ORDER/NOTICE
DATE OF ORDER/NOTICE __6/12/98__
COURT/CASE NUMBER __98-123__

__432165__                                 RE: __DOE, JOHN__
EMPLOYER/WITHHOLDER'S FEDERAL EIN NUMBER        EMPLOYER/OBLIGOR'S (LAST, FIRST, MI)
Y CORP.                                    RE: __123-45-6789__
EMPLOYER/WITHHOLDER'S NAME                      EMPLOYER/OBLIGOR'S SOCIAL SECURITY NUMBER
123 MAIN STREET                            RE: __98-123__
EMPLOYER/WITHHOLDER'S ADDRESS                   EMPLOYER/OBLIGOR'S CASE IDENTIFIER
ANYTOWN, VA                                RE: __DOE, JANE__
                                                CUSTODIAL PARENT'S (LAST, FIRST, MI)
__12345-0000__

CHILD(REN)'S NAME(S):   DOB                CHILD(REN)'S NAME(S):   DOB
   DOE, SUSIE 6/1/1990

ORDER INFORMATION: THIS IS AN ORDER/NOTICE TO WITHHOLD INCOME FOR CHILD SUPPORT BASED UPON AN ORDER FOR SUPPORT FROM __VIRGINIA__. BY LAW, YOU ARE REQUIRED TO DEDUCT THESE AMOUNTS FROM THE ABOVE-NAMED EMPLOYEE/OBLIGATOR'S INCOME UNTIL __6/1/2008__ EVEN IF THE ORDER/NOTICE IS NOT ISSUED BY YOUR STATE.

☐ IF CHECKED, YOU ARE REQUIRED TO ENROLL THE CHILD(REN) IDENTIFIED ABOVE IN ANY HEALTH INSURANCE COVERAGE AVAILABLE THROUGH THE EMPLOYEE'S/OBLIGOR'S EMPLOYMENT.

$ __800.00__   PER __MONTH__   IN CURRENT SUPPORT
$ _____   PER _____  IN PAST-DUE SUPPORT
$ __100.00__   PER __MONTH__   MEDICAL SUPPORT
$ _____   PER _____  IN OTHER (SPECIFY) _____

FOR A TOTAL OF $ __$900.00__ PER __MONTH__ TO BE FORWARDED TO THE PAYEE BELOW.

YOU DO NOT HAVE TO VARY YOUR PAY CYCLE TO BE IN COMPLIANCE WITH THE SUPPORT ORDER. IF YOUR PAY CYCLE DOES NOT MATCH THE ORDERED SUPPORT PAYMENT CYCLE, USE THE FOLLOWING TO DETERMINE HOW MUCH TO WITHHOLD:

$ __207.00__ PER WEEKLY PAY PERIOD.             $ __450.00__ PER SEMIMONTHLY PAY PERIOD (TWICE A MONTH).
$ __414.00__ PER BIWEEKLY PAY PERIOD. (EVERY TWO WEEKS).  $ __900.00__ PER MONTHLY PAY PERIOD.

REMITTANCE INFORMATION: FOLLOW THE LAWS AND PROCEDURES OF THE EMPLOYEE'S/OBLIGOR'S PRINCIPAL PLACE OF EMPLOYMENT EVEN IF SUCH LAWS AND PROCEDURES ARE DIFFERENT FROM THE PARAGRAPH:

YOU MUST BEGIN WITHHOLDING NO LATER THAN THE FIRST PAY PERIOD OCCURING AFTER ___30___ WORKING DAYS AFTER THE DATE OF THIS ORDER/NOTICE. SEND PAYMENT WITHIN ___7___ WORKING DAYS OF THE PAYDATE/ DATE OF WITHHOLDING. YOU ARE ENTITLED TO DEDUCT A FEE OF ___$50.00___ TO DEFRAY THE COST OF WITHHOLDING. THE TOTAL WITHHELD AMOUNT, INCLUDING YOUR FEE, CANNOT EXCEED ___40___ % OF THE EMPLOYEE/ OBLIGOR'S AGGREGATE DISPOSABLE WEEKLY EARNINGS. FOR THE PURPOSE OF THE LIMITATION OF ON WITHHOLDING, THE FOLLOWING INFORMATION IS NEEDED (SEE #9 ON BACK):

ARREARS 12 WEEKS OR GREATER? ☐YES ☒NO    EMPLOYEE/OBLIGOR SUPPORTS A SECOND FAMILY? ☐YES ☒NO

WHEN REMITTING PAYMENT PROVIDE THE PAYDATE/DATE OF WITHHOLDING AND THE CASE IDENTIFIER ___98-123___ . IF REMITTED BY EFT/EDI, USE THE FIPS CODE: ___54321___; BANK ROUTING CODE: ___98765___ BANK ACCOUNT NUMBER: ___4321___

MAKE IT PAYABLE TO: ___JANE DOE___

AUTHORIZED BY_____
PRINT NAME ___JUDGE BLACK ROBE___

SEND CHECK TO: ___456 MAIN STREET___
___ANYTOWN, VA___
___12345-0000___

ADDITIONAL INFORMATION TO EMPLOYERS AND OTHER WITHHOLDERS

☐ IF CHECKED YOU ARE REQUIRED TO PROVIDE A COPY OF THIS FORM TO YOUR EMPLOYEE.

1. PRIORITY: WITHHOLDING UNDER THIS ORDER/NOTICE HAS PRIORITY OVER ANY OTHER LEGAL PROCESS UNDER STATE LAW AGAINST THE SAME INCOME. FEDERAL TAX LEVIES IN EFFECT BEFORE RECEIPT OF THIS ORDER HAVE PRIORITY UNLESS OTHERWISE AGREED TO BY IRS.

2. COMBINING PAYMENTS: YOU CAN COMBINE WITHHELD AMOUNTS FROM MORE THAN ONE EMPLOYEE/OBLIGOR'S INCOME IN A SINGLE PAYMENT TO EACH AGENCY REQUESTING WITHHOLDING. YOU MUST, HOWEVER, SEPARATELY IDENTIFY THE PORTION OF THE SINGLE PAYMENT THAT IS ATTRIBUTABLE TO EACH EMPLOYEE/OBLIGOR.

3. REPORTING THE PAYDATE/DATE OF WITHHOLDING: YOU MUST REPORT THE PAYDATE OF WITHHOLDING WHEN SENDING THE PAYMENT. THE PAYDATE/DATE OF WITHHOLDING IS THE DATE ON WHICH THE EMPLOYEE IS PAID AND CONTROLS THE INCOME (THE DATE THE INCOME CHECK OR CASH IS GIVEN TO THE EMPLOYEE, OR THE DATE IN WHICH THE INCOME IS DEPOSITED DIRECTLY IN HIS/HER ACCOUNT).

4. EMPLOYEE/OBLIGOR WITH MULTIPLE SUPPORT WITHHOLDINGS: IF THERE IS MORE THAN ONE ORDER/NOTICE TO WITHHOLD INCOME FOR CHILD SUPPORT AGAINST THIS EMPLOYEE/OBLIGOR AND YOU ARE UNABLE TO HONOR ALL SUPPORT ORDERS/NOTICES DUE TO FEDERAL OR STATE WITHHOLDING LIMITS, YOU MUST IMMEDIATELY CONTACT THE AGENCY THAT SENT THE MOST RECENT ORDER/NOTICE TO DETERMINE HOW TO DIVIDE THE WITHHELD INCOME. CONTINUE WITHHOLDING BY HONORING CURRENT SUPPORT ORDER FIRST. THE LAW OF EMPLOYEE'S PRINCIPAL PLACE OF EMPLOYMENT WILL GOVERN ALLOCATION.

5. TERMINATION NOTIFICATION: YOU MUST PROMPTLY NOTIFY THE PAYEE WHEN THE EMPLOYEE/OBLIGOR NO LONGER WORKS FOR YOU. PLEASE PROVIDE THE INFORMATION REQUESTED AND RETURN A COPY OF THIS ORDER/NOTICE TO THE AGENCY IDENTIFIED BELOW.
DATE OF SEPERATION_____
LAST KNOWN HOME ADDRESS_____
NEW EMPLOYER'S ADDRESS_____

6. LUMP SUM PAYMENTS: YOU MAY BE REQUIRED TO REPORT AND WITHHOLD FROM LUMP SUM PAYMENTS SUCH AS BONUSES, COMMISSIONS, OR SEVERANCE PAY. IF YOU HAVE ANY QUESTIONS ABOUT LUMP SUM PAYMENTS, CONTACT THE PERSON OF AUTHORITY BELOW.

7. LIABILITY: IF YOU FAIL TO WITHHOLD INCOME AS THE ORDER/NOTICE DIRECTS, YOU ARE LIABLE FOR BOTH THE ACCUMULATED AMOUNT YOU SHOULD HAVE WITHHELD FROM THE EMPLOYEE/OBLIGOR'S INCOME AND ANY OTHER PENALTIES SET BY STATE LAW.

8. ANTI-DISCRIMINATION: YOU ARE SUBJECT TO A FINE DETERMINED UNDER STATE LAW FOR DISCHARGEING AN EMPLOYEE/ OBLIGOR FROM EMPLOYMENT, REFUSING TO EMPLOYEE, OR TAKING DISCIPLINARY ACTION AGAINST ANY EMPLOYEE/ OBLIGOR BECAUSE OF A CHILD SUPPORT WITHHOLDING.

9. WITHHOLDING LIMITS: YOU MAY NOT WITHHOLD MORE THAN THE LESSER OF: 1) THE AMOUNT ALLOWED BY THE FEDERAL CONSUMER CREDIT PROTECTION ACT (15 U.S.C. § 1673 (b)); OR 2) THE AMOUNTS ALLOWED BY STATE OF THE EMPLOYEE'S/ OBLIGOR'S PRINCIPAL PLACE OF EMPLOYMENT. THE FEDERAL LIMIT APPLIES TO THE AGGREGATE DISPOSABLE WEEKLY EARNINGS (ADWE). ADWE IS THE NET INCOME LEFT AFTER MAKING MANDATORY DEDUCTIONS SUCH AS: STATE, FEDERAL, LOCAL TAXES; SOCIAL SECURITY TAXES; AND MEDICARE TAXES. THE FEDERAL CCPA LIMIT IS 50% OF THE ADWE FOR CHILD SUPPORT AND ALIMONY, WHICH IS INCREASED BY :) 1) 10% IF THE EMPLOYEE DOES NOT SUPPORT A SECOND FAMILY; AND/OR 2) 5% IF ARREARS ARE MORE THAN 12 WEEKS OLD. (SEE BOXES ON FRONT)

10. _____

REQUESTING AGENCY _____
VIRGINIA CHILD SUPPORT DEPARTMENT

IF YOU OR YOUR EMPLOYEE/OBLIGOR HAVE ANY QUESTIONS, CONTACT:
JOHN G. CLERK

BY TELEPHONE AT  703-123-4567    OR
BY FAX AT  703-123-4567

FIG. 15B (CONT)

| | 1 | 2 | 3 | 4 | 5 | 6 | 7 | 8 | ... | n |
|---|---|---|---|---|---|---|---|---|---|---|
| | VIRGINIA | JOHN DOE | 123-45-6789 | Y CORP. | ANYTOWN | VA | 12345-0000 | 98-123 | | 6/12/98 |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |

| | 1 | 2 | 3 | 4 | 5 | 6 | 7 | 8 | ... | n |
|---|---|---|---|---|---|---|---|---|---|---|
| | VIRGINIA | JOHN DOE | 123-45-6789 | Y CORP. | ANYTOWN | VA | 12345-0000 | 98-123 | | 6/12/98 |
| | | | | | | | | | | |
| | | | | | | | | | | |
| | | | | | | | | | | |
| | | | | | | | | | | |
| | | | | | | | | | | |
| | | | | | | | | | | |

| 1 | 2 | 3 | 4 | 5 | 6 | 7 | 8 | 9 | ... | n |
|---|---|---|---|---|---|---|---|---|-----|---|
| $I_1$ | VIRGINIA | JOHN DOE | 123-45-6789 | Y CORP. | ANYTOWN | VA | 12345-0000 | 98-123 | | 6/12/98 |
| $I_2$ | TENNESSEE | 98-456 | SOMETOWN | T. VOE | 5321-0000 | 7/1/98 | 300-00-0001 | X CORP. | | TX |
| $I_3$ | OHIO | 98-789 | ANYTOWN | S. ROE | 98765-0000 | 6/21/98 | 200-00-0001 | Y CORP. | | VA |
| | | | | | | | | | | |
| | | | | | | | | | | |
| | | | | | | | | | | |
| | | | | | | | | | | |
| | | | | | | | | | | |
| | | | | | | | | | | |

ORDER/NOTICE TO WITHHOLD INCOME FOR CHILD SUPPORT

_____ 1a _____         _____ 4a _____ ORIGINAL ORDER/NOTICE
CO./CITY/DIST. OF _____ 1b _____         _____ 4b _____ AMENDED ORDER/NOTICE
DATE OF ORDER/NOTICE _____ 2 _____
COURT/CASE NUMBER _____ 3 _____

_____ 5 _____                    RE: _____ 7 _____
EMPLOYER/WITHHOLDER'S FEDERAL EIN NUMBER         EMPLOYER/OBLIGOR'S (LAST, FIRST, MI)
_____ 6a _____                   RE: _____ 8 _____
EMPLOYER/WITHHOLDER'S NAME                       EMPLOYER/OBLIGOR'S SOCIAL SECURITY NUMBER
_____ 6b _____                   RE: _____ 9 _____
EMPLOYER/WITHHOLDER'S ADDRESS                    EMPLOYER/OBLIGOR'S CASE IDENTIFIER
_____ 6c _____                   RE: _____ 10 _____
                                                 CUSTODIAL PARENT'S (LAST, FIRST, MI)
_____ 6d _____
_____ 6e _____

CHILD(REN)'S NAME(S):   DOB              CHILD(REN)'S NAME(S):   DOB
     11

*ORDER INFORMATION:* THIS IS AN ORDER/NOTICE TO WITHHOLD INCOME FOR CHILD SUPPORT BASED UPON AN ORDER FOR SUPPORT FROM ___12___ . BY LAW, YOU ARE REQUIRED TO DEDUCT THESE AMOUNTS FROM THE ABOVE-NAMED EMPLOYEE/OBLIGOR'S INCOME UNTIL ___13___ EVEN IF THE ORDER/NOTICE IS NOT ISSUED BY YOUR STATE.

☐ IF CHECKED, YOU ARE REQUIRED TO ENROLL THE CHILD(REN) IDENTIFIED ABOVE IN ANY HEALTH INSURANCE COVERAGE AVAILABLE THROUGH THE EMPLOYEE'S/OBLIGOR'S EMPLOYMENT.         14

$ ___15a___ PER ___15b___ IN CURRENT SUPPORT
$ ___16a___ PER ___16b___ IN PAST-DUE SUPPORT
$ ___17a___ PER ___17b___ MEDICAL SUPPORT
$ ___18a___ PER ___18b___ IN OTHER (SPECIFY) ___18c___
    ___19a___     ___19b___                    20
FOR A TOTAL OF ___21a___ PER ___21b___ TO BE FORWARDED TO THE PAYEE BELOW.

YOU DO NOT HAVE TO VARY YOUR PAY CYCLE TO BE IN COMPLIANCE WITH THE SUPPORT ORDER. IF YOUR PAY CYCLE DOES NOT MATCH THE ORDERED SUPPORT PAYMENT CYCLE, USE THE FOLLOWING TO DETERMINE HOW MUCH TO WITHHOLD:

$ __22a__ PER WEEKLY PAY PERIOD.              $ __22c__ PER SEMIMONTHLY PAY PERIOD (TWICE A MONTH)
$ __22b__ PER BIWEEKLY PAY PERIOD. (EVERY TWO WEEKS).   $ __22d__ PER MONTHLY PAY PERIOD.

*REMITTANCE INFORMATION:* FOLLOW THE LAWS AND PROCEDURES OF THE EMPLOYEE'S/OBLIGOR'S PRINCIPAL PLACE OF EMPLOYMENT EVEN IF SUCH LAWS AND PROCEDURES ARE DIFFERENT FROM THE PARAGRAPH:

FIG. 19A
*(PRIOR ART)*

YOU MUST BEGIN WITHHOLDING NO LATER THAN THE FIRST PAY PERIOD OCCURING AFTER ___23___ WORKING DAYS AFTER THE DATE OF THIS ORDER/NOTICE. SEND PAYMENT WITHIN ___24___ WORKING DAYS OF THE PAYDATE/ DATE OF WITHHOLDING. YOU ARE ENTITLED TO DEDUCT A FEE OF ___25___ TO DEFRAY THE COST OF WITHHOLDING. THE TOTAL WITHHELD AMOUNT, INCLUDING YOUR FEE, CANNOT EXCEED ___26___ % OF THE EMPLOYEE/ OBLIGOR'S AGGREGATE DISPOSABLE WEEKLY EARNINGS. FOR THE PURPOSE OF THE LIMITATION ON WITHHOLDING, THE FOLLOWING INFORMATION IS NEEDED (SEE #9 ON BACK):

(27a) ARREARS 12 WEEKS OR GREATER? ☐ YES ☐ NO    (27b) EMPLOYEE/OBLIGOR SUPPORTS A SECOND FAMILY? ☐ YES ☐ NO

WHEN REMITTING PAYMENT PROVIDE THE PAYDATE/DATE OF WITHHOLDING AND THE CASE IDENTIFIER ___28a___ . IF REMITTING BY EFT/EDI, USE THE FIPS CODE: ___28b___ ; BANK ROUTING CODE: ___28c___ . BANK ACCOUNT NUMBER: ___28d___

MAKE IT PAYABLE TO: ___29a___

SEND CHECK TO: ___29b___
___29c___
___29d___
___29e___

AUTHORIZED BY ___30a___
PRINT NAME ___30b___

ADDITIONAL INFORMATION TO EMPLOYERS AND OTHER WITHHOLDERS

☐ IF CHECKED YOU ARE REQUIRED TO PROVIDE A COPY OF THIS FORM TO YOUR EMPLOYEE.

1. PRIORITY: WITHHOLDING UNDER THIS ORDER/NOTICE HAS PRIORITY OVER ANY OTHER LEGAL PROCESS UNDER STATE LAW AGAINST THE SAME INCOME. FEDERAL TAX LEVIES IN EFFECT BEFORE RECEIPT OF THIS ORDER HAVE PRIORITY UNLESS OTHERWISE AGREED TO BY IRS.

2. COMBINING PAYMENTS: YOU CAN COMBINE WITHHELD AMOUNTS FROM MORE THAN ONE EMPLOYEE/OBLIGOR'S INCOME IN A SINGLE PAYMENT TO EACH AGENCY REQUESTING WITHHOLDING. YOU MUST, HOWEVER, SEPARATELY IDENTIFY THE PORTION OF THE SINGLE PAYMENT THAT IS ATTRIBUTABLE TO EACH EMPLOYEE/OBLIGOR.

3. REPORTING THE PAYDATE/DATE OF WITHHOLDING: YOU MUST REPORT THE PAYDATE OF WITHHOLDING WHEN SENDING THE PAYMENT. THE PAYDATE/DATE OF WITHHOLDING IS THE DATE ON WHICH THE EMPLOYEE IS PAID AND CONTROLS THE INCOME (THE DATE THE INCOME CHECK OR CASH IS GIVEN TO THE EMPLOYEE, OR THE DATE IN WHICHN THE INCOME IS DEPOSITED DIRECTLY IN HIS/HER ACCOUNT).

4. EMPLOYEE/OBLIGOR WITH MULTIPLE SUPPORT WITHHOLDINGS: IF THERE IS MORE THAN ONE ORDER/NOTICE TO WITHHOLD INCOME FOR CHILD SUPPORT AGAINST THIS EMPLOYEE/OBLIGOR AND YOU ARE UNABLE TO HONOR ALL SUPPORT ORDERS/NOTICES DUE TO FEDERAL OR STATE WITHHOLDING LIMITS, YOU MUST IMMEDIATELY CONTACT THE AGENCY THAT SENT THE MOST RECENT ORDER/NOTICE TO DETERMINE HOW TO DIVIDE THE WITHHELD INCOME. CONTINUE WITHHOLDING BY HONORING CURRENT SUPPORT ORDER FIRST. THE LAW OF EMPLOYEE'S PRINCIPAL PLACE OF EMPLOYMENT WILL GOVERN ALLOCATION.

5. TERMINATION NOTIFICATION: YOU MUST PROMPTLY NOTIFY THE PAYEE WHEN THE EMPLOYEE/OBLIGOR NO LONGER WORKS FOR YOU. PLEASE PROVIDE THE INFORMATION REQUESTED AND RETURN A COPY OF THIS ORDER/NOTICE TO THE AGENCY IDENTIFIED BELOW.
   DATE OF SEPERATION_____
   LAST KNOWN HOME ADDRESS_____
   NEW EMPLOYER'S ADDRESS_____

6. LUMP SUM PAYMENTS: YOU MAY BE REQUIRED TO REPORT AND WITHHOLD FROM LUMP SUM PAYMENTS SUCH AS BONUSES, COMMISSIONS, OR SEVERANCE PAY. IF YOU HAVE ANY QUESTIONS ABOUT LUMP SUM PAYMENTS, CONTACT THE PERSON OF AUTHORITY BELOW.

7. LIABILITY: IF YOU FAIL TO WITHHOLD INCOME AS THE ORDER/NOTICE DIRECTS, YOU ARE LIABLE FOR BOTH THE ACCUMULATED AMOUNT YOU SHOULD HAVE WITHHELD FROM THE EMPLOYEE/OBLIGOR'S INCOME AND ANY OTHER PENALTIES SET BY STATE LAW.
   32

8. ANTI-DISCRIMINATION: YOU ARE SUBJECT TO A FINE DETERMINED UNDER STATE LAW FOR DISCHARGEING AN EMPLOYEE/ OBLIGOR FROM EMPLOYMENT, REFUSING TO EMPLOYEE, OR TAKING DISCIPLINARY ACTION AGAINST ANY EMPLOYEE/ OBLIGOR BECAUSE OF A CHILD SUPPORT WITHHOLDING.

33

9. WITHHOLDING LIMITS: YOU MAY NOT WITHHOLD MORE THAN THE LESSER OF: 1) THE AMOUNT ALLOWED BY THE FEDERAL CONSUMER CREDIT PROTECTION ACT (15 U.S.C. § 1673 (b)]; OR 2) THE AMOUNTS ALLOWED BY STATE OF THE EMPLOYEE'S/ OBLIGOR'S PRINCIPAL PLACE OF EMPLOYMENT. THE FEDERAL LIMIT APPLIES TO THE AGGREGATE DISPOSABLE WEEKLY EARNINGS (ADWE). ADWE IS THE NET INCOME LEFT AFTER MAKING MANDATORY DEDUCTIONS SUCH AS: STATE, FEDERAL, LOCAL TAXES; SOCIAL SECURITY TAXES; AND MEDICARE TAXES. THE FEDERAL CCPA LIMIT IS 50% OF THE ADWE FOR CHILD SUPPORT AND ALIMONY, WHICH IS INCREASED BY :] 1) 10% IF THE EMPLOYEE DOES NOT SUPPORT A SECOND FAMILY; AND/OR 2) 5% IF ARREARS ARE MORE THAN 12 WEEKS OLD. (SEE BOXES ON FRONT)

10.   34

| REQUESTING AGENCY | 35a | IF YOU OR YOUR EMPLOYEE/OBLIGOR HAVE ANY QUESTIONS, CONTACT: |
|---|---|---|
| | 35b | 36a |
| | 35c | 36b |
| | 35d | BY TELEPHONE AT 36c OR |
| | 35e | BY FAX AT 36d |

| # | CONTENTS |
|---|---|
| 1a | NAME OF YOUR STATE. |
| 1b | NAME OF YOUR JURISDICTION. |
| 2 | DATE THE ORDER/NOTICE TO WITHOLD IS TO BE MAILED. |
| 3 | IDENTIFYING NUMBER USED BY THE COURT/AGENCY ISSUING THIS ORDER/NOTICE, IF APPROPRIATE. |
| 4a-b | CHECK THE APPROPRIATE CASE STATUS OF THE ORDER/NOTICE TO WITHOLD. |
| 5 | EMPLOYER/WITHOLDER'S NINE DIGIT FEDERAL EMPLOYER IDENTIFICATION NUMBER (IF AVAILABLE). INCLUDE THREE DIGIT LOCATION CODE (IF KNOWN). |
| 6a | EMPLOYER/WITHOLDER'S NAME. |
| 6b-e | EMPLOYER/WITHOLDER'S MAILING ADDRESS. (THIS MAY DIFFER FROM THE EMPLOYEE/OBLIGOR WORK SITE.) |
| 7 | EMPLOYEE/OBLIGOR'S LAST NAME, FIRST NAME, AND MIDDLE INITIAL (IF KNOWN). |
| 8 | EMPLOYEE/OBLIGOR'S SOCIAL SECURITY NUMBER. |
| 9 | CASE IDENTIFIER (OR OTHER IDENTIFIER) USED FOR RECORDING THE PAYMENT. (MAY BE THE SAME AS #3). |
| 10 | CUSTODIAL PARENT'S LAST NAME, FIRST NAME, AND MIDDLE INITIAL (IF KNOWN). |
| 11 | CHILD(REN)'S NAME(S) AND DATE OF BIRTH LISTED IN THE SUPPORT ORDER. |
| 12 | NAME OF STATE THAT ISSUED THE UNDERLYING CHILD SUPPORT ORDER. |
| 13 | TERMINATION DATE OF THE SUPPORT ORDER. |
| 14 | CHECK IF THE CHILD SUPPORT ORDER REQUIRES ENROLLMENT OF THE CHILD(REN) IN ANY HEALTH INSURANCE COVERAGE AVAILABLE THE EMPLOYEE'S/OBLIGOR'S EMPLOYMENT. |

FIG. 19C
(PRIOR ART)

| | | |
|---|---|---|
| 15a | DOLLAR AMOUNT TO BE WITHHELD FOR PAYMENT OF CURRENT CHILD SUPPORT. | |
| 15b | TIME PERIOD THAT CORRESPONDS TO THE AMOUNT IN #15a (E.G., MONTH). | |
| 16a | DOLLAR AMOUNT TO BE WITHHELD FOR PAYMENT OF PAST-DUE CHILD SUPPORT UNDER YOUR STATE LAW. | |
| 16b | TIME PERIOD THAT CORRESPONDS TO THE AMOUNT IN #16a (E.G., MONTH). | |
| 17a | DOLLAR AMOUNT TO BE WITHHELD FOR PAYMENT OF MEDICAL SUPPORT, AS APPROPRIATE, BASED ON THE UNDERLYING ORDER. | |
| 19b | DESCRIBE THE AMOUNT(S) REPRESENTED IN #19a SEPARATELY BY FEE TYPE (E.G., COURT FEES). | |
| 20 | ADDITIONAL SPACE PROVIDED FOR MISCELLANEOUS OBLIGATIONS, IF APPROPRIATE. | |
| 21a | TOTAL OF #15a, #16a, #17a, #18a, #19a, AND #20. | |
| 21b | TIME PERIOD THAT CORRESPONDS TO THE AMOUNT IN #15b (E.G., MONTH). | |
| 22a | AMOUNT AN EMPLOYER WITHOLDS IF THE EMPLOYEE IS PAID WEEKLY. | |
| 22b | AMOUNT AN EMPLOYER WITHOLDS IF THE EMPLOYEE IS PAID EVERY TWO WEEKS. | |
| 22c | AMOUNT AN EMPLOYER WITHOLDS IF THE EMPLOYEE IS PAID TWICE A MONTH. | |
| 22d | AMOUNT AN EMPLOYER WITHOLDS IF THE EMPLOYEE [IS PAID] ONCE A MONTH. | |

FIG. 19D
*(PRIOR ART)*

| | |
|---|---|
| 23 | NUMBER OF DAYS IN WHICH THE WITHOLDING MUST BEGIN PURSUANT TO THE LAW OF YOUR STATE. |
| 24 | NUMBER OF WORKING DAYS AN EMPLOYER OR OTHER PAYOR OF INCOME MUST REMIT AMOUNTS WITHELD PURSUANT TO THE LAW OF YOUR STATE. |
| 25 | AMOUNT OR PERCENTAGE THAT AN EMPLOYER OR OTHER PAYOR OF INCOME MAY DEDUCT IN ADDITION TO CHILD SUPPORT FROM ITS PAYMENT AS A FEE FOR WITHOLDING CHILD SUPPORT PURSUANT TO THE LAW OF YOUR STATE. IF YOUR STATE DOES NOT PERMIT DEDUCTION OF A FEE, ENTER 0. EMPLOYERS WITH EMPLOYEES/OBLIGORS LOCATED IN ANOTHER STATE SHOULD KNOW THOSE STATE LAWS. |
| 28a | CASE IDENTIFIER OR OTHER IDENTIFIER. (MAY BE THE SAME AS #3 AND/OR #9). |
| 28b | FEDERAL INFORMATION PROCESS STANDARD (FIPS) CODE FOR TRANSMITTING PAYMENTS THROUGH EFT/EDI. THE FIPS CODE IS FIVE CHARACTERS THAT IDENTIFIES THE STATE AND COUNTY. IT IS SEVEN CHARACTERS WHEN IT IDENTIFIES THE STATE, COUNTY, AND A LOCATION WITHIN THE COUNTY. IT IS NECESSARY FOR CENTRALIZED COLLECTIONS. COMPLETE ONLY FOR EFT/EDI TRANSMISSION. |
| 28c | RECEIVING AGENCY'S BANK ROUTING NUMBER. COMPLETE ONLY FOR EFT/EDI TRANSMISSION. |
| 28d | RECEIVING AGENCY'S BANK ACCOUNT NUMBER. COMPLETE ONLY FOR EFT/EDI TRANSMISSION. |

FIG. 19E
(PRIOR ART)

| | | |
|---|---|---|
| 29a | NAME OF THE CHILD SUPPORT ENFORCEMENT AGENCY TO WHICH PAYMENTS ARE MADE AND THE CASE IDENTIFIER ON THE PAYMENT LINE. | |
| 29b-e | STREET ADDRESS, CITY, AND STATE OF THE CHILD SUPPORT ENFORCEMENT AGENCY IDENTIFIED IN #29a. | |
| 30a | SIGNATURE OF OFFICIAL(S) AUTHORIZED TO SEND THE ORDER/NOTICE. THIS LINE IS OPTIONAL IF A SIGNATURE IS NOT REQUIRED BY STATE STATUTE. | |
| 30b | PRINT NAME OF THE OFFICIAL(S) AUTHORIZED TO SEND THE ORDER/NOTICE. | |
| 31 | CHECK THE BOX IF THE EMPLOYER IS TO PROVIDE A COPY OF THE ORDER/NOTICE TO THE EMPLOYEE. | |
| 32 | PENALTY AND YOUR STATE CITATION FOR AN EMPLOYER WHO FAILS TO COMPLY WITH THE ORDER/NOTICE. YOUR STATE LAW GOVERNS UNLESS THE OBLIGOR IS EMPLOYED IN ANOTHER STATE, IN WHICH CASE THE LAW OF THE STATE IN WHICH HE OR SHE IS EMPLOYED GOVERNS. | |
| 36d | FACSIMILE NUMBER FOR THE PERSON WHOSE NAME APPEARS IN #36a. | |

| # | $I_1$ | $I_2$ | $I_2$ | . . . |
|---|---|---|---|---|
| 1a | VA | TX | VA | |
| 1b | ANYTOWN | SOMETOWN | ANYTOWN | |
| 2 | 6/12/98 | 7/1/98 | 6/21/98 | |
| 3 | 98-123 | 98-456 | 98-789 | |
| ⋮ | | | | |
| 6a | Y CORP. | X CORP. | Y CORP. | |
| ⋮ | | | | |
| 36d | | | | |

| RECIPIENT | 1a | 1b | 2 | 3 | · · · | 36d |
|---|---|---|---|---|---|---|
| Y CORP. | VA | ANYTOWN | 6/12/98 | 98-123 | | |
| Y CORP. | VA | ANYTOWN | 7/4/98 | 98-761 | | |
| X CORP. | TX | SOMETOWN | 7/1/98 | 98-456 | | |
| | | | | | | |
| ⋮ | | | | | | |

| RECIPIENT | FTP | INTERNET | TAPE | DISKETTE | ... | n |
|-----------|-----|----------|------|----------|-----|---|
| X CORP.   | Y   | X        | X    | Y        |     |   |
| Y CORP.   | X   | X        | Y    | X        |     |   |
|           |     |          |      |          |     |   |
|           |     |          |      |          |     |   |
|           |     |          |      |          |     |   |

| RECIPIENT | 1a | 1b | 2 | 3 | • • • | 36d |
|---|---|---|---|---|---|---|
| Y CORP. | VA | ANYTOWN | 6/12/98 | 98-123 | | |
| Y CORP. | VA | ANYTOWN | 7/4/98 | 98-761 | | |
| | | | | | | |
| | | | | | | |
| | | | | | | |

| RECIPIENT | 1a | 1b | 2 | 3 | · · · | 36d |
|---|---|---|---|---|---|---|
| Y CORP. | VA | ANYTOWN | 6/12/98 | 98-123 | | |
| Y CORP. | VA | ANYTOWN | 7/4/98 | 98-761 | | |
| | | | | | | |
| | | | | | | |
| | | | | | | |

METHOD AND APPARATUS FOR ELECTRONIC COLLECTION, TRANSLATION, GROUPING, AND DELIVERY OF WAGE ASSIGNMENT INFORMATION

I. RELATED APPLICATIONS

This application is a continuation of and claims benefits to application Ser. No. 12/955,705, filed on Nov. 29, 2010, (now U.S. Pat. No. 8,229,978), which is a continuation of and claims benefits to application Ser. No. 12/320,702, filed Feb. 2, 2009, (now U.S. Pat. No. 7,877,423), which is a divisional of and claims benefits to application Ser. No. 11/438,443, filed May 23, 2006, (now U.S. Pat. No. 7,720,797), which is a continuation of and claims benefits to application Ser. No. 10/155,965, filed May 29, 2002, (now U.S. Pat. No. 7,072,909), which is a continuation of and claims benefits to application Ser. No. 09/200,943, filed on Nov. 30, 1998, (now U.S. Pat. No. 6,567,821), which claims the benefit of U.S. Provisional Application No. 60/085,731, filed May 15, 1998, the contents of all of the above applications are incorporated herein by reference in their entirety.

II. BACKGROUND OF THE INVENTION

A. Field of the Invention

The present invention relates generally to the collection, translation, grouping, and delivery of wage assignment information. More particularly, the invention relates to methods and apparatus for electronic collection of wage assignment information, translation of the information into an electronic wage assignment format, grouping of the formatted information into files by batching for each respective recipient, and electronic delivery of the batched information files to each respective recipient.

B. Description of the Related Art

If a private or public entity wishes to collect a financial obligation from a particular person, the entity may obtain a judicial order requiring that the person make payments to satisfy the obligation. Frequently, the most common method to satisfy a court-ordered or court-enforced financial obligation is by requiring that the employer withhold a portion of the person's salary in the form of a wage assignment. A wage assignment may be implemented either by manual or electronic means. Manual implementation is the least efficient manner to process a wage assignment. Furthermore, even electronic implementation includes significant temporal and structural inefficiencies, primarily with regard to the collection, translation, grouping, and delivery of the information.

Electronic Implementation of Ware Assignments. Electronic commerce (EC) describes the paperless exchange of business information using electronic data interchange (EDI), electronic funds transfer (EFT), and other means of electronic communication. Of these various types of electronic communication, EDI allows for the accumulation, processing, transmittal, and receipt of business-related information that was once dependent on paper transactions. Generally, EDI describes the computer-to-computer exchange of business information using a public standard. The first such public EDI standard was created by the Transportation Data Coordinating Committee (TDCC), which created the first set of industry EDI standards comprising forty-five transaction sets for the transportation industry. These initial EDI transaction sets provided for the exchange of business information pertaining to ocean, motor, air, and rail carriers and the associated shippers, brokers, customs, freight forwarders, and bankers. Eventually, other business segments soon discovered that EDI was a more cost effective means of communicating business transaction information than paper transactions.

For the computer-to-computer exchange of business transaction information through EDI, however, a standard format is required for reasons of compatibility. Initially, the TDCC standards controlled, but these standards were limited to business transactions in the transportation industry. As the use of EDI expanded, there was a need for a new, broader standard. In response, the American National Standards Institute (ANSI) was tasked with the responsibility of creating a new standard, a standard that would include transaction sets for all types of business information. Yet, while ANSI is the coordinator and clearing house for national standards in the United States, ANSI does not write national standards. Instead, ANSI charters organizations, called Accredited Standards Committees (ASCs), to prepare consensus standards. ASCs are composed of voluntary representatives from industry, labor, consumer, and government. Periodically, ANSI charters an ASC to develop a new standard.

One such ASC, the ASC X12, was chartered by ANSI to develop standards for the structure, format, and content of electronic business transactions conducted through EDI. The ASC X12 is administered by the Data Interchange Standards Associations, Inc. (DISA), a not-for-profit corporation. Under the management of DISA, the ASC X12 composed and issued the ANSI X12 standard (i.e., the X12 standard). Pursuant to the X12 standard, each EDI transaction involves the electronic transmission of a business document using a particular transaction set. Thus, the transaction sets (or record sets) in the X12 standard define both the file structure and content format for communicating electronic business transactions using EDI.

Under the X12 standard, there are a number of particular record sets, each set corresponding to a particular type of business transaction. As of 1994, the X12 standard included 187 record sets. Notably, the various record sets of the X12 standard are delineated by specific numeric codes. For example, record set 135 pertains to student loan applications, and record set 813 pertains to electronic tax filing. For purposes of wage assignments, however, record set 521 is the most common type of transaction set, as record set 521 pertains to income or asset offset. Notably, the record set 521 is still under development. Nonetheless, when finally implemented, the 521 record set will make it possible to electronically communicate wage assignment information.

Therefore, under the X12 standard, there is an EDI transaction set for offsets from wages or other income (i.e., the 521 record set) that allows for offsets to wages or other income by means of an electronic implementation of a wage assignment. As described in the Draft Standard for Trial Use, 521 Income or Asset Offset, dated May 15, 1997, hereby incorporated by reference, the record set 521 allows for the input of both the wage transfer instruction as well as other pertinent information related to a wage assignment transaction. The wage transfer instruction and the other information relating to the wage transfer are referred to collectively as wage assignment information. With wage assignment information, an employer may be instructed to withhold automatically a predetermined portion of the wage of a particular employee and to transfer automatically the withheld portion to another person or entity. Thus, for the electronic implementation of a wage assignment, however, the wage assignment information must be collected from an initiating entity; the wage assignment information must then be translated into the proper electronic format; the wage assignment information must then be batched for each recipient; and the wage assignment information must then be delivered to each respective recipient. Furthermore, for this electronic implementation, the initiator of the wage assignment must be capable of sending the wage assignment information in a proper electronic format, and the recipient must be capable of receiving the wage assignment information in an electronic format and then implementing the wage assignment.

However, the present systems and methodologies for the electronic processing of wage assignment information are inefficient and undesirable. These shortcomings are demonstrated by the present systems and methodologies. For purposes of considering the present systems and methodologies for electronic implementation of wage assignment information, an illustration of one common type of wage assignment is used herein as an example, namely, a wage assignment based on a child support obligation. With the present systems and methodologies, pursuant to an order by a judicial entity, a state entity generates a wage assignment order for a noncustodial parent to make child support payments to a custodial parent. In almost all cases, the state entity mails the order to the employer of the noncustodial parent. The employer of the noncustodial parent must then process the wage assignment information, so that a withheld wage portion is automatically removed from the wage of the noncustodial parent. Notably, for purposes of the present systems and methodologies, as set forth below, virtually any type of wage assignment would be similarly treated as in the example of a wage assignment based on a child support obligation.

Collection of Wage Assignment Information.

For a typical wage assignment, such as, for example, a child support obligation, a particular state entity is generally responsible for generating the wage assignment orders for every noncustodial parent subject to a wage assignment. In processing the orders, the state entity generally sends a wage assignment order to the indicated employer of each noncustodial parent. Thus, large employers generally receive multiple wage assignment orders. Moreover, in most cases, employers not only receive multiple wage assignment orders from a state entity, but employers also receive multiple wage assignment orders from multiple state entities. This current system is inefficient and undesirable. According to the present systems and methodologies, there is no means to collect the wage assignment orders and transmit the orders as a single unit to the employers, which would allow for the translation of the orders into an EDI format, batching of the files for each recipient, and delivery as a single EDI transaction. Thus, the present systems and methodologies for collecting wage assignment information are inadequate.

Translation of Wage Assignment Information.

For a typical wage assignment, such as, for example, a child support obligation, the X12 standard provides a mechanism for automating the allocation of wage assignment orders for child support payments to employers. Because the X12 standard includes a transaction set for wage assignments (i.e., the 521 record set), EDI may be used to process wage assignments electronically. However, in most states, wage assignment orders are still issued on paper. Thus, in these states, wage assignments cannot be implemented electronically. Further, in the remaining states that may use electronic wage assignments, while the wage assignment orders may be electronically generated, the orders are not issued in a format compatible with the X12 standard. Thus, a wage assignment order cannot be processed as an EDI transaction. As such, the present systems and methodologies are inefficient and undesirable. Therefore, according to the present systems and methodologies, there is no means to translate either the paper or the electronic information produced by the state agencies into a format compatible with the X12 standard that may then be batched delivered as an EDI file to employers. Thus, the present systems and methodologies of translating wage assignment information are inadequate.

Grouping of Wage Assignment Information.

For a typical wage assignment, such as, for example, a child support obligation, separate wage assignment orders are issued for each wage assignment. Thus, as noted above, an employer may not only receive numerous wage assignment orders but may also receive numerous wage assignment orders from numerous state entities. Such inefficiencies strain the resources of employers that must adhere to both judicial and governmental requirements regarding the processing of wage assignments. The X12 standard provides a means to avoid these inefficiencies by the use of EDI. Using the fields of a record set from the X12 standard, such as, for example, the 521 record set, wage assignment orders could be collected, translated and then batched for delivery to employers as a single EDI file. However, the present systems and methodologies do not provide a means of grouping wage assignment orders by recipient, where the orders are also collected, translated, and delivered in a wage assignment collection and delivery system. Thus, the present systems and methodologies of grouping wage assignment information are inadequate.

Delivery of Wage Assignment Information.

For a typical wage assignment, such as, for example, a child support obligation, an employer implements the wage assignment upon receipt of the wage assignment order. However, if the wage assignment order has been converted into an electronic format, the wage assignment information must be transmitted to the employer in a useable manner. Some employers are capable of receiving files electronically, but most employers are not equipped with this capability. Without these capabilities, an employer cannot receive wage assignment information electronically and automatically implement processing of the wage assignment. As such, the present systems and methodologies are inefficient and undesirable. According to the present systems and methods, there is no means to deliver wage assignment information to employers based on particular delivery requirements, where the information is initially collected from a state entity, translated into an electronic format, and then grouped for each recipient. Thus, the present systems and methodologies of delivering wage assignment information are inadequate.

Electronic Implementation of Wage Assignment Information.

For the reasons described above, systems and methods would be desirable that could collect wage assignment information, translate the wage assignment information into an EDI file compatible with the X12 standard, group the information by recipient, and then deliver a single EDI file to the each respective recipient. For a typical wage assignment, such as, for example, a child support obligation, such a system and method would allow for the collection of wage assignment orders for child support payments from state entities and, once collected, translate the wage assignment orders into an EDI file compatible with the X12 standard (e.g., the 521 record set), and then group the orders by recipient, and finally deliver a single EDI file to each respective recipient for processing. However, as described above, the current systems and methodologies reflect an unsatisfactory development of systems and methods to collect, translate, group, and deliver wage assignment information from an initiator of a wage assignment to a recipient. Of course, once the recipient obtains the wage assignment, the processing and implementation of the payment and disbursement occur using any known system or method.

For information on systems and methods for payment and disbursement processing generally, and for payment processing using debit-based EFT as well as for disbursement processing using addendum-based EDI specifically, see U.S. patent application Ser. No. 08/941,187 of John POLK, entitled "Method and Apparatus for Payment Processing Using Debit-based Electronic Funds Transfer and Disbursement Processing Using Addendum-based Electronic Data Interchange," filed Sep. 30, 1997, incorporated herein by reference. U.S. patent application Ser. No. 08/941,187 provides efficient apparatus and methods for processing payments and disbursements, including wage assignments. However, U.S. patent application Ser. No. 08/941,187 does not provide a particular apparatus or method, whereby wage assignment information may be collected, translated, grouped, and delivered from an initiator to a recipient.

III. SUMMARY OF THE INVENTION

It is an object of an invention to provide a system for the collection, translation, grouping, and delivery of wage assignment information from an initiator to a recipient via an accumulator.

It is another object of an invention to provide a system for the receipt of wage assignment information at an initiator.

It is still another object of an invention to provide a system for the collection of wage assignment information at an accumulator from an initiator.

It is yet another object of an invention to provide a system whereby an accumulator may translate wage assignment information into an electronic wage assignment format.

It is also an object of an invention to provide a system whereby an accumulator may group electronic wage assignment information by batching the files for each respective recipient.

It is furthermore an object of an invention to provide a system whereby an accumulator may deliver the batched wage assignment information files to each respective recipient.

It is additionally an object of an invention to provide a system whereby a recipient may process wage assignments based on information received in a batched wage assignment information file.

To attain these and other objects, and in accordance with the purposes of the invention, as embodied and broadly described herein, one aspect of the invention includes a method consistent with the present invention that includes the steps, performed by a processor, of receiving a wage assignment at an initiator; dispatching the wage assignment from the initiator to an accumulator; processing the wage assignment at the accumulator; transmitting the wage assignment from the accumulator to a recipient; and implementing the wage assignment at the recipient.

In another aspect, the invention includes a method of processing a wage assignment at an initiator, comprising the steps, performed by a processor, of receiving a wage assignment; inputting the wage assignment into a database; and transmitting the wage assignment to an accumulator.

In yet another aspect, the invention includes a method of processing wage assignments at an accumulator, comprising the steps, performed by a processor, of collecting a plurality of wage assignments from a plurality of initiators; translating the wage assignments into files with a standard wage assignment format, the format including data in at least one data field; grouping the standard wage assignment format files into batch files based on the data stored in at least one data field of the standard wage assignment format; and delivering a batch file to each of a plurality of recipients.

In still another aspect, the invention includes a method of processing a wage assignment at a recipient, comprising the steps, performed by a processor, of receiving a wage assignment from an accumulator; processing the wage assignment; and implementing the wage assignment against a wage of an employee.

Additional aspects of the invention are disclosed and defined by the appended claims. It is to be understood that both the foregoing general description and the following detailed description are exemplary and explanatory and are intended to provide further explanation of the invention as claimed.

IV. BRIEF DESCRIPTION OF THE DRAWINGS

The accompanying drawings are included to provide a further understanding of the invention, are incorporated in and constitute a part of this specification, illustrate preferred embodiments of the invention, and, together with the description, serve to explain the principles of the invention.

In the drawings,

FIGS. 14A-14B depict a sample of an order/notice to withhold income for child support, as may be used by a wage assignment collection and delivery system, such as the system shown in FIG. 1;

FIGS. 15A-15B depict a sample of an order/notice to withhold income for child support containing data for purposes of illustration, as may be used by a wage assignment collection and delivery system, such as the system shown in FIG. 1;

FIG. 16 is a sample of the contents of the wage assignment information database in the data processor at the initiator shown in FIG. 11, using the illustrative data from FIGS. 15A-15B;

FIG. 17 is a sample of the contents of the wage assignment information database in the data processor at the accumulator shown in FIG. 2, using the illustrative data from FIGS. 5A-15B;

FIG. 18 is a sample of the contents of the wage assignment information file database in the data processor at the accumulator shown in FIG. 12, using the illustrative data from FIGS. 5A-15B as well as other illustrative data;

FIGS. 19A-19B depict a sample of an order/notice to withhold income for child support containing field identifiers for purposes of illustrating mapping rules; FIGS. 19C-19F are samples of mapping rules corresponding to FIGS. 19-A19B, such as mapping rules that would appear in the mapping rules database in the data processor at the accumulator shown in FIG. 12;

FIG. 20 is a sample of the contents of the EDI wage assignment information file database in the data processor at the accumulator shown in FIG. 12, using the illustrative data from FIGS. 15A-15B as well as other illustrative data;

FIG. 21 is a sample of the contents of the EDI batch file database in the data processor at the accumulator shown in FIG. 12, using the illustrative data from FIGS. 15A-15B as well as other illustrative data;

FIG. 22 is a sample of the contents of the recipient delivery database in the data processor at the accumulator shown in FIG. 12, containing data corresponding to illustrative parameters for an exemplary recipient delivery database;

FIG. 23 is a sample of the contents of a single EDI file from the EDI batch file database corresponding to a single recipient from the recipient delivery database in the data processor at the accumulator shown in FIG. 12, containing illustrative data for delivery to an illustrative recipient;

FIG. 24 is a sample of the contents of the EDI file database in the data processor at the recipient shown in FIG. 13, containing illustrative data for a single illustrative recipient;

V. DETAILED DESCRIPTION OF THE PREFERRED EMBODIMENTS

A preferred embodiment of this invention, known as NEWWS™ (National Employer Wage Withholding Service), is presently marketed by Lockheed Martin IMS. The scope of the present invention, however, encompasses modifications and variations as described by the methods and apparatus described herein or as contained within the scope of, the listed claims and their equivalents.

A. Introduction

The system of a preferred embodiment of the invention avoids the inefficiencies and shortcomings of the present wage assignment systems and methodologies by providing for the electronic collection, translation, grouping, and delivery of wage assignment information. Systems consistent with the present invention include receiving wage assignment information at an initiator regarding a wage assignment. The initiator gathers the wage assignment information and transmits the information to an accumulator. The accumulator collects the wage assignment information and then translates the information into an electronic format, such as an electronic file that corresponds to the public EDI standard established by the X12 standard. After translation, the accumulator then batches the electronic files based on a field in the electronic format. The accumulator then delivers a single batch file to each recipient. Upon receipt of a batch file, a recipient then processes the wage assignment and implements a funds or asset transfer in any known manner.

A preferred system consistent with the invention comprises several components, including a plurality of initiators, an accumulator, and a plurality of recipients. Each initiator receives and processes wage assignment information for various individuals. The initiators store and maintain the wage assignment information in a database and periodically transmit the database to an accumulator. The accumulator serves as a processing station (also known as a Value Added Network, or VAN) between the plurality of initiators and the plurality of recipients. In particular, the accumulator collects wage assignment information from each of the plurality of initiators and ensures that the information from each initiator is valid. The accumulator then translates the wage assignment information into a standard format, for example, into an EDI file, such as the 521 record set. The accumulator then batches the EDI files according to the recipient indicated in the EDI file and delivers a single EDI file to each of the plurality of recipients. The recipient processes and implements the wage assignment through any of several known methods. For an example of the implementation of a wage assignment, refer to U.S. patent application Ser. No. 08/941,187.

B. System

Figure 1:
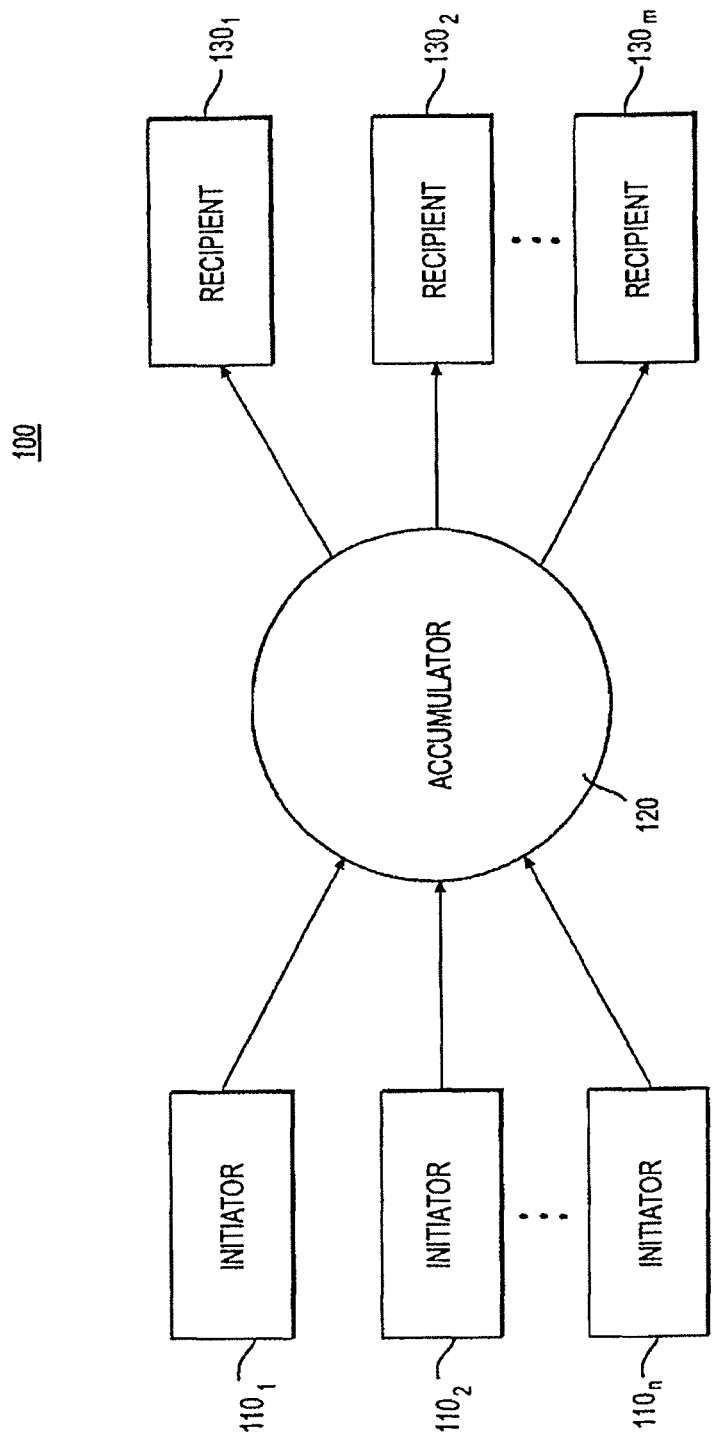
FIG. 1 is a block diagram of a wage assignment collection and delivery system.

FIG. 1 shows a wage assignment collection and delivery system according to one embodiment of the present invention. System 100 includes a plurality of initiators $110_{1-n}$, an accumulator 120, and a plurality of recipients $130_{1-m}$. Initiators $110_{1-n}$ may represent any entity that initiates a wage assignment. Accumulator 120 is the processing station that receives wage assignments from initiator $110_{1-n}$, processes the wage assignments, and then transmits the wage assignments to recipients $130_{1-m}$. Recipients $130_{1-m}$ entail those entities that receive and implement wage assignments.

Figure 2A:
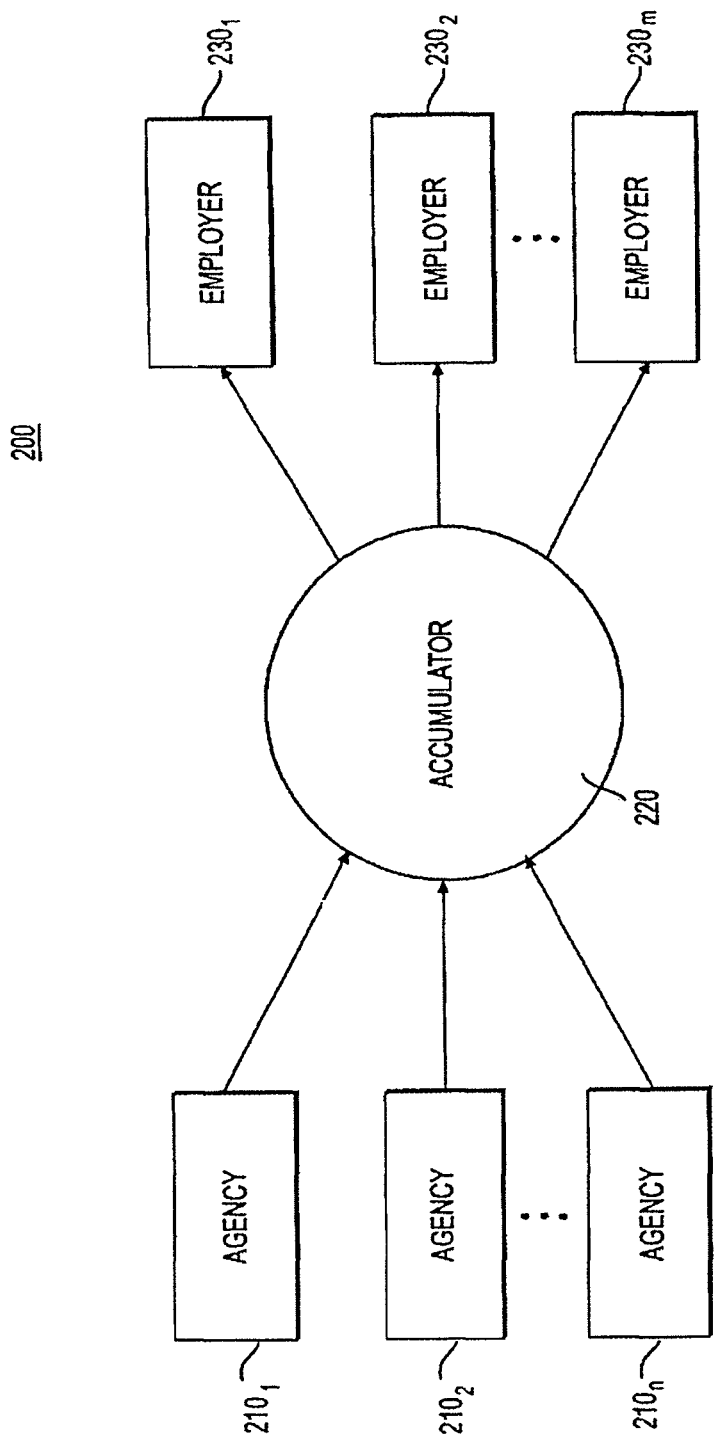
FIG. 2A is a block diagram of an alternative wage assignment collection and delivery system.

FIG. 2A shows a wage assignment collection and delivery system according to an alternative embodiment of the present invention. System 200 includes a plurality of agencies $210_{1-n}$, an accumulator 220, and a plurality of employers $230_{1-m}$. In this embodiment, the plurality of agencies $110_{1-n}$ are agencies that may initiate a wage assignment, and the plurality of employers $230_{1-m}$ are the employers that may receive and implement wage assignments. Similar to FIG. 1, accumulator 120 in FIG. 2A is the processing station that receives wage assignments from agencies $210_{1-n}$, processes the wage assignments, and then transmits the wage assignments to employers $230_{1-m}$.

Figure 2B:
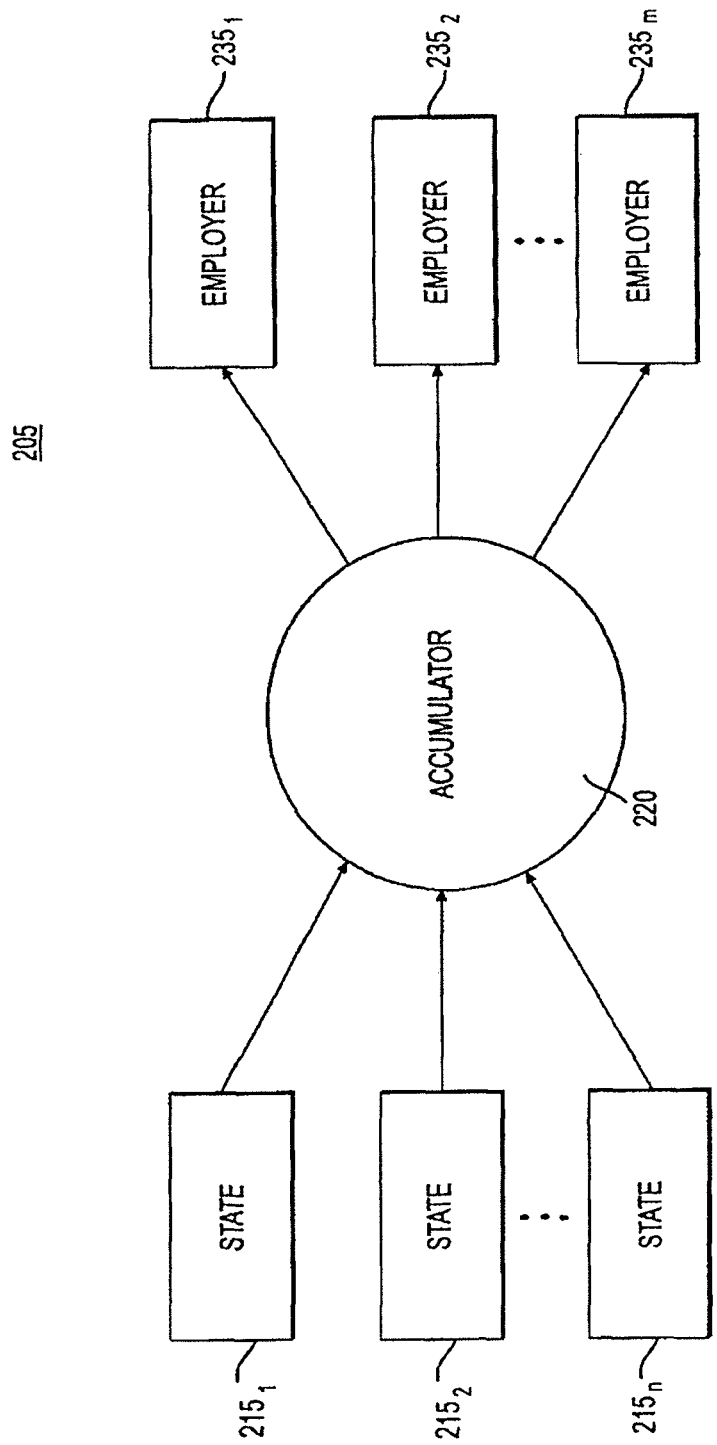
FIG. 2B is a block diagram of another alternative wage assignment collection and delivery system.

FIG. 2B shows a wage assignment collection and delivery system according to another alternative embodiment of the present invention. System 205 includes a plurality of states $215_{1-n}$, an accumulator 220, and a plurality of employers $235_{1-n}$. In this embodiment, the plurality of states $215_{1-n}$ are states or state entities that may initiate a wage assignment, and the plurality of employers $235_{1-m}$ are the employers that may receive and implement wage assignments. Similar to FIG. 1 and FIG. 2A, accumulator 120 in FIG. 2B is the processing station that receives wage assignments from states $215_{1-n}$, processes the wage assignments, and then transmits the wage assignments to employees $235_{1-m}$. In a preferred embodiment of the system shown in FIG. 2B, the plurality of states $215_{1-n}$ are state agencies that initiate Child Support Orders requiring wage assignments for noncustodial parents, and the plurality of employers $235_{1-m}$ are the employers of the noncustodial parents subject to the wage assignments pursuant to the Child Support Orders.

C. Process

Figure 3:
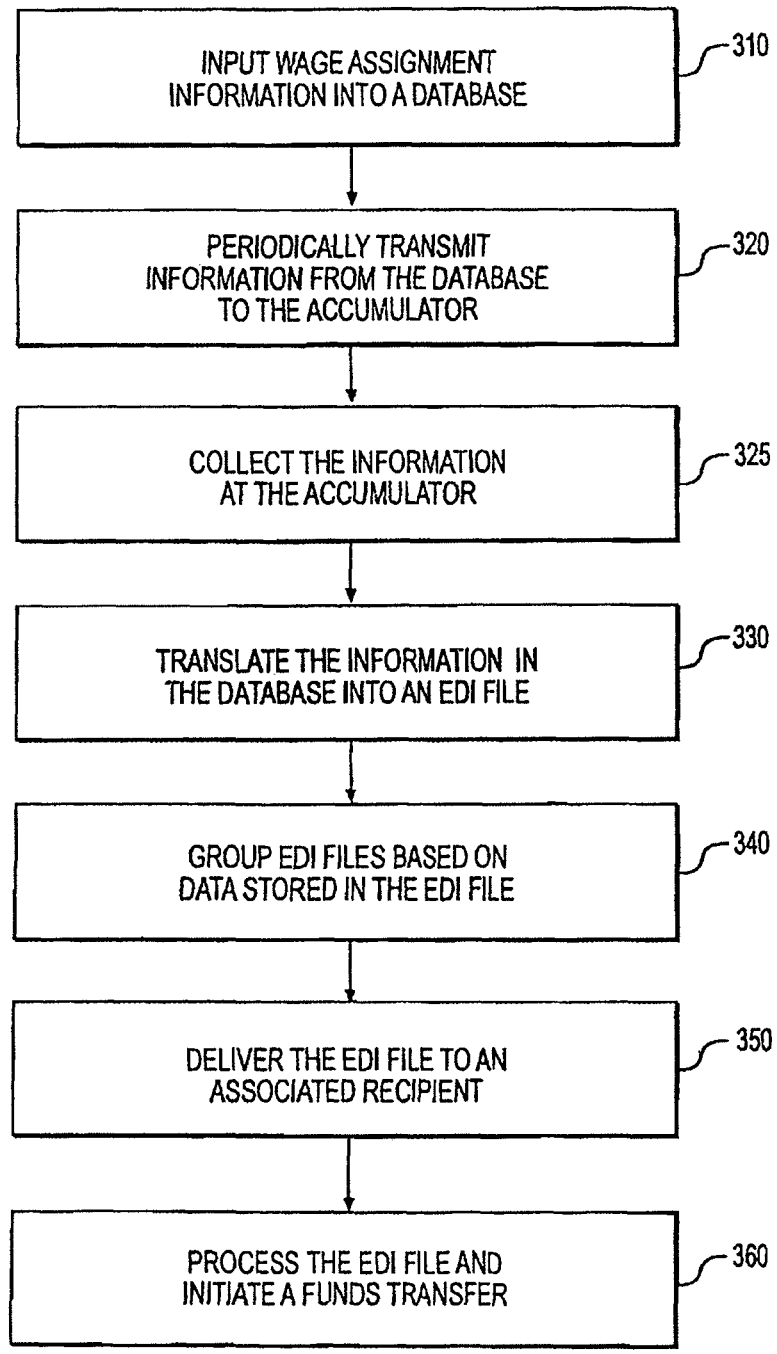
FIG. 3 is a flow diagram of a method for processing wage assignment information in a wage assignment collection and delivery system, as shown in FIG. 1.

FIG. 3 is a flow chart 300 illustrating the operation of a system 100 as shown in FIG. 1. As shown in FIG. 3, each initiator 110 inputs wage assignment information containing a wage assignment into a database that each initiator maintains separately (step 310). After the wage assignment information is input into the database, each initiator 110 transmits, such as, in a periodic batch of ASCII files, the wage assignment information stored in the database to accumulator 120 (step 320). Accumulator 120 then collects all the wage assignment information from all initiators $_{110}$(step 325). Accumulator 120 next translates the wage assignment information into an electronic format, which preferably comprises an EDI file using the 521 record set (step 330). After accumulator 120 creates the EDI files, they are initially organized based on the initiator. After the translation, however, accumulator 120 reorganizes the wage assignment files based on one of the data fields, such as, for example, element BPR10 of the 521 record set, which indicates the company initiating the funds transfer (i.e., employer). During this grouping (or batching), a batch of EDI files are created, preferably so that each EDI file is batched based on the employer (step 340). Accumulator 120 then delivers the batched EDI files to each of the plurality of recipients 130 (step 350). The delivery medium that accumulator 120 uses to deliver the batched EDI files to each of the plurality of recipients 130 depends on the capability of each recipient. For example, accumulator 120 may transmit an EDI file electronically to the most sophisticated recipients 130, while other recipients 130 may access a web page bulletin board (not shown) that is maintained by accumulator 120, while still other recipients 130 may receive the files via facsimile, and while still other recipients 130 may receive their files by mail. Whatever the delivery means, once received, each of the plurality of recipients 130 then processes the wage assignment and initiates a funds transfer through any known manner (step 360). Notably, a detailed description of the methods of operation of systems consistent with the operation of this system are provided in FIGS. 25-32.

D. Components

Figure 4:
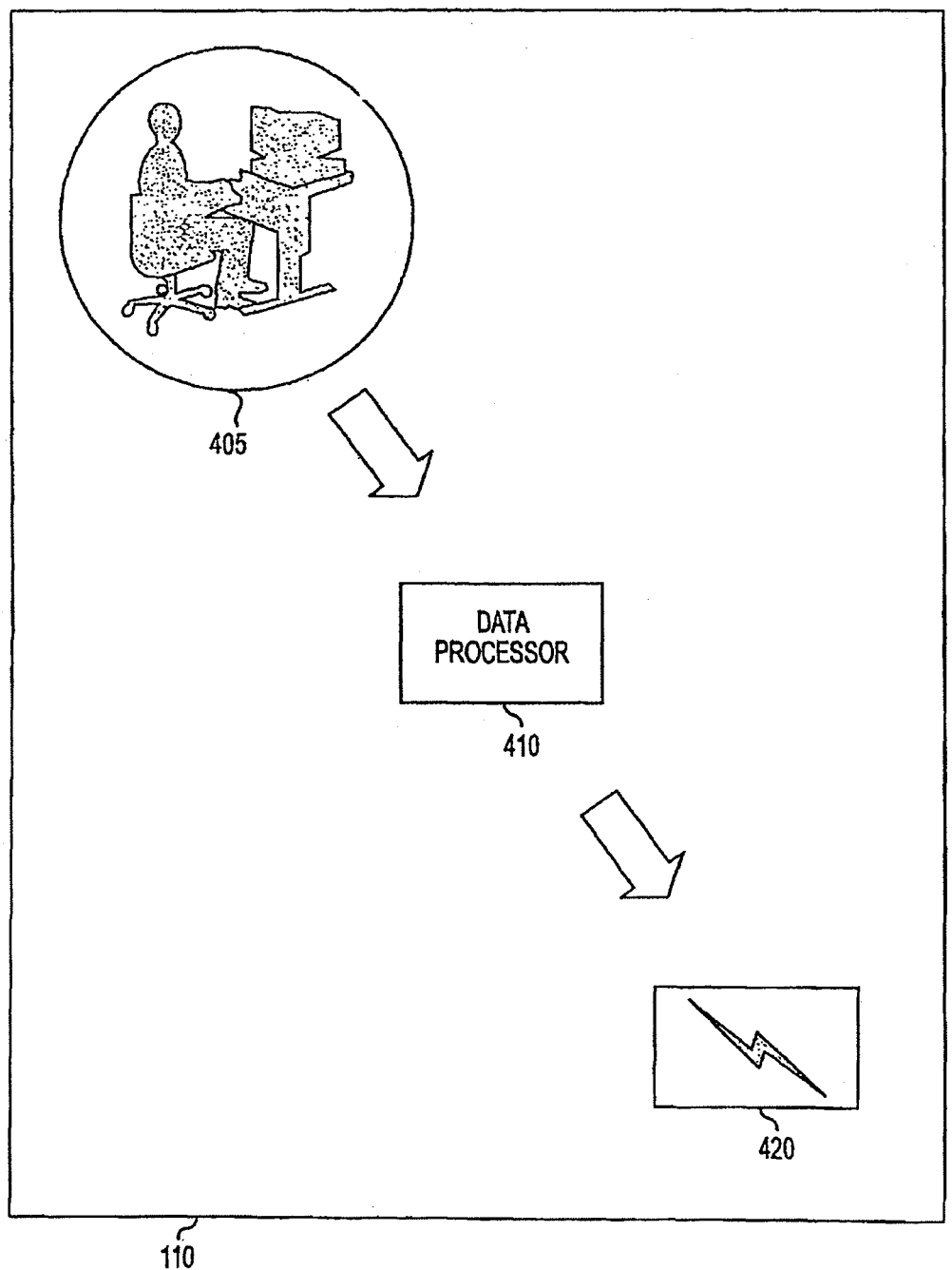
FIG. 4 is a block diagram of an initiator, as shown in FIG. 1.

FIG. 4 illustrates one representative embodiment of an initiator 110 shown in FIG. 1. As shown in FIG. 4, initiator 110 includes input station 405, data processor 410, and transmission means 420. Input station 405 provides for the input of wage assignments into a database at initiator 110. Input station 405 may include either manual or electronic means for inputting wage assignments into a wage assignment information database. Input station 405 may also include an optical character reader (OCR). Data processor 410 contains the database created by input station 405. Similarly, data processor 410 provides for the periodic transmission of the contents of the wage assignment information database to accumulator 120 via transmission means 420. Although data processor 410 preferably transmits the contents of the database electronically, initiator 110 may also transmit the database by other means, including by manual means. Thus, transmission means 420 includes both electronic and non-electronic means by transmission. A detailed description of data processor 410 is provided in FIG. 11.

Figure 5:
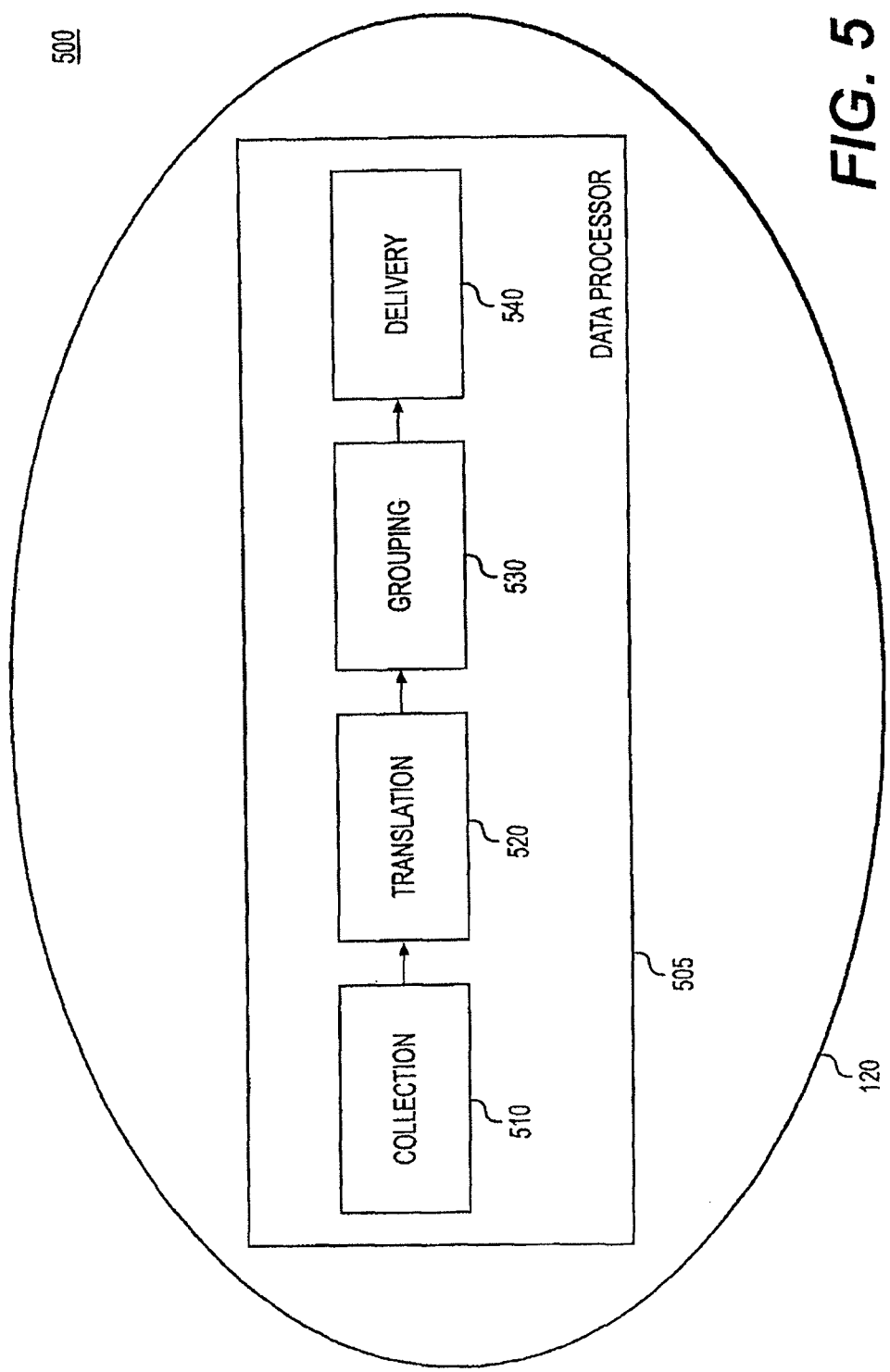
FIG. 5 is a block diagram of an accumulator, as shown in FIG. 1.

FIG. 5 illustrates one representative embodiment of accumulator 120 shown in FIG. 1. As shown in FIG. 5, accumulator 120 includes data processor 505, collection processing 510, translation processing 520, grouping processing 530, and delivery processing 540. After initiator 110 transmits a wage assignment to accumulator 120, data processor 505 at accumulator 120 collects the wage assignment during collection processing 510. Collection processing 510 includes the collection of a plurality of wage assignment information from a plurality of initiators 110. Generally, the plurality of initiators 110 transmits a plurality of wage assignment information to accumulator 120 in the form of ASCII format. Thereafter, translation processing 520 converts the wage assignment information into a standardized electronic format such as, for example, an EDI file using the X12 standard. Grouping processing 530 then batches the EDI files based on one data field from the EDI file. Preferably, the data field on which the batching occurs is the data field for the recipient. In this manner, grouping processing 530 batches the EDI files based on the recipient. Delivery processing 540 then delivers a single EDI file to each of a plurality of recipients 130. Notably, although delivery processing preferably occurs by electronic means, delivery processing 540 may take place by electronic, manual, or other means. Nonetheless, as noted above, in a preferred implementation, the EDI files are batched based on recipient, and therefore, delivery processing 540 dispatches a single EDI file from accumulator 120 to each of a plurality of recipients 130. A detailed description of data processor 505 is provided in FIG. 12.

Figure 6:
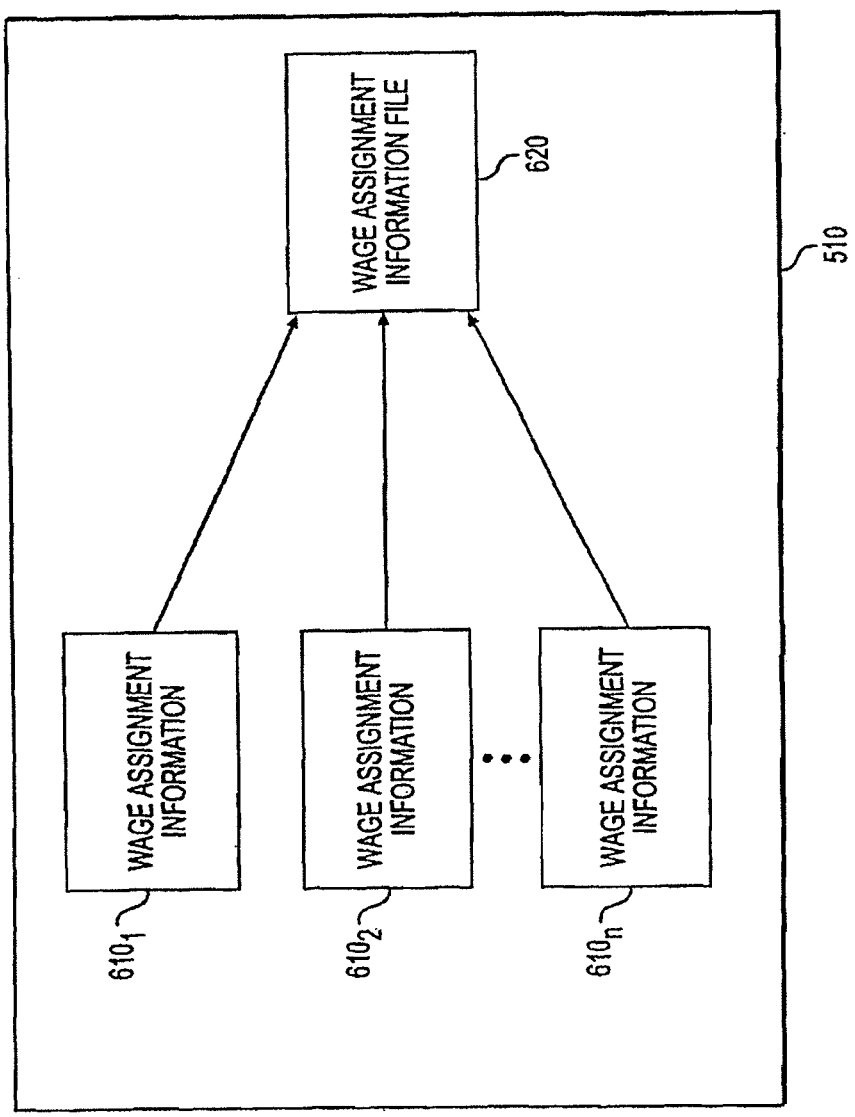
FIG. 6 is a block diagram of the processing performed during collection by an accumulator, as shown in FIG. 5.

FIG. 6 illustrates one representative embodiment of collection processing 510 shown in FIG. 5. As shown in FIG. 6, collection processing 510 includes a plurality of wage assignment information $610_{1-n}$ and wage assignment information file 620. Wage assignment information $610_{1-n}$, which are shown in FIG. 6 as wage assignment information $610_1$, wage assignment information $610_2$, wage assignment information $610_n$, is representative of the plurality of wage assignments received from a plurality of initiators 110. As shown in FIG. 6, the plurality of wage assignment information $610_{1-n}$, are collected by accumulator 120 and placed in wage assignment information file 620. Generally, the plurality of wage assignment information $610_{1-n}$ are in the ASCII format. Wage assignment information file 620 is simply a database containing the plurality of wage assignment information $610_{1-n}$.

Figure 7:
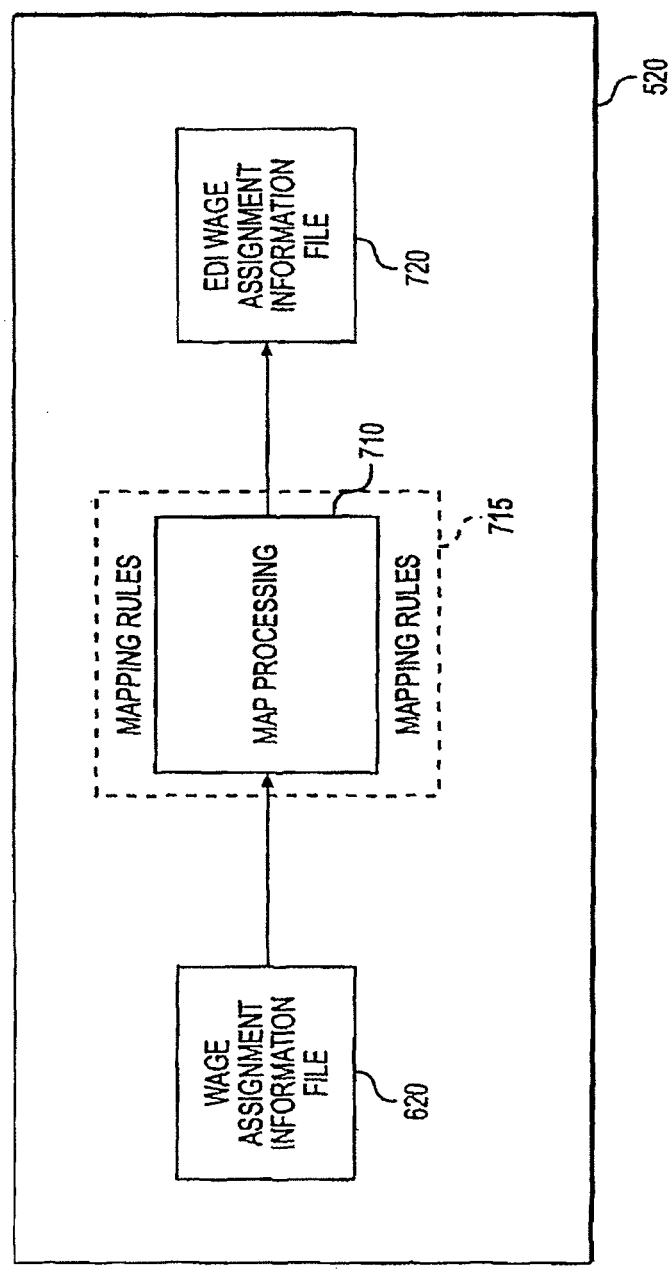
FIG. 7 is a block diagram of the processing performed during translation by an accumulator, as shown in FIG. 5.

FIG. 7 illustrates one representative embodiment of translation processing 520 shown in FIG. 5. As shown in FIG. 7, translation processing 520 includes wage assignment information file 620, map processing 710, mapping rules 715, and EDI wage assignment information file 720. In translation processing 520, as shown in FIG. 7, wage assignment information file 620 is subject to map processing 710. In map processing 710, mapping rules 715 are applied to the contents of wage assignment information file 620. In a preferred implementation, mapping rules 715 contain the mapping rules for the 521 record set of the X12 standard. Thus, in this preferred implementation, each wage assignment information in wage assignment information file 620 is translated into an EDI format pursuant to mapping rules 715 by map processing 710. Following map processing 710, each wage assignment information contained in wage assignment information file 620 has been translated into an electronic file, preferably an EDI file. These EDI files are then recorded in EDI wage assignment information file 720.

Figure 8:
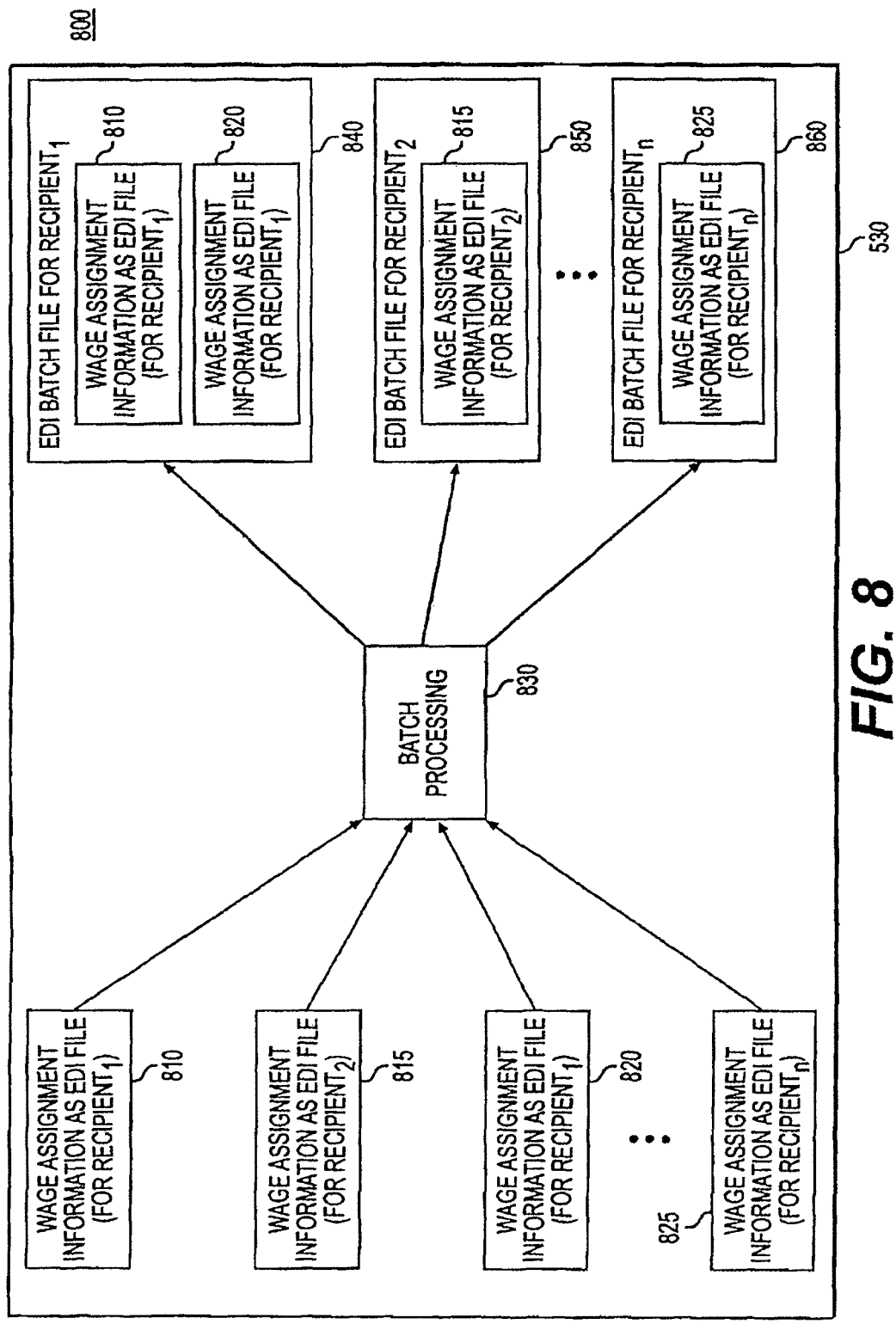
FIG. 8 is a block diagram of the processing performed during grouping by an accumulator, as shown in FIG. 5.

FIG. 8 illustrates one representative embodiment of grouping processing 530 shown in FIG. 5. As shown in FIG. 8, grouping processing 530 includes a plurality of wage assignment information as EDI files, including wage assignment information as EDI file (for $Recipient_1$) 810, wage assignment information as EDI file (for $Recipient_2$) 815, wage assignment information as EDI file (for $Recipient_1$) 820, and wage assignment information as EDI file (for $Recipient_n$) 825. Grouping processing 530 also includes batch processing 830, and a plurality of EDI batch files for recipients, including EDI batch file for $Recipient_1$ 840, EDI batch file for $Recipient_2$ 850, and EDI batch file for $Recipient_n$ 860. FIG. 8 contains examples showing the operation of batch processing 830, which references both the plurality of wage assignment information as EDI files and the plurality of EDI batch files for recipients. These examples are based on references to $Recipient_1$ and $Recipient_2$ as well as $Recipient_n$.

As shown in FIG. 8, wage assignment information as EDI file (for $Recipient_1$) 810 and wage assignment information as EDI file (for $Recipient_1$) 820 are two EDI files for $Recipient_1$. Wage assignment information as EDI file (for $Recipient_2$) 815 is a single EDI file for $Recipient_2$. Wage assignment information as EDI file (for $Recipient_n$) 825 shows that an unlimited number of other EDI files may be available for an unlimited number of other recipients. During grouping processing 530, batch processing 830 batches the EDI files based on one data field from the EDI file. A described above, in a preferred implementation, batch processing 830 utilizes the recipient field from the EDI file (e.g., element BPR10 of the 521 record set) as the field for purposes of batch processing 830. FIG. 8 depicts batch processing based upon this preferred implementation. Thus, as shown in FIG. 8, EDI batch file for Recipient, 840 shows wage assignment information as EDI file (for $Recipient_1$) 810 and wage assignment information as EDI file (for $Recipient_1$) 820 as batched in a single EDI batch file for $Recipient_1$. Similarly, EDI batch file for $Recipient_2$ 850 contains wage assignment information as EDI file (for $Recipient_2$) 815 as a single batch file for $Recipient_2$. These examples for Recipient, and $Recipient_2$ would be implemented similarly for a plurality of other Recipients, such as, for example, $Recipient_n$. Thus, as shown in EDI batch file for $Recipient_n$ 860, wage assignment information as EDI file (for $Recipient_n$) 825 would be contained in a single batch file for $Recipient_n$.

Figure 9:
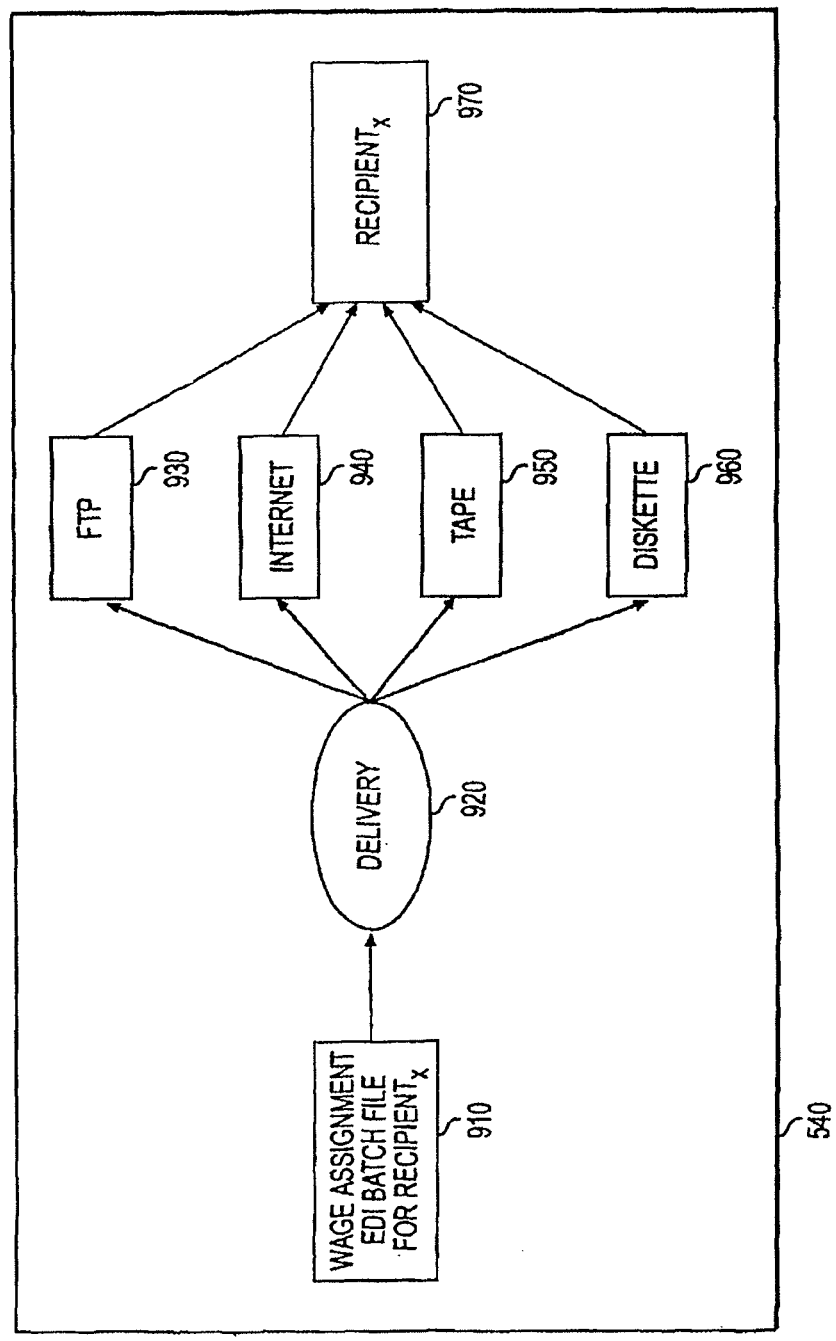
FIG. 9 is a block diagram of the processing performed during delivery by an accumulator, as shown in FIG. 5.

FIG. 9 illustrates one representative embodiment of delivery processing 540 shown in FIG. 5. As shown in FIG. 9, delivery processing 540 includes wage assignment EDI batch file for $Recipient_x$ 910, delivery 920, FTP 930, Internet 940, tape 950, diskette 960, and $Recipient_x$ 970. Delivery processing 540 takes an EDI batch file containing wage assignment information for $Recipient_x$ 910 and implements delivery 920. Delivery 920 entails the delivery of the EDI batch file to a recipient 130, i.e., Recipient, 970. Delivery 920 may take place by one of several methods, such as, for example, FTP 930, Internet 940, a tape 950, and diskette 960. Other delivery methods are also available (not shown). Whatever method utilized by delivery 920, the wage assignment EDI batch file for $Recipient_x$ 910 is delivered to $Recipient_x$ 970. In a preferred implementation, delivery processing 540 contains a database indicating the preferred method of delivery for each of a plurality of recipients, such as, $Recipient_x$ 970. A detailed description of the database indicating the preferred method of delivery is provided in FIG. 22.

Figure 10:
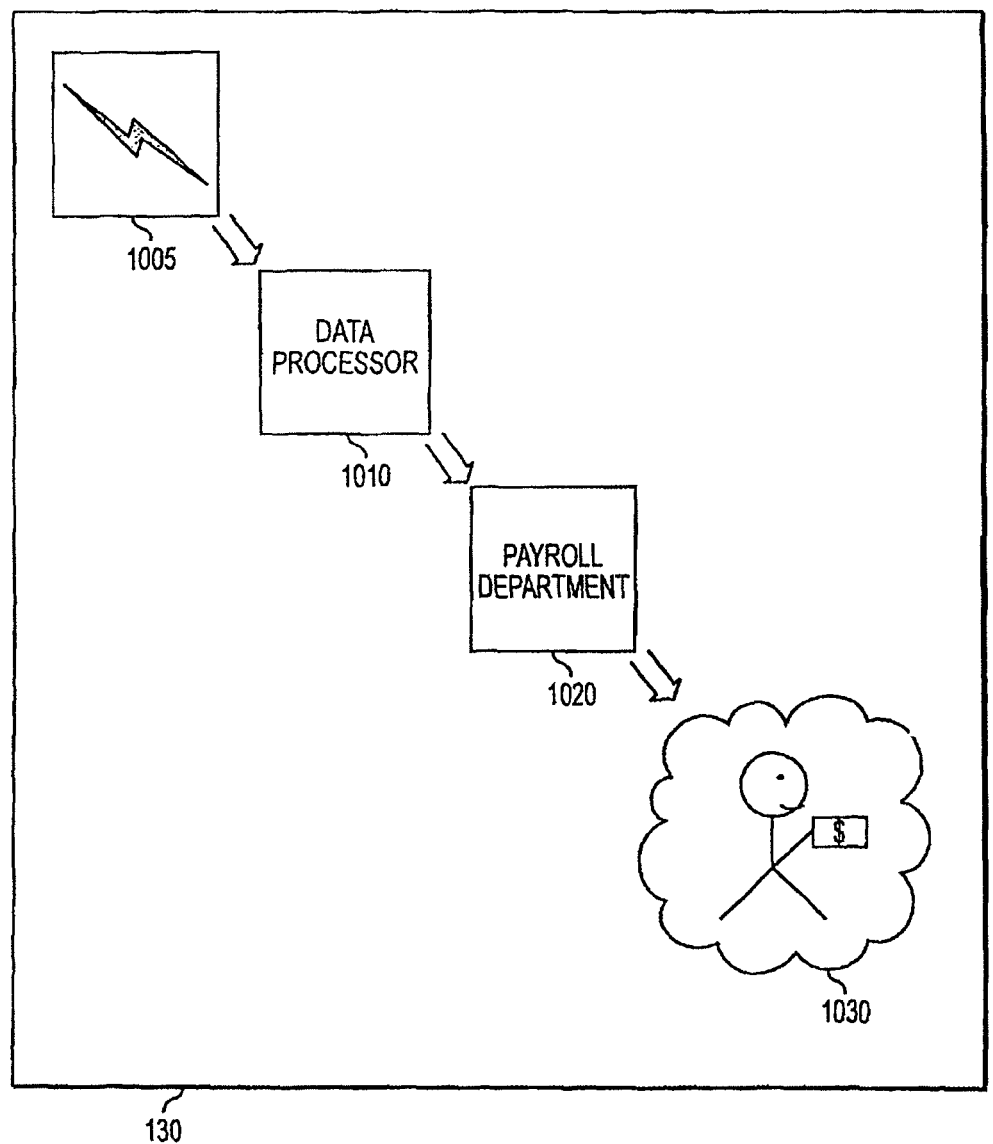
FIG. 10 is a block diagram of a recipient, as shown in FIG. 1.

FIG. 10 illustrates one representative embodiment of recipient 130 shown in FIG. 1. As shown in FIG. 10, recipient 130 includes transmission means 1005, data processor 1010, payroll department 1020, and wage assignment 1030. Recipient 130 receives wage assignment information from accumulator 120 via transmission means 1005. As described above, in a preferred implementation, transmission means 1005 receives an EDI file containing wage assignment information electronically. However, recipient 130 may also receive wage assignment information via transmission means 1005 in other forms, such as, for example, diskette. Whatever the form, once recipient 130 receives the wage assignment information, the wage assignment information is recorded in data processor 1010. Recipient 130 then processes the wage assignment in data processor 1010, which includes informing payroll department 1020 of the wage assignment. Note that payroll department 1020 may include any implementation of the wage assignment, manual or electronic. Payroll department 1020 then implements wage assignment 1030. In implementing wage assignment 1030, payroll department offsets or withholds a portion of the salary of the employee subject to the wage assignment. Such payment and disbursement processing may occur by any known system or method. A detailed description of data processor 1010 is provided at FIG. 13.

Figure 11:
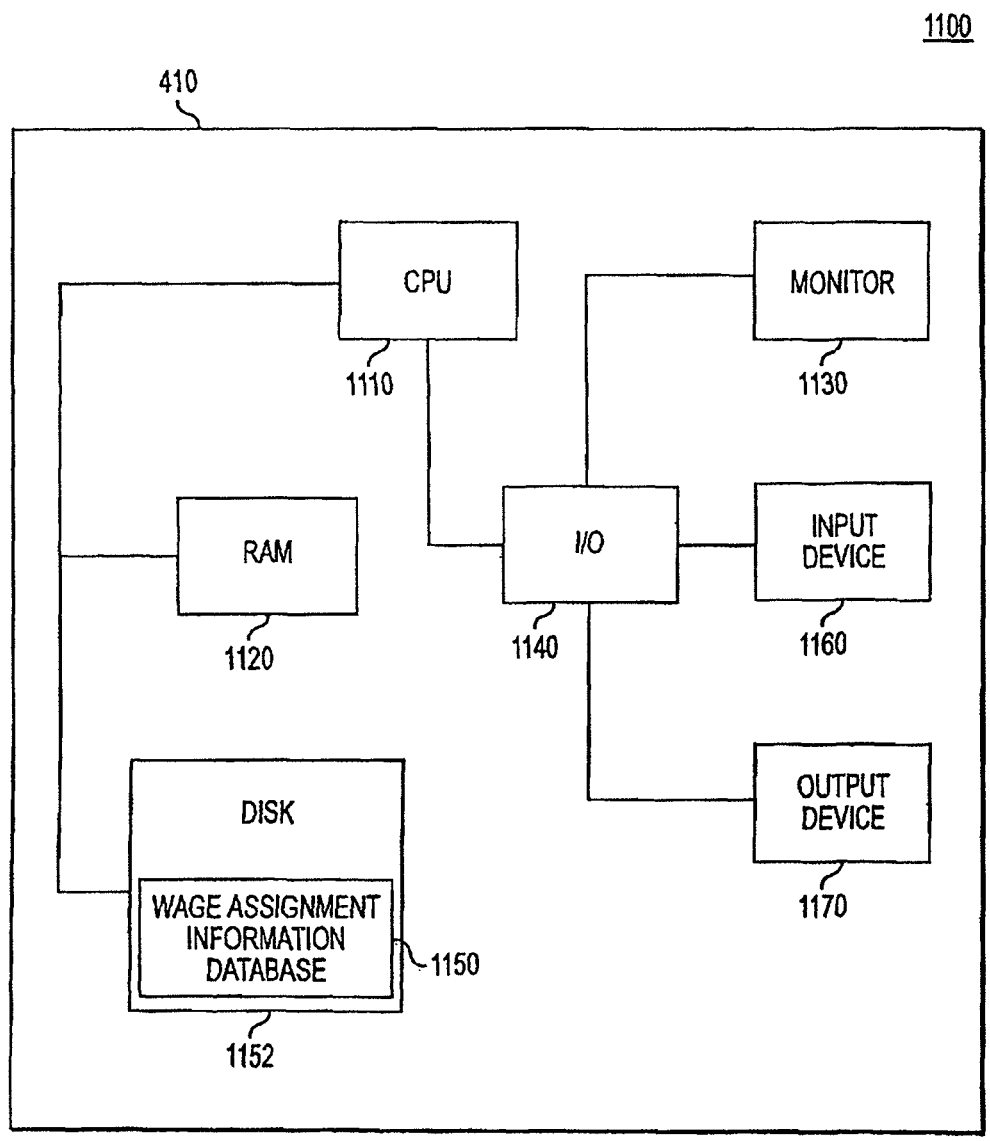
FIG. 11 is a block diagram of a data processor at an initiator, as shown in FIG. 4.

FIG. 11 illustrates one representative embodiment of data processor 410 shown in FIG. 4, in a wage assignment collection and delivery system as shown in FIG. 1. As shown in FIG. 11, data processor 410 at initiator 110 preferably includes one or more data processors 1100 equipped with conventional hardware and having operating software to support a central processing unit ("CPU") 1110, a random access memory ("RAM") 1120, a monitor 1130, an input/output (I/O) controller 1140, a data storage device (disk) 1150, an input device 1160, and an output device 1170. Although not depicted, processing station 300 is also capable of supporting peripheral equipment, such as, for example, scanners, printers, modems, etc., in conventional manners.

As shown in FIG. 11, CPU 1110 is directly coupled to each of RAM 1120, I/O controller 1140, and disk 1150. CPU 1110 operates by accessing RAM 1120 and disk 1150 in any conventional manner to execute program code (not shown) stored in at least one of RAM 1120 and disk 1150 to carry out the functions and acts described in connection with the operation of processing station 1100. CPU 1110 preferably comprises at least one high-speed digital data processor adequate to execute program modules consistent with the invention, such as the accumulation, processing, storage, and transmission of wage assignment information.

In one embodiment, processing station 1100 shown in FIG. 11 located at an initiator 110, such as, for example, a state child support department, operates to collect wage assignment information from persons, such as, for example, persons subject to mandatory child support payments. In such an example, a case worker at a state child support department inputs data at input device 1160 regarding a noncustodial parent who is subject to a Child Support Order. Data input at input device 1160 is received at CPU 1110 through I/O controller 1140 and stored in wage assignment information database 1152, which is stored in disk 1150. Preferably, processing station 1100 periodically transmits a batch of files through output device 1170 containing the wage assignment information stored in wage assignment information database 1152 to accumulator 120 as shown in FIG. 1. Although it is preferable to transmit the database as a batch of files, processing station 1100 could transmit the wage assignment information to accumulator 120 using other equivalent electronic means, such as E-mail, Internet bulletin boards, etc., or non-electronic means, such as Federal Express and the U.S. Postal Service. In the case of non-electronic means, processing station 1100 would either transmit a printout of the database or download the database onto a disk and transmit the disk to accumulator 120. Once the non-electronic information arrived at accumulator 120, the wage assignment information would then need to be manually input into the data processor at accumulator 120.

As shown in FIG. 11, disc 1150 preferably comprises a large capacity memory capable of maintaining wage assignment information database 1152. Wage assignment information database 1152 contains data corresponding to a wage assignment, such as, for example, a Child Support Order. Wage assignment information database 1152 can be structured in many forms and typically includes informational fields for the name of the originating state, the name of the originating jurisdiction, the date, and employer identification (which is normally the employer's Federal Tax Identification Number), the employer name, the employer address, the name of the custodial parent, the social security number of the non-custodial parent, the name of a custodial parent, the ordered termination date (which indicates when the child support is no longer mandatory), the dollar amount, etc. Data contained in wage assignment database 1152 may be periodically obtained and updated from input device 1160. Samples of the records and the respective fields contained in wage assignment information database 1152 is shown in and described in connection with FIG. 16.

Figure 12:
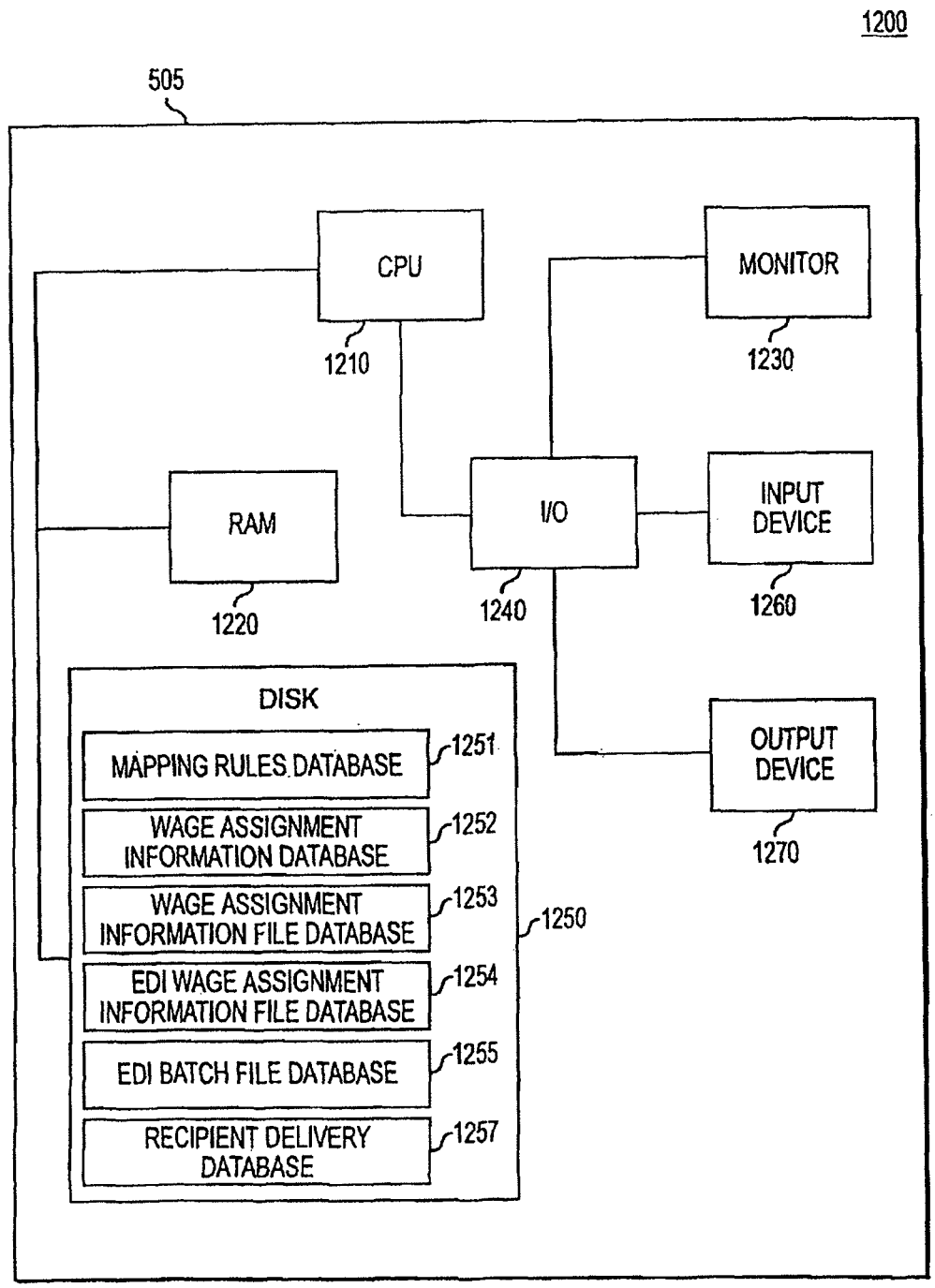
FIG. 12 is a block diagram of a data processor at an accumulator, as shown in FIG. 5.

FIG. 12 illustrates one representative embodiment of data processor 505 shown in FIG. 5, in a wage assignment collection and delivery system as shown in FIG. 1. As shown in FIG. 12, accumulator 120 preferably includes one or more processing stations 1200, which could be a conventional personal computer, mainframe, or equivalent, each equipped with conventional hardware and having operating software to support a central processing unit ("CPU") 1210, a random access memory ("RAM") 1220, a monitor 1230, an input/output (I/O) controller 1240, a data storage device (disk) 1250, an input device 1260, and an output device 1270. Although not depicted, processing station 1200 is also capable of supporting peripheral equipment such as scanners, printers, modems, etc., in conventional manners.

As shown in FIG. 12, CPU 1210 is directly coupled to each of RAM 1220, I/O controller 1240, and disk 1250. CPU 1210 operates by accessing RAM 1220 and disk 1250 in any conventional manner to execute program code (not shown) stored in at least one of RAM 1220 and disk 1250 to carry out the functions and acts described in connection with the operation of processing station 1200. CPU 1210 preferably comprises at least one high-speed digital data processor adequate to execute program modules consistent with the invention, such as the accumulation, transmission, organization, processing, and storage operations as well as the collection, translation, grouping, and delivery of wage assignment information.

In one embodiment, processing station 1200 receives wage assignment information at periodic intervals through input device 1260. In a preferred embodiment, processing station 1200 receives wage assignment information at periodic intervals through input device 1260 in the form of electronic files containing the data relating to Child Support Orders from a plurality of states 215, as shown in FIG. 2B. CPU 1210 then temporally stores either the wage assignment information or the wage assignment information file in wage assignment information database 1252 or in wage assignment information file database 1253, both of which are stored in disk 1250. If the wage assignment information is not formatted in a file, CPU 1210 initially stores the wage assignment information in wage assignment information database 1252 and then converts the wage assignment information into a wage assignment file and stores the file in wage assignment information file database 1253. However, if the wage assignment information is initially formatted in a file, then CPU 1210 stores the wage assignment information directly in wage assignment information file database 1253. Next, preferably, CPU 1210 translates the files in wage assignment information file 1253 into an EDI compatible file according to the ANSI X12 standard, specifically in the 521 record set, and these EDI files are then placed in EDI wage assignment file information file database 1254, which is stored in disk 1250. In order to translate the files into an EDI file, CPU 1210 accesses a rules database, such as a mapping rules database 1251, which is stored in disk 1250. Mapping rules database 1251 contains the codes needed by CPU 1210 to translate a file received from an initiator into an electronic file, preferably into an EDI file corresponding to the 521 record set. After translation, processing station 1200 then batches the EDI files in a database, such as EDI batch file database 1255, which is stored in disk 1250. In a preferred implementation, CPU 1210 batches the EDI files together based on a field containing information about the employer of the noncustodial parent (for example, element BPR10 of the 521 record set). In this implementation, CPU 1210 gathers all EDI files that indicate the same employer, regardless of the state of jurisdiction of origin, and batches those EDI files together in a single batched EDI file. Thereafter, CPU 1210 delivers the batched EDI file through output device 1270 to a recipient 130 on a periodic basis, which corresponds to the indicated recipient among the plurality of recipients 130.

Notably, in the preferred embodiment discussed above, while it is preferable to send a batched EDI file to an indicated employer, the indicated employer may not be capable of electronically receiving EDI files for processing. To account for this possibility, processing station 1200 has a recipient delivery database 1257, which is stored in disk 1250. Prior to transmitting a batched EDI file to an indicated employer, CPU 1210 accesses recipient rules database 1257. If recipient rules database 1257 indicates that the indicated employer can receive EDI file, then the EDI file is transmitted to the indicated employer electronically. Otherwise, CPU 1210 transmits the EDI file (i.e., preferably containing a batch file of one or more EDI files using the 521 record set) to the indicated employer through output device 470 by any transmission medium. In other words, the EDI file may even be sent through E-mail, facsimile transmission, or even the mail. As a further alternative to transmitting the files to the employer, CPU 1210 could transmit the EDI file via output device 1270 to a Web page or bulletin board (not shown). The indicated employer would receive the EDI file by accessing the Web page or bulletin board and then downloading the batched files. These alternative methods would use any conventional Internet server or computer system, access protocols, uploading protocols, downloading protocols, and security protocols. Data contained in one or more of these databases 1251, 1252, 1253, 1254, 1255, and 1257 may be periodically obtained and updated from input device 1260. Samples of the records and the respective fields contained in databases 1251, 1252, 1253, 1254, 1255, and 1257 are shown in and described in connection with FIGS. 17-23.

Figure 13:
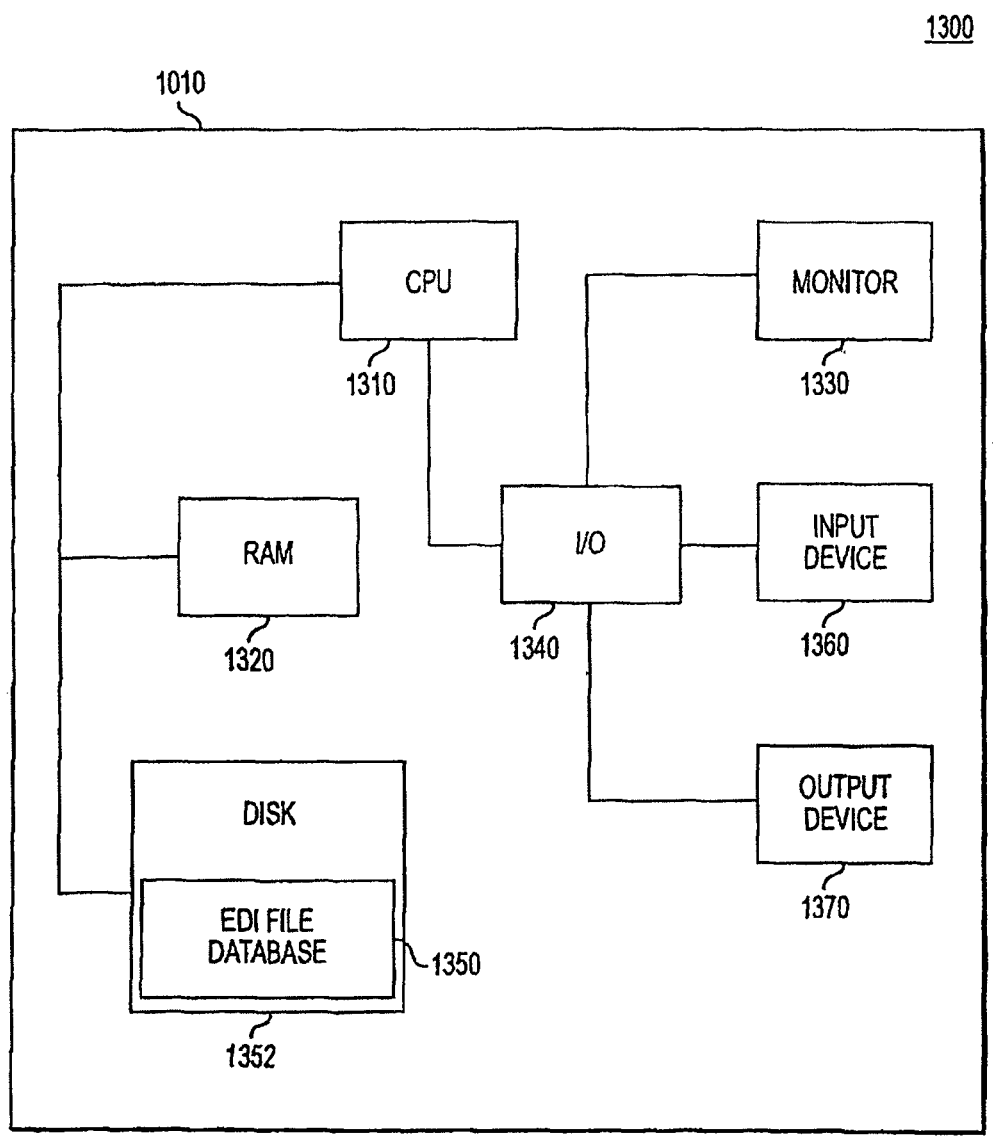
FIG. 13 is a block diagram of a data processor at a recipient, as shown in FIG. 10.

FIG. 13 illustrates one representative embodiment of data processor 1010 shown in FIG. 10, in a wage assignment collection and delivery system as shown in FIG. 1. As shown in FIG. 13, each recipient 130 preferably includes one or more processing stations 1300, which could be a conventional personal computer, mainframe, or equivalent, each equipped with conventional hardware and having operating software to support a central processing unit ("CPU") 1310, a random access memory ("RAM") 1320, a monitor 1330, an input/output (I/O) controller 1340, a data storage device (disk) 1350, an input device 1360, and an output device 1370. Although not depicted, processing station 1300 is capable of supporting peripheral equipment such as scanners, printers, modems, etc., in conventional manners.

As shown in FIG. 13, CPU 1310 is directly coupled to each of RAM 1320, I/O controller 1340, and disk 1350. CPU 1310 operates by accessing RAM 1320 and disk 1350 in any conventional manner to execute program code (not shown) stored in at least one of RAM 1320 and disk 1350 to carry out the functions and acts described in connection with the operation of processing station 1300. CPU 1310 preferably comprises at least one high-speed digital data processor adequate to execute program modules consistent with the invention, such as the accumulation, storage, and processing of wage assignment information and the implementation of wage assignments.

In a preferred embodiment, processor station 1300 receives wage assignment information transmitted from accumulator 120 through an electronic medium by inputting an EDI file directly into CPU 1310 through input device 1360. Data input at input device 1360 is received at CPU 1310 through I/O controller 1340 and stored in EDI file database 1352, which is stored in disk 1350. Other embodiments, however, include downloading the wage assignment information from an Internet bulletin board, from E-mail, or inputting the wage assignment information manually. Whatever the means of transmission of wage assignment information, in a preferred implementation, recipient 130 is the employer of the noncustodial parent subject to a wage assignment, and that assignment is then implemented in a manner as described in U.S. patent application Ser. No. 08/941,187. Recipient 130, however, can process the wage assignment in any manner currently known in the art. Regardless of the manner of implementation, the data contained in database 1352 may be periodically obtained and updated from input device 1360. Samples of the records and the respective fields contained in database 1352 is shown in and described in connection with FIG. 24.

E. Database Formats

In FIGS. 11-13, a number of databases are referenced with respect to the wage assignment collection and delivery systems shown in FIG. 1 and FIG. 2B. The following paragraphs describe these databases, but for purposes of illustration, these databases are depicted containing sample data. In fact, the samples of the contents of wage assignment information database 1152, mapping rules database 1251, wage assignment information database 1252, wage assignment information file database 1253, EDI wage assignment information file database 1254, EDI batch file database 1255, recipient delivery database 1257, and EDI file database 1352 are shown in FIGS. 16-24. The specific data and fields illustrated in these figures represent only one possible embodiment of a type of record that can be stored in the databases. For purposes of illustration, the record depicted is that of the preferred embodiment, i.e., the 521 record set of the X12 standard. Therefore, in most cases, the fields shown in FIGS. 16-24 are relatively straight-forward and self-explanatory. However, note that, in addition to the disclosed databases, the data and fields of these databases, as well as the number of databases, can be readily modified from the described embodiments, for example, to include more or fewer data fields or different or additional records.

FIG. 14A-14B depict a sample of an order/notice to withhold income for child support, i.e., a Child Support Order. As shown in FIG. 14A-14B, the Child Support Order contains a plethora of information relating to a wage assignment for purposes of a child support obligation. Nonetheless, the form depicted in FIGS. 14A-14B is a standard Child Support Order, as used by judicial entities and implemented by state agencies. For that reason, the form depicted in FIGS. 14A-14B is hereby incorporated by reference as well as reproduced for purposes of reference in FIGS. 14A-14B. For the following descriptions, FIGS. 14A-14B are used as a reference for purposes of providing a working example of the databases in the wage assignment collection and delivery systems shown in FIG. 1 and FIG. 2B.

FIGS. 15A-15B depict a sample of a Child Support Order containing sample data for purposes of illustration. This sample data will be used as the sample content for the databases described in FIGS. 16-24. As shown in FIGS. 15A-15B, the sample Child Support Order has been issued in the State of Virginia by a court in Alexandria, with a order date of Jun. 12, 1998 and a court number of 98-123. The sample order is directed to the employer of John J. Doe which is Y Corp., located at 123 Main Street, Anytown, Va. 12345-00000. As shown in the Child Support Order, the social security number of John Doe is 123-45-6789, the case identifier is 98-123, and the custodial parent is Jane Doe. Furthermore, as also shown in this sample Child Support Order, the child's name is Susie Doe, who has a date of birth of Jun. 1, 1990. As stated in the sample order, the Child Support Order pertains to an employer in the State of Virginia, and the order requires a wage assignment against the wages of John Doe at Y Corp. until Jun. 1, 2008. Under the terms of the sample Child Support Order, $800.00 a month is required in child support, and $100.00 a month is required in medical support; thus a total of $900.00 a month is required for the wage assignment. The foregoing information from the sample Child Support Order is used for purposes of illustration in FIGS. 16-24.

FIG. 16 illustrates a sample of the contents of wage assignment information database 1152 in data processor 410 at initiator 110 as shown in FIG. 11, using sample information in a preferred implementation of a wage assignment collection and delivery system. Wage assignment information database 1152, contains a listing of the information relating to a wage assignment, such as the information contained in a Child Support Order, such as, for example, sample order 1500, as depicted in FIGS. 15A-15B. As shown in FIG. 16, wage assignment information database 1152 contains 8 numbered fields but provides for an unlimited number of additional fields. As also shown in FIG. 16, a wage assignment may contain various types of information, which are recorded in wage assignment information database 1152. The wage assignment information in wage assignment information database 1152 may be recorded in any order.

FIG. 17 illustrates a sample of the contents of wage assignment information database 1252 in data processor 505 at accumulator 120 as shown in FIG. 12, using sample information in a preferred implementation of a wage assignment collection and delivery system. Wage assignment information database 1252 contains the same information as wage assignment information database 1152. Essentially, initiator 110 transmits the contents of wage assignment information database 1152 to accumulator 120. Following such transmission, accumulator 120 initially records the information received from initiator 110 in wage assignment information database 1252. Wage assignment information database 1252 is thus a temporary database at accumulator 120.

FIG. 18 illustrates a sample of the contents of wage assignment information file database 1253 in data processor 505 at accumulator 120 as shown in FIG. 12, using sample information in a preferred implementation of a wage assignment collection and delivery system. As shown in FIG. 18, wage assignment information file database 1253 contains nine fields but allows for an unlimited number of additional fields. In one implementation, field 1 identifies initiator 110. Thus, as shown in FIG. 18, field 1 shows two initiators, labeled $I_1$ and $I_2$. For $I_1$, there is one file in wage assignment information file database 1253, and for $I_2$ there are two files in wage assignment information file database 1253. Significantly, as shown in FIG. 18, the order of the information in each field need not be standardized for purposes of wage assignment information file database 1253.

FIGS. 19A-19F illustrate a sample of the form and contents of mapping rules database 1251 in data processor 505 at accumulator 120 as shown in FIG. 12, using a sample mapping form and sample mapping rules for a preferred implementation of a wage assignment collection and delivery system. FIGS. 19A-19B demonstrate how a mapping database may be created for purposes of map processing. FIGS. 19A-19B depict the same Child Support Order of FIGS. 14A-14B, except that each entry possibility has a mapping field. FIGS. 19A-19B show these mapping fields as fields 1a-36d. Correspondingly, FIGS. 19C-19F depict a table containing the mapping fields of the Child Support Order shown in FIGS. 19A-19B. In a preferred implementation, as depicted in FIGS. 19C-19F, the mapping fields correspond to the 521 record set. Thus, in this preferred implementation, the fields of the 521 record set correspond to the fields of mapping rules database 1251. Thus, when the wage assignment collection and delivery system translates a wage assignment to an EDI file format, as in the above-described preferred embodiment, mapping rules database 1251 contains records having fields corresponding to, for example, the fields identified in FIGS. 19C-19F.

FIG. 20 illustrates a sample of the contents of EDI wage assignment information file database 1254 in data processor 505 at accumulator 120 as shown in FIG. 12, using sample information in a wage assignment collection and delivery system. In a preferred implementation, using mapping rules database 1251, data processor 505 at accumulator 120 maps the information contained in wage assignment information file database 1253 to an EDI format, according to the fields set forth in mapping rules database 1251. In this manner, the information in wage assignment information file database 1253 is placed in fields corresponding to the mapping rules of mapping rules database 1251. As noted above, in a preferred implementation, mapping rules database 1251 contains the mapping rules for the 521 record set. Once this mapping occurs, the files are placed in EDI wage assignment information file database 1254, as shown in FIG. 20. Thus, in this preferred implementation, using mapping rules database 1251, each wage assignment is mapped to the proper field for the 521 record set. As shown in FIG. 20, fields 1a-36d contain these fields of the 521 record set, which correspond to the table shown in FIGS. 19C-19F. Thus, as shown in FIGS. 19C-19F and FIG. 20, and using the mapping rules from mapping rules database 1251, field 1a corresponds to the name of the state, field 1b corresponds to the name of the jurisdiction, field 2 corresponds to the date of the order, field 3 corresponds to the identifying number of the court, field 6a corresponds to the withholder's name, field 36d corresponds to the facsimile number for the person named in field 36a, etc. In FIG. 20, these fields are delineated as rows. In FIG. 20, the columns pertain to the plurality of initiators 110, labeled $I_1$, $I_2$, $I_3$, etc.

FIG. 21 illustrates a sample of the contents of EDI batch file database 1255 in data processor 505 at accumulator 120 as shown in FIG. 12, using sample information in a wage assignment collection and delivery system. As shown in FIG. 21, in a preferred implementation, EDI batch file database 1255 contains records having fields with identifiers corresponding to, for example, fields corresponding to the 521 record set. Thus, EDI batch file database 1255 is similar to EDI wage assignment information file database 1254. However, EDI batch file database 1255 contains EDI files that are batched by a particular field, such as, for example, one field from the 521 record set. In a preferred implementation, EDI batch file database 1255 contains EDI files that are batched on the recipient field (i.e., field BPR10 of the 521 record set). Thus, in this preferred implementation, as shown in FIG. 21, EDI batch file database 1255 contains EDI files, which are batched on the recipient.

FIG. 22 illustrates a sample of the contents of recipient delivery database 1257 in data processor 505 at accumulator 120 as shown in FIG. 12, containing sample information for a wage assignment collection and delivery system. As shown in FIG. 22, a plurality of recipients 130 may accept the transmittal of EDI files by a number of methods, including, but not limited to, FTP, Internet, tape, and diskette. In a preferred implementation, recipient delivery database 1257 contains the methods of delivery for EDI files from an accumulator 120 to a plurality of recipients 130. As shown in FIG. 22, for example, X Corp. accepts the transmittal of EDI files via FTP and diskette but not via Internet or tape. Similarly, Y Corp. accepts the transmittal of EDI files via tape but not via FTP, Internet, or diskette. Once accumulator 120 has determined the proper means of transmittal, the batched EDI file for a particular recipient 130 is removed from EDI batch file database 1255 and transmitted in the manner indicated by recipient delivery database 1257. Notably, as shown in FIG. 22, an unlimited number of delivery methods are possible.

FIG. 23 does not depict any database but does illustrate a sample of an EDI file transmittal from data processor 505 at accumulator 120 as shown in FIG. 12, using sample information in a preferred implementation of a wage assignment collection and delivery system. As shown in FIG. 23, EDI batch file database 1255 contained two EDI files for one particular recipient 130 (i.e., Y Corp.) from a plurality of recipients 130. As shown in this example, recipient 130 is Y Corp., and EDI batch file database 1255 contained two EDI files for Y Corp. within the EDI batch file. Thus, when accumulator 120 delivers the EDI batch file to this recipient, the transmittal of the EDI batch file will include two EDI files. Notably, because this recipient accepts EDI files via FDP or diskette, as indicated in the recipient delivery database 1257 as shown in FIG. 22, the transmittal of the EDI batch file shown in FIG. 23 may take place by either of these two methods.

FIG. 24 illustrates a sample of the contents of EDI file database 1352 from data processor 1010 at recipient 130 as shown in FIG. 13, using the sample information for a preferred implementation of a wage assignment collection and delivery system. As shown in FIG. 24, the contents of EDI file database 1352 is the same as that transmitted from accumulator 120, as shown by the EDI batch file described in FIG. 23. Notably, however, depending on the method of delivery to recipient 110, EDI file database 1352 may accept the information from accumulator 120 by any known delivery method, as indicated by recipient delivery database 1257 shown in FIG. 22.

F. Methods of Operation

As shown in FIG. 3, in processing a wage assignment from initiator 110 to recipient 130 via accumulator 120, the system shown and described in connection with FIG. 1 entails several distinct methods of operation. These methods include the processes that take place at initiator 110, the processes that take place at accumulator 120, and the processes that take place at recipient 130. The steps associated with these processes are described in connection with FIGS. 25-32 and can be performed in any order, unless otherwise specified or dictated by the steps themselves.

Figure 25:
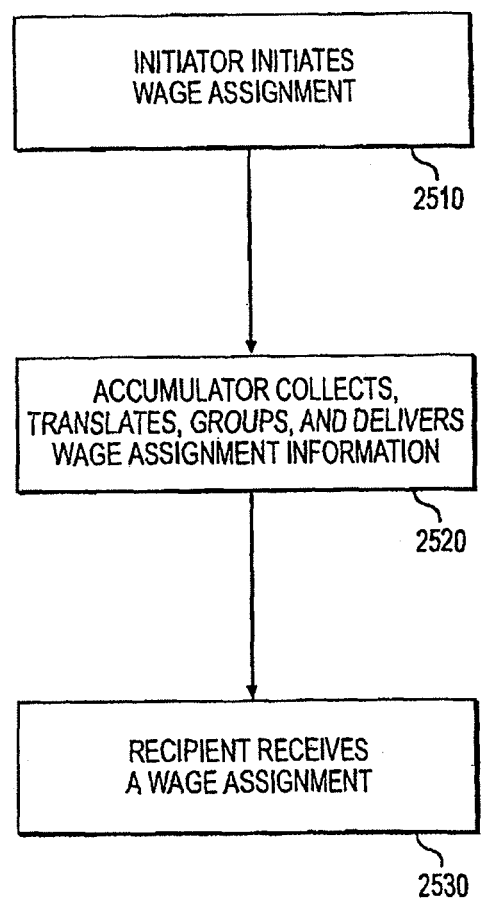
FIG. 25 is a flow diagram of a method for processing wage assignment information in a wage assignment collection and delivery system, in accordance with one embodiment of the invention, as shown in FIG. 1.
Figure 26:
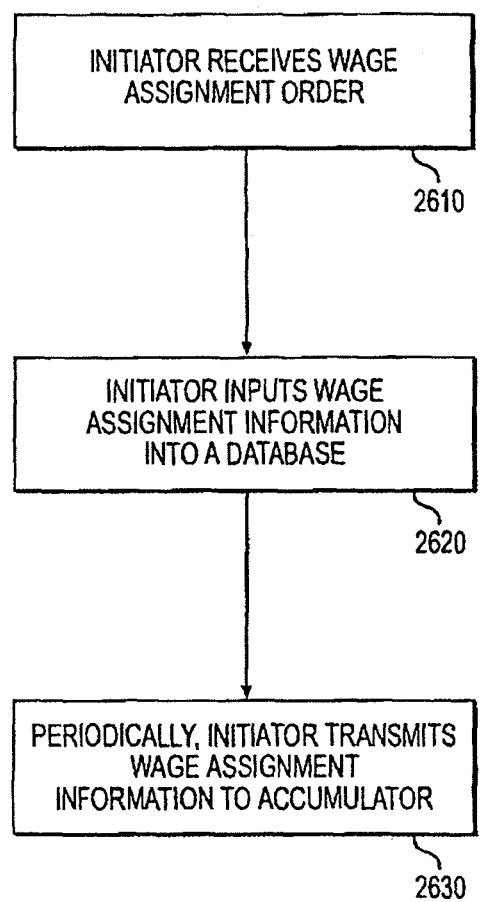
FIG. 26 is a flow diagram of a method for processing wage assignment information at an initiator, in accordance with one embodiment of the invention, as shown in FIG. 25.
Figure 27:
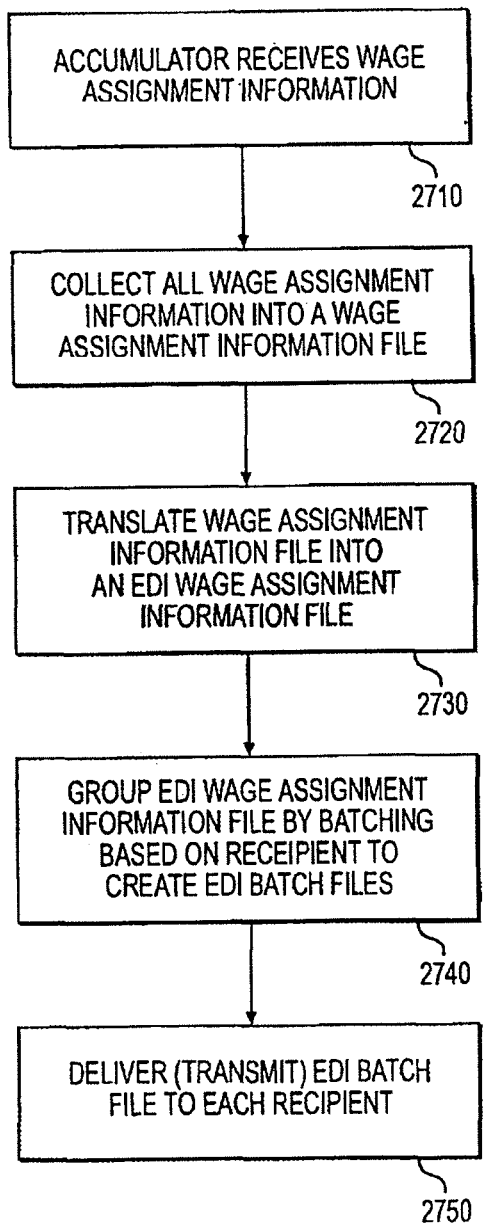
FIG. 27 is a flow diagram of a method for processing wage assignment information at an accumulator, in accordance with one embodiment of the invention, as shown in FIG. 25.
Figure 28:
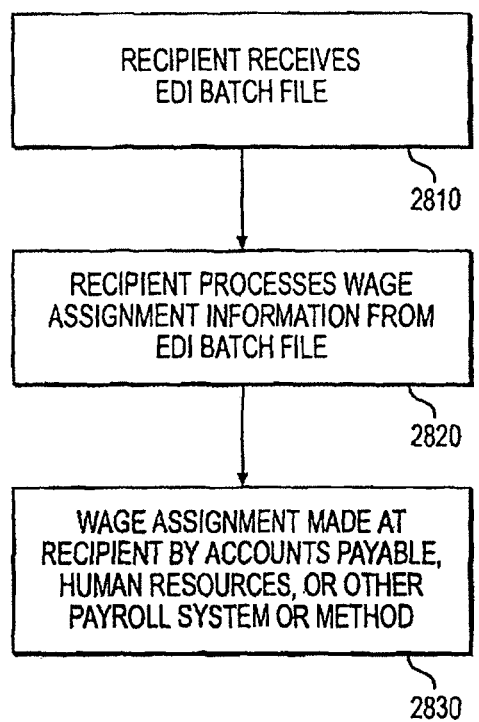
FIG. 28 is a flow diagram of a method for processing wage assignment information at a recipient, in accordance with one embodiment of the invention, as shown in FIG. 25.

In describing the processes consistent with the possible implementations of a system as shown and described in connection with FIGS. 1 and 2B, alternative implementations of systems consistent with the invention ate described herein. For example, FIG. 25 illustrates the processes performed by one embodiment of a wage assignment collection and delivery system as shown in FIG. 1. In this embodiment, initiator 110 initiates a wage assignment (step 2510). Next, accumulator 120 collects, translates, groups, and delivers the wage assignment information (step 2520). Finally, recipient 130 receives a wage assignment for processing and implementation (2530). FIGS. 26-28 depict flow diagrams illustrating the series of particular steps performed by a wage assignment collection and delivery system as shown in FIG. 25.

FIG. 26 illustrates the steps performed by initiator 110 in one embodiment of a wage assignment collection and delivery system as shown in FIG. 1. As shown in FIG. 26, initiator 110 receives a wage assignment order for processing (step 2610). Next, initiator 110 inputs the wage assignment information into a database (step 2620). At some point in time, and preferably on a periodic basis, initiator 110 then transmits the wage assignment information contained in the wage assignment information database to accumulator 120 (step 2630).

FIG. 27 illustrates the steps performed by accumulator 120 in one embodiment of a wage assignment collection and delivery system as shown in FIG. 1. As shown in FIG. 27, accumulator 120 receives wage assignment information from initiator 110 (step 2710). As described above, accumulator 120 may receive an unlimited number of wage assignment information transmissions from an unlimited number of initiators 110. Accordingly, accumulator 120 collects all wage assignment information into a wage assignment information file (step 2720). After collection, in a preferred implementation, accumulator 120 then translates each wage assignment in the wage assignment information file into an EDI wage assignment information file (step 2730). After translation, accumulator 120 then groups the EDI wage assignment information files by batching the files based on one field from the file. Preferably, the grouping of EDI wage assignment information files during the batching process occurs pursuant to the recipient field, so that the EDI batch files are batched based on the recipient (step 2740). After grouping, accumulator 120 then delivers an EDI batch file to each of a plurality of recipients 130. In a preferred implementation, where the EDI batch files are batched on the recipient, each recipient receives a single batch file containing all wage assignments for that recipient (step 2750).

FIG. 28 illustrates the steps performed by recipient 130 in one embodiment of a wage assignment collection and delivery system as shown in FIG. 1. As shown in FIG. 28, recipient 130 receives an EDI batch file from accumulator agency 120 (step 2810). Next, recipient 130 processes the wage assignment information from the EDI batch file (step 2820). As noted above, an EDI batch file may contain one or more EDI files. Finally, in processing the wage assignment information from the EDI batch file, each wage assignment is implemented at recipient 130 by accounts payable, human resources, or any other payroll system or method (step 2830). For example, in a preferred implementation relating to a child support obligation, a child support payment is withheld from the salary of a noncustodial parent, and the payment is then disbursed to the appropriate payee.

Figure 29:
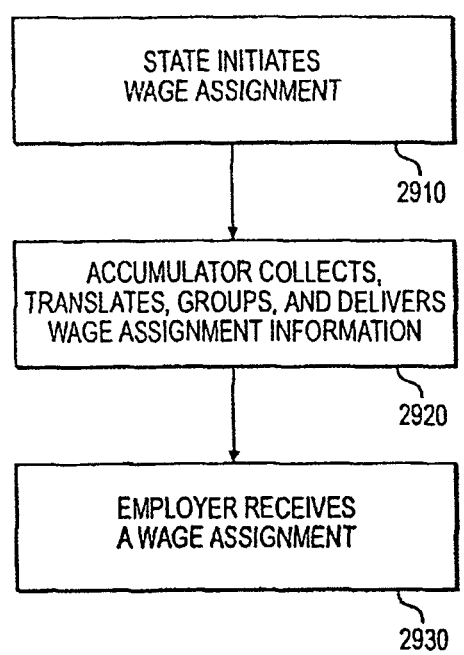
FIG. 29 is a flow diagram of a method for processing wage assignment information in a wage assignment collection and delivery system, in accordance with an alternative embodiment of the invention, as shown in FIG. 2B.
Figure 30:
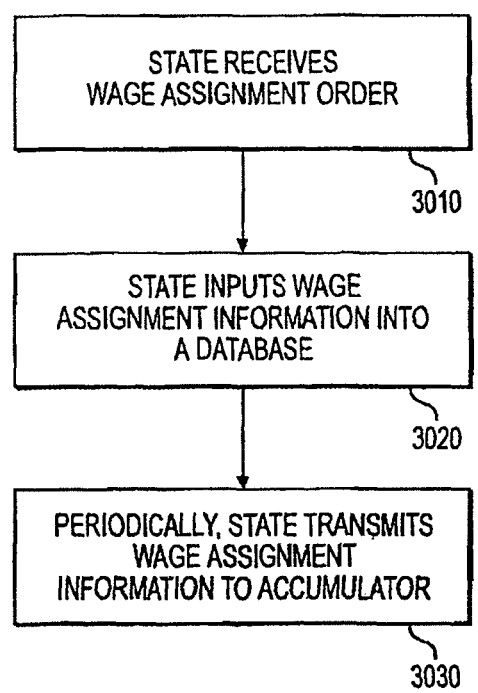
FIG. 30 is a flow diagram of a method for processing wage assignment information at an initiator, in accordance with an alternative embodiment of the invention, as shown in FIG. 29.
Figure 31:
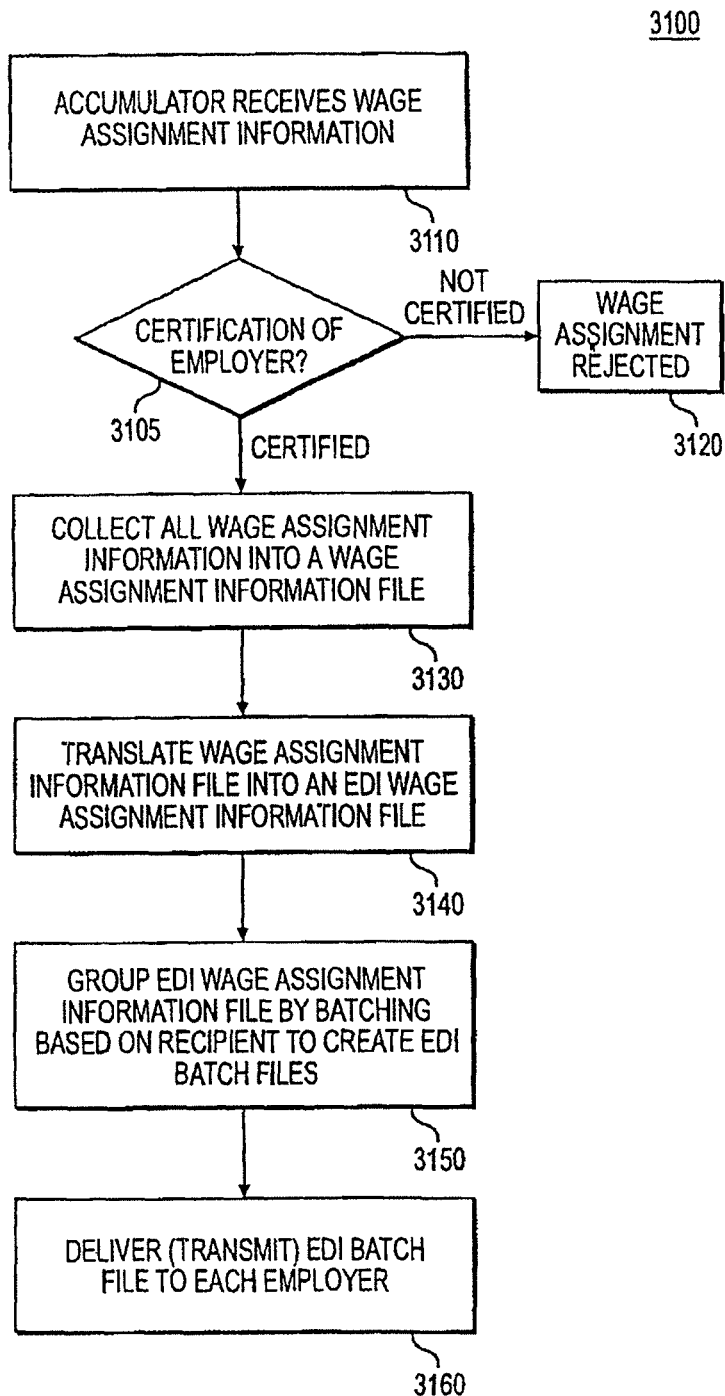
FIG. 31 is a flow diagram of a method for processing wage assignment information at an accumulator, in accordance with an alternative embodiment of the invention, as shown in FIG. 29.
Figure 32:
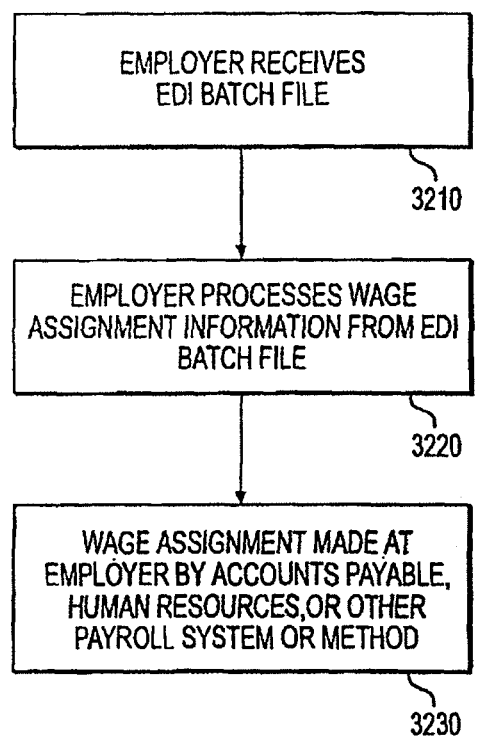
FIG. 32 is a flow diagram of a method for processing wage assignment information at a recipient, in accordance with an alternative embodiment of the invention, as shown in FIG. 29.

Similar to FIG. 25, FIG. 29 illustrates the processes performed by another embodiment of a wage assignment collection and delivery system as shown in FIG. 2B. In this embodiment, state 215 initiates a wage assignment (step 2910). Next, accumulator 120 collects, translates, groups, and delivers the wage assignment information (step 2920). Finally, employer 235 receives a wage assignment for processing (2930). FIGS. 30-32 depict flow diagrams illustrating the series of particular steps performed by a wage assignment collection and delivery system as shown in FIG. 29.

FIG. 30 illustrates the steps performed by state 215 in one embodiment of a wage assignment collection and delivery system as shown in FIG. 2B. As shown in FIG. 30, state 215 receives a wage assignment order for processing (step 3010). Next, state 215 inputs the wage assignment information into a database (step 3020). At some point in time, and preferably on a periodic basis, state 215 then transmits the wage assignment information contained in the wage assignment information database to accumulator 120 (step 3030). Notably, FIG. 30 performs the same steps as described in FIG. 26, except that instead of generally referencing an initiator 110 as in FIG. 26, FIG. 30 references a state 215, which refers more specifically to a state or a state entity.

FIG. 31 illustrates the steps performed by accumulator 120 in one embodiment of a wage assignment collection and delivery system as shown in FIG. 2B. As shown in FIG. 31, accumulator 120 receives wage assignment information from state 215 (step 3110). As described above, accumulator 120 may receive an unlimited number of wage assignment information transmissions from an unlimited number of states 215. Next, accumulator 120 certifies the employer denoted by the wage assignment information (step 3105). If the employer participates with the accumulator (e.g., subscribes to the accumulator service), then the wage assignment information is accepted, but if the employer does not participate with the accumulator (e.g., does not subscribe to the accumulator service), then the wage assignment information is rejected (step 3120). Accordingly, if the wage assignment information is accepted, accumulator 120 collects all wage assignment information into a wage assignment information file (step 3130). After collection, in a preferred implementation, accumulator 120 then translates each wage assignment in the wage assignment information file into an EDI wage assignment information file (step 3140). After translation, accumulator 120 then groups the EDI wage assignment information files by batching the files based on one field from the file. Preferably, the grouping of EDI wage assignment information files during the batching process occurs pursuant to the recipient field, so that the EDI batch files are batched based on the recipient (step 3150). After grouping, accumulator 120 then delivers an EDI batch file to each of a plurality of employers 235. In a preferred implementation, where the EDI batch files are batched on the employer, each employer receives a single batch file containing all wage assignments for that employer (step 3160). Notably, FIG. 31 essentially performs the same steps as described in FIG. 27, except that FIG. 31 also contains an employer certification component.

FIG. 32 illustrates the steps performed by employer 235 in one embodiment of a wage assignment collection and delivery system as shown in FIG. 2B. As shown in FIG. 32, employer 235 receives an EDI batch file from accumulator agency 120 (step 3210). Next, employer 235 processes the wage assignment information from the EDI batch file (step 3220). As noted earlier, an EDI batch file may contain one or more EDI files. Finally, in processing the wage assignment information from the EDI batch file, each wage assignment is implemented at employer 235 by accounts payable, human resources, or any other payroll system or method (step 3230). Notably, FIG. 32 performs the same steps as described in FIG. 28, except that instead of generally referencing a recipient 130 as in FIG. 28, FIG. 32 more specifically references an employer 235.

VI. CONCLUSION

The systems consistent with the invention provide for more efficient and more economical apparatus and methods for collection, translation, grouping, and delivery of wage assignment information. The systems first collect information relating to wage assignment information, translate the information into an EDI format, which is commonly referred to as a record set. Then, the EDI files are grouped based on the data contained in one or more element fields of the EDI record set and subsequently delivered to recipients who process the wage assignment information in any known method. This improved wage assignment collection and delivery apparatus and methodology provide many advantages over the current wage assignment and collection and delivery technologies.

As described above, it will be apparent to those skilled in the art that various modifications and variations can be made in the apparatus and methods of the present invention without departing from the spirit and scope of the invention. Thus, it is intended that the present invention cover the modifications and variations of this invention, provided they come within the scope of the appended claims and their equivalents. In this context, equivalents means each and every implementation for carrying out the functions recited in the claims, even if not explicitly described herein.

What is claimed is:

1. A method, implemented by a processor, of processing wage assignment information of a person, comprising:
   receiving wage assignment information of the person;
   certifying, by the processor, an employer of the person based on the receiving wage assignment information to determine if the employer participates with an wage assignment accumulating service;
   rejecting, by the processor, the wage assignment information when it is determined that the employer does not participate with the wage assignment accumulating service;
   translating, by the processor, the received wage assignment information into a file with a standardized format when it is determined that the employer participates with the wage assignment accumulating service; and
   delivering the file with the standardized format to the employer.

2. The method of claim 1, wherein the person is a noncustodial parent.

3. The method of claim 1, wherein the translating step includes generating an electronic data interchange (EDI) file.

4. The method of claim 3, wherein the translating step further includes generating the EDI file using the ANSI X12 standard 521 record set.

5. A system of processing wage assignment information of a person, comprising a processor and a memory, wherein the processor is configured to:
   receive wage assignment information of the person;
   certify an employer of the person based on the receiving wage assignment information to determine if the employer participates with an wage assignment accumulating service;
   reject the wage assignment information when it is determined that the employer does not participate with the wage assignment accumulating service;
   translate the received wage assignment information into a file with a standardized format when it is determined that the employer participates with the wage assignment accumulating service; and
   deliver the file with the standardized format to the employer.

6. The system of claim 5, wherein the person is a noncustodial parent.

7. The system of claim 6, wherein the processor is configured to generate an electronic data interchange (EDI) file.

8. The system of claim 7, wherein the processor is further configured to generate the EDI file using the ANSI X12 standard 521 record set.

9. A non-transitory computer readable medium encoded with computer readable code for processing wage assignment information of a person, the computer readable code comprising:
   a receiving module configured to receive wage assignment information of the person;
   a certification module configured to certify an employer of the person based on the receiving wage assignment information to determine if the employer participates with an wage assignment accumulating service and to reject the wage assignment information when it is determined that the employer does not participate with the wage assignment accumulating service;
   a translation module configured to translate the received wage assignment information into a file with a standardized format when it is determined that the employer participates with the wage assignment accumulating service; and
   a delivery module configured to deliver the file with the standardized format to the employer.

10. The non-transitory computer readable medium of claim 9, wherein the person is a noncustodial parent.

11. The non-transitory computer readable medium of claim 9, wherein the translation module is configured to generate an electronic data interchange (EDI) file.

12. The non-transitory computer readable medium of claim 11, wherein the translation module is further configured to generate the EDI file using the ANSI X12 standard 521 record set.

* * * * *